(12) United States Patent
Matsuo et al.

(10) Patent No.: US 7,065,748 B2
(45) Date of Patent: Jun. 20, 2006

(54) TEST SPECIFICATION FORMATION SUPPORTING APPARATUS, METHOD, AND PROGRAM, AND RECORDING MEDIUM

(75) Inventors: Akihiko Matsuo, Kawasaki (JP); Kyoko Ohashi, Kawasaki (JP); Rieko Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 945 days.

(21) Appl. No.: 10/024,188

(22) Filed: Dec. 21, 2001

(65) Prior Publication Data
US 2002/0174414 A1    Nov. 21, 2002

(30) Foreign Application Priority Data
May 17, 2001    (JP)    ............................. 2001-147414

(51) Int. Cl.
*G06F 9/44*    (2006.01)
(52) U.S. Cl. ...................................... 717/126; 717/127
(58) Field of Classification Search .................. 703/27; 717/124–127, 134, 135; 714/25, 26
See application file for complete search history.

(56) References Cited

U.S. PATENT DOCUMENTS

| 6,505,342 B1 * | 1/2003 | Hartmann et al. ........... 717/104 |
| 6,697,961 B1 * | 2/2004 | Petrenko et al. .............. 714/26 |
| 6,698,012 B1 * | 2/2004 | Kossatchev et al. ........ 717/126 |
| 6,898,784 B1 * | 5/2005 | Kossatchev et al. ........ 717/126 |

FOREIGN PATENT DOCUMENTS

JP    9-244921    9/1997

* cited by examiner

*Primary Examiner*—Albert W. Paladini
(74) *Attorney, Agent, or Firm*—Staas & Halsey LLP

(57) ABSTRACT

A test specification formation supporting apparatus is constructed by a test factor classification table forming unit and a test specification forming unit. The test factor classification table forming unit analyzes design information of a class of software designed by an object orientation and forms a template of a test factor classification table in which test factors which influence the operation of a method of a test target and conditions of the test factors have been listed. The test specification forming unit forms a test specification by combining the conditions described in the test factor classification table completed on the basis of the template of the test factor classification table.

40 Claims, 77 Drawing Sheets

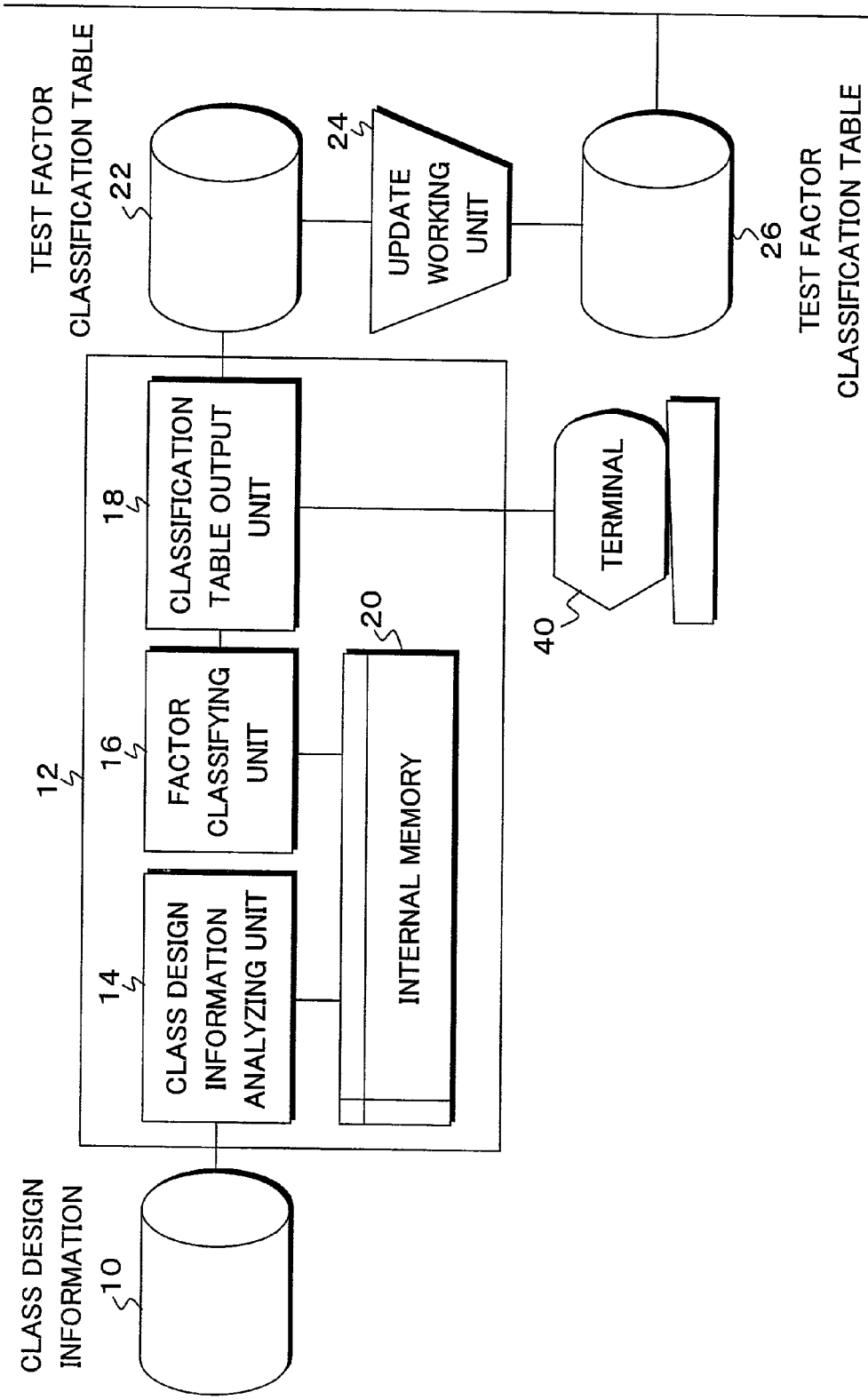

FIG. 2A

| CLASS NAME | ORDER SHEET CONTROLLER |
|---|---|
| CLASS ENGLISH NAME | OrderSheetController |
| PROJECT NAME | ORDER/RECEPTION MANAGEMENT SYSTEM |
| PACKAGE NAME | DRAFT |
| CREATION DATE | 2000/12/20 |
| IMPLEMENTOR | TANAKA |

FIG. 2B

| ATTRIBUTES | JAPANESE NAME | ENGLISH NAME | KIND | FORM | DESCRIPTION |
|---|---|---|---|---|---|
| 1 | CATEGORY | category1 | private | String | CATEGORY CODE |
| 2 | ITEM | category2 | private | String | ITEM CODE |
| 3 | ORDER TYPE | ordertype | private | String | PRODUCT No.CODE |

| METHOD | JAPANESE NAME | ENGLISH NAME | KIND | ARGUMENT JAPANESE NAME |
|---|---|---|---|---|
| 1 | FIND BY CATEGORY CLASSIFICATION | findByCategorize1 | private | CATEGORY CODE |
| 2 | FIND BY ITEM CLASSIFICATION | findByCategorize2 | private | ITEM CODE |
| 3 | FIND BY ORDER | findByOrder | public | REQUESTING SOURCE TYPE ORDER TYPE |

| ARGUMENT | RETURN VALUE JAPANESE NAME | RETURN VALUE | DESCRIPTION |
|---|---|---|---|
| category1:String | ITEM LIST | ItemList | SEARCH FROM CATEGORY CODE |
| category2:String | ITEM LIST | ItemList | SEARCH FROM ITEM CODE |
| account:String order:OrderType | ITEM LIST | ItemList | SEARCH FROM ORDER DATA |

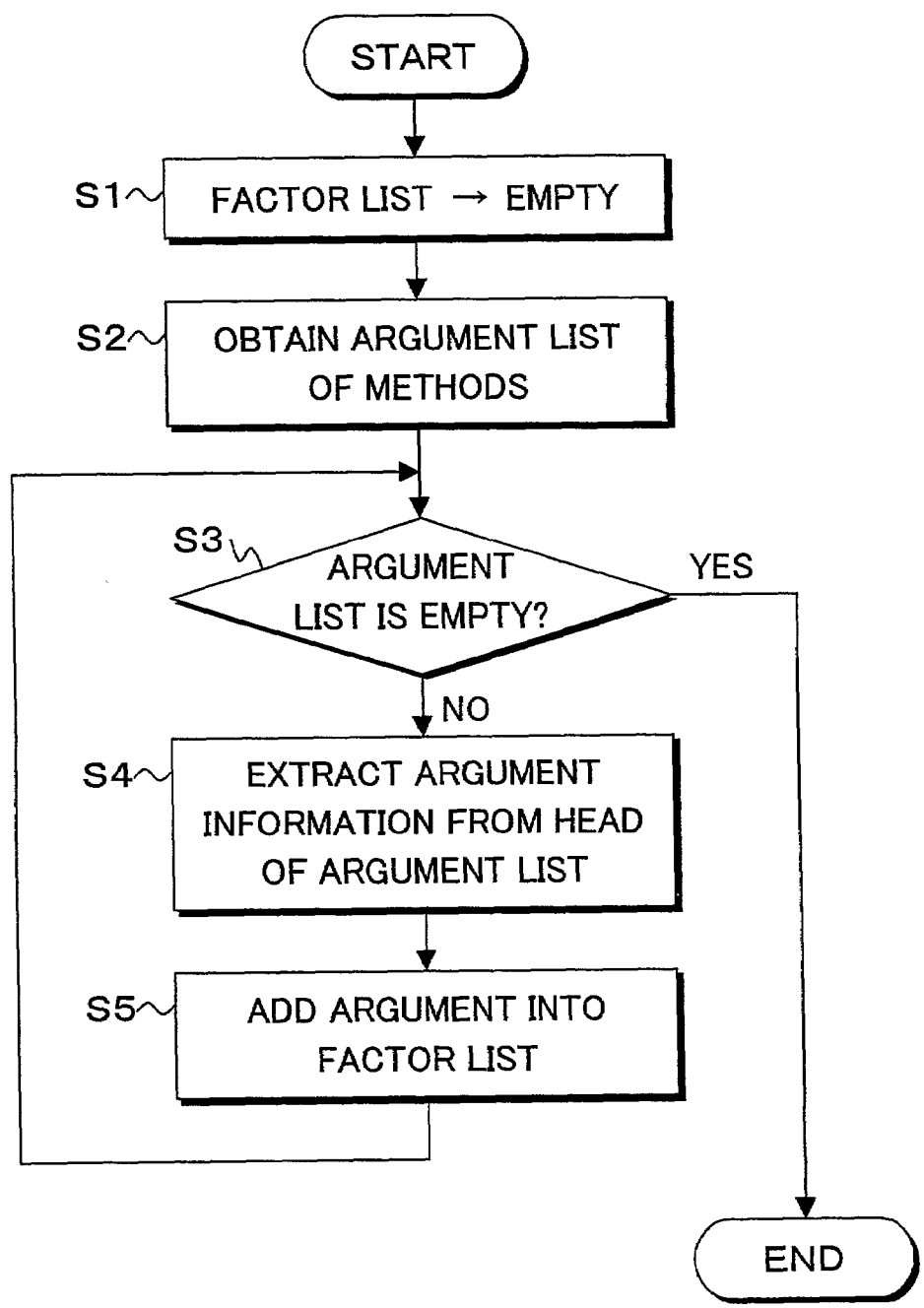

| CREATION DATE | |
|---|---|
| VERSION | |
| IMPLEMENTOR | |
| PROJECT NAME | ORDER/RECEPTION MANAGEMENT SYSTEM |
| PACKAGE NAME | DRAFT |
| CLASS NAME | OrderSheetController |
| METHOD NAME | findByOrder |
| ARGUMENT | String, OrderType |
| RETURN VALUE | ItemList |
| ACTIVATING CONDITIONS | |

| ARGUMENT ITEM No. | ARGUMENT NAME | FORM | CONDITIONS | PROCESS | ERROR CODE | REMARKS |
|---|---|---|---|---|---|---|
| 1 | account | String | | | | |
| 2 | order | OrderType | | | | |

FIG. 5A

| | |
|---|---|
| CREATION DATE | 2001/2/14 |
| VERSION | 1 |
| IMPLEMENTOR | SUZUKI |
| PROJECT NAME | ORDER/RECEPTION MANAGEMENT SYSTEM |
| PACKAGE NAME | DRAFT |
| CLASS NAME | OrderSheetController |
| METHOD NAME | findByOrder |
| ARGUMENT | String,OrderType |
| RETURN VALUE | ItemList |
| ACTIVATING CONDITIONS | NONE |

| ARGUMENT ITEM No. | ARGUMENT NAME | FORM | CONDITIONS |
|---|---|---|---|
| 1 | account | String | VALUE IS NOT REGISTERED |
|   |   |   | VALUE HAS BEEN REGISTERED |
| 2 | order | OrderType | BUDGET KIND IS NOT REGISTERED |
|   |   |   | BUDGET KIND IS EQUIPMENT |
|   |   |   | BUDGET KIND IS GENERAL EXPENSES |

80

| PROCESS | ERROR CODE | REMARKS |
|---|---|---|
| EXECUTE SEARCH | Err=300 | |
| SEARCH EQUIPMENT | Err=400 | |
| GENERAL SEARCH | | |

FIG. 8A

| DATE | 2001/2/16 |
|---|---|
| IMPLEMENTOR | YAMAMOTO |
| VERSION | 1 |
| PROJECT NAME | ORDER/RECEPTION MANAGEMENT SYSTEM |
| CLASS NAME | OrderSheetController |

82

| TEST ITEM No. | TARGET METHOD | TEST CONTENTS | CONFIRMATION CONTENTS | ERROR CODE | ATTENTION FACTOR |
|---|---|---|---|---|---|
| 1 | findByOrder | | | Err=300<br>Err=400 | account<br>order |
| 2 | findByOrder | | | Err=300 | account<br>order |
| 3 | findByOrder | | | Err=300 | account<br>order |
| 4 | findByOrder | | | Err=400 | account<br>order |
| 5 | findByOrder | | | | account<br>order |
| 6 | findByOrder | | | | account<br>order |

| CONDDITIONS | DATE OF CONFIRMATION | RESULT | REMARKS |
|---|---|---|---|
| VALUE IS NOT REGISTERED BUDGET KIND IS NOT REGISTERED | | | |
| VALUE IS NOT REGISTERED BUDGET KIND IS EQUIPMENT | | | |
| VALUE IS NOT REGISTERED BUDGET KIND IS GENERAL EXPENSES | | | |
| VALUE HAS BEEN REGISTERED BUDGET KIND IS NOT REGISTERED | | | |
| VALUE IS NOT REGISTERED BUDGET KIND IS EQUIPMENT | | | |
| VALUE IS NOT REGISTERED BUDGET KIND IS GENERAL EXPENSES | | | |

FIG. 11A

| | | 86 |
|---|---|---|
| CREATION DATE | | |
| VERSION | | |
| IMPLEMENTOR | | |
| PROJECT NAME | ORDER/RECEPTION MANAGEMENT SYSTEM | |
| PACKAGE NAME | DRAFT | |
| CLASS NAME | OrderSheetController | |
| METHOD NAME | findByOrder | |
| ARGUMENT | String, OrderType | |
| RETURN VALUE | ItemList | |
| ACTIVATING CONDITIONS | | |

FIG. 11B

| ARGUMENT ITEM No. | ARGUMENT NAME | FORM | CONDITIONS | PROCESS | ERROR CODE | REMARKS |
|---|---|---|---|---|---|---|
| 1 | account | String | | | | |
| 2 | order | OrderType | | | | |

FIG. 11C

| ATTRIBUTE ITEM No. | ATTRIBUTE NAME | FORM | CONDITIONS | PROCESS | ERROR CODE | REMARKS |
|---|---|---|---|---|---|---|
| 2-1 | type | String | | | | |
| 2-2 | id | Integer | | | | |

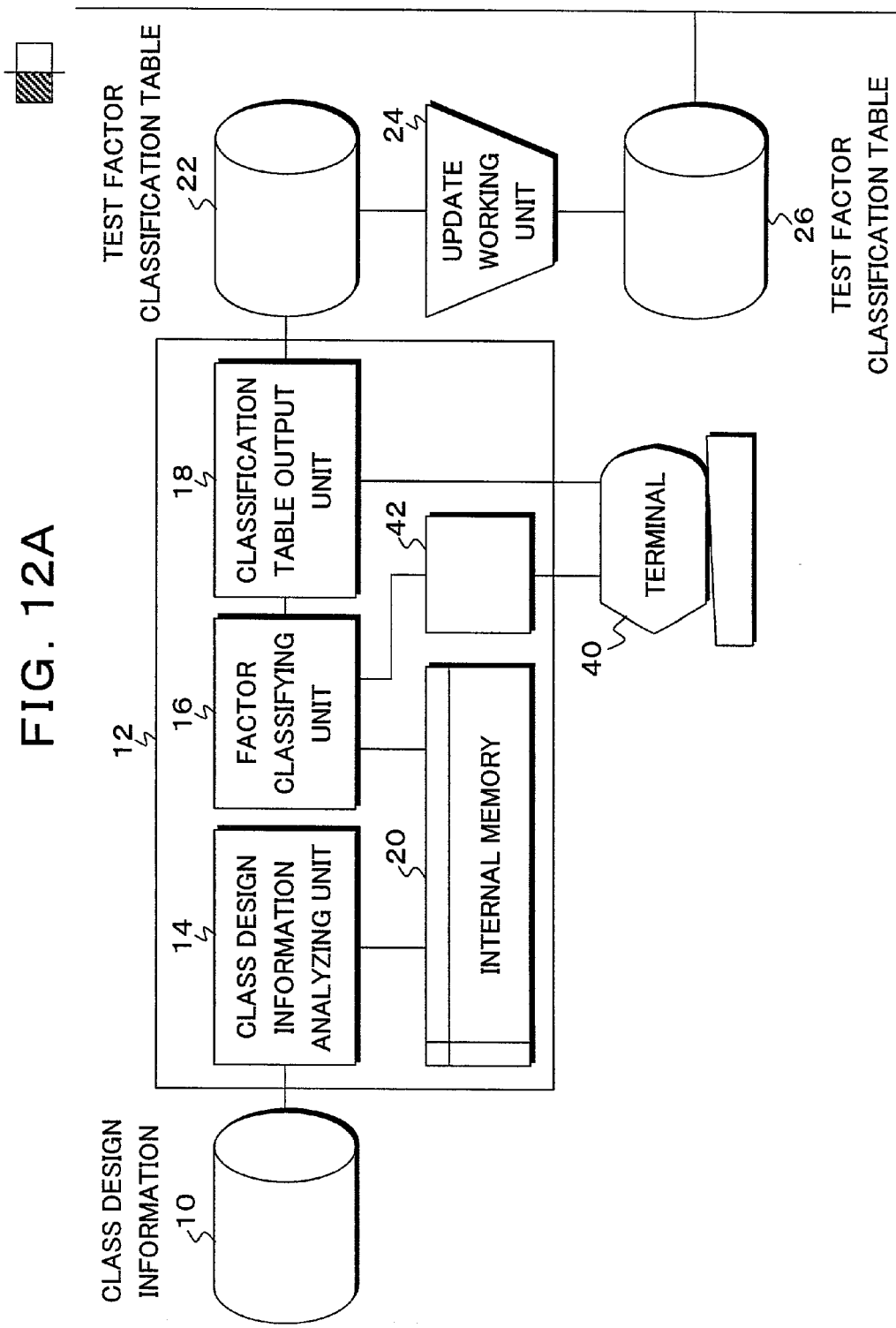

FIG. 12B
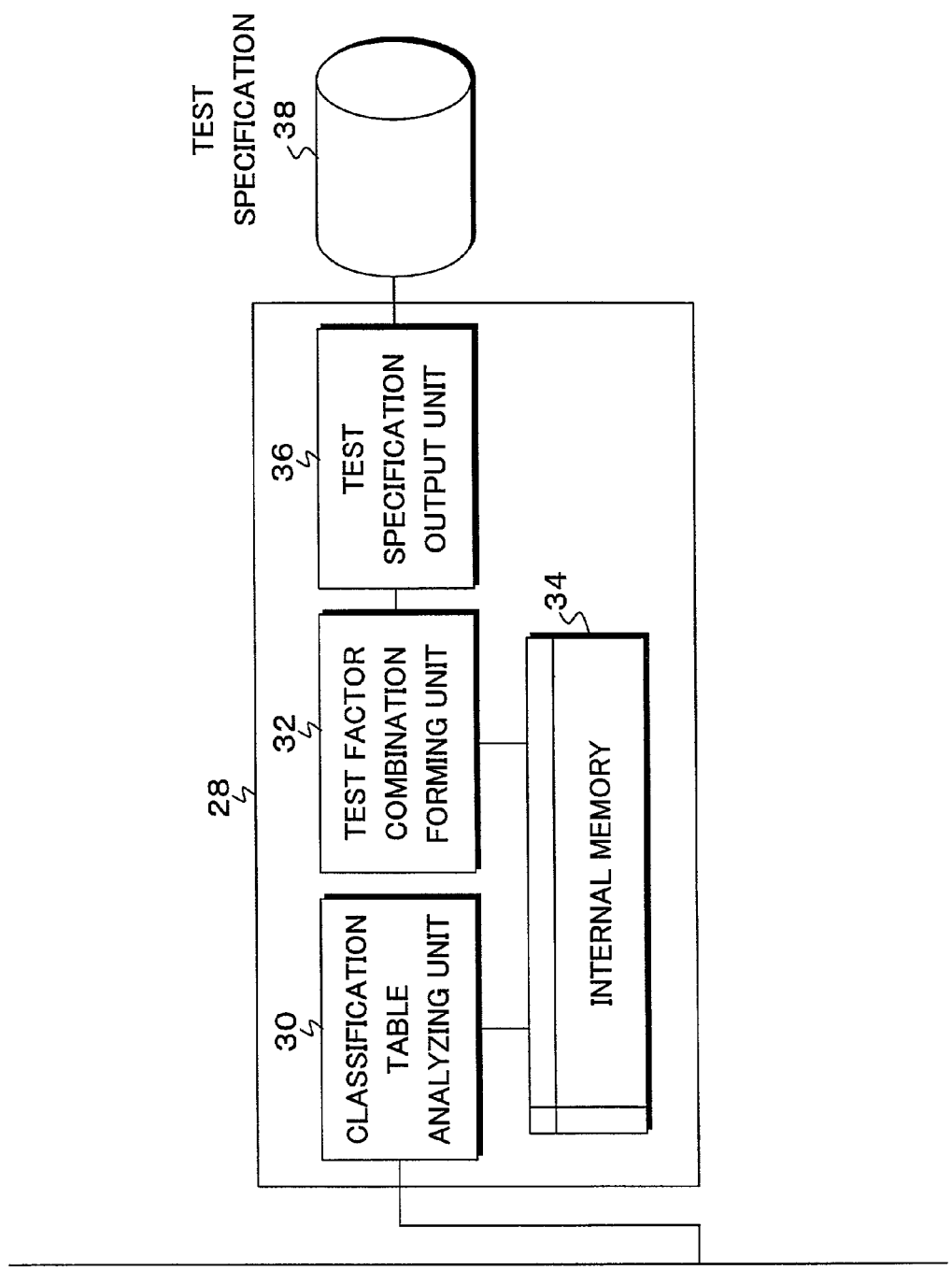

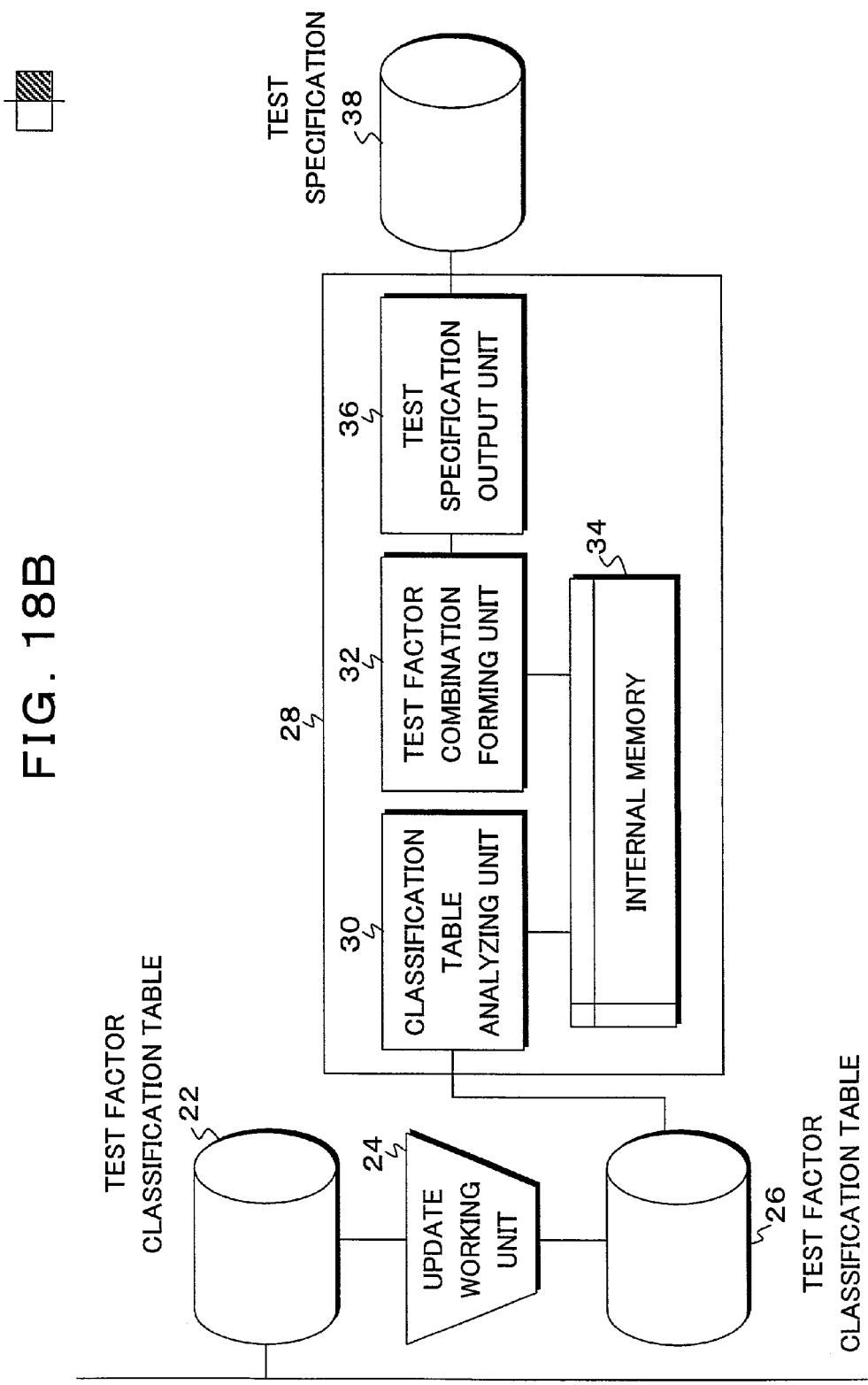

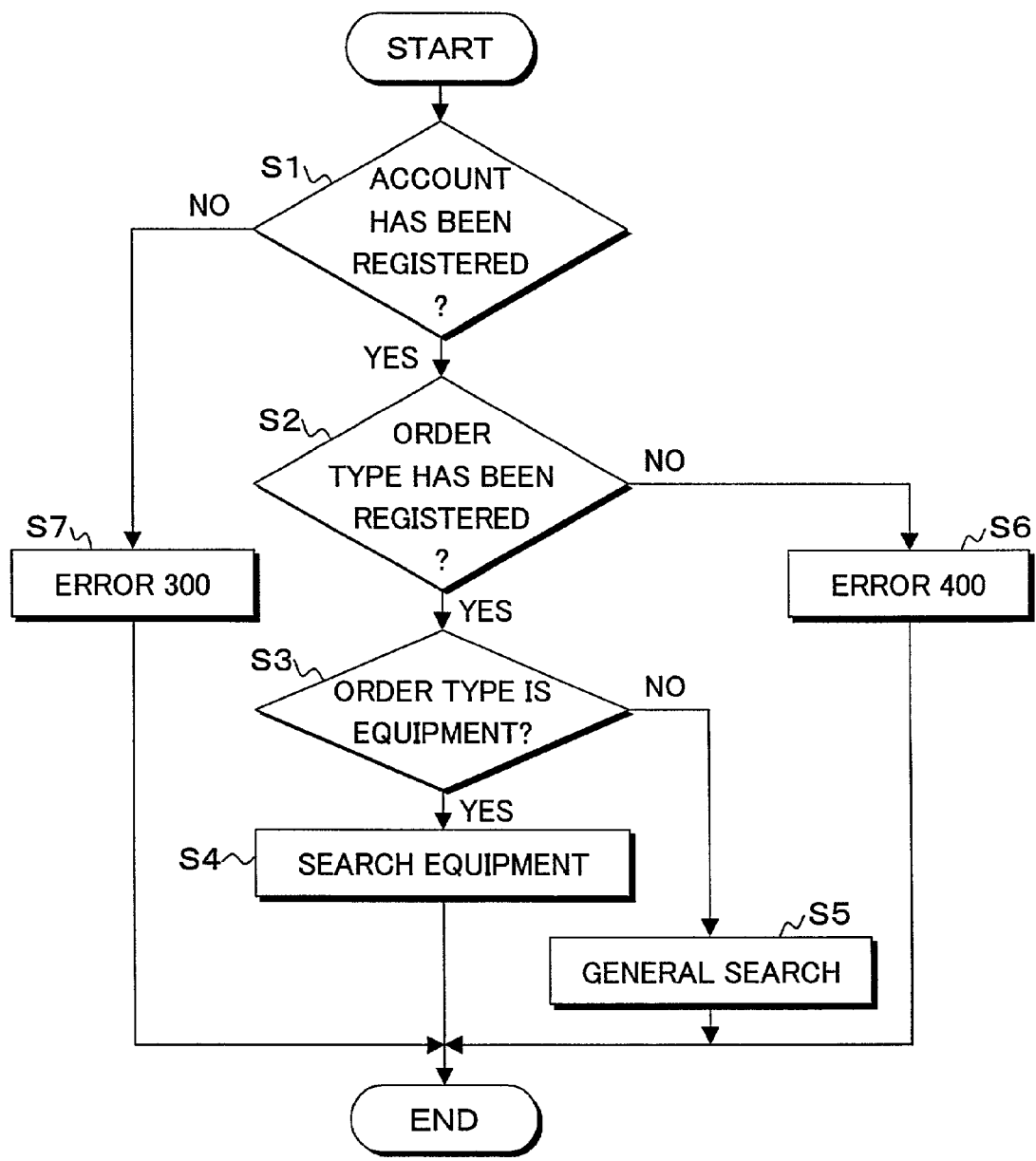

FIG. 20A

| | | 92 |
|---|---|---|
| CREATION DATE | | |
| VERSION | | |
| IMPLEMENTOR | | |
| PROJECT NAME | ORDER/RECEPTION MANAGEMENT SYSTEM | |
| PACKAGE NAME | DRAFT | |
| CLASS NAME | OrderSheetController | |
| METHOD NAME | findByOrder | |
| ARGUMENT | String, OrderType | |
| RETURN VALUE | ItemList | |
| ACTIVATING CONDITIONS | | |

FIG. 20B

| ARGUMENT ITEM No. | ARGUMENT NAME | FORM | CONDITIONS | PROCESS | ERROR CODE | REMARKS |
|---|---|---|---|---|---|---|
| 1 | account | String | REGISTERED NOT REGISTERED | | | |
| 2 | order | OrderType | | | | |

| ATTRIBUTE ITEM No. | ATTRIBUTE NAME | FORM | CONDITIONS | PROCESS | ERROR CODE | REMARKS |
|---|---|---|---|---|---|---|
| 2-1 | type | String | REGISTERED NOT REGISTERED EQUIPMENT NOT EQUIPMENT | | | |
| 2-2 | id | Integer | | | | |

96

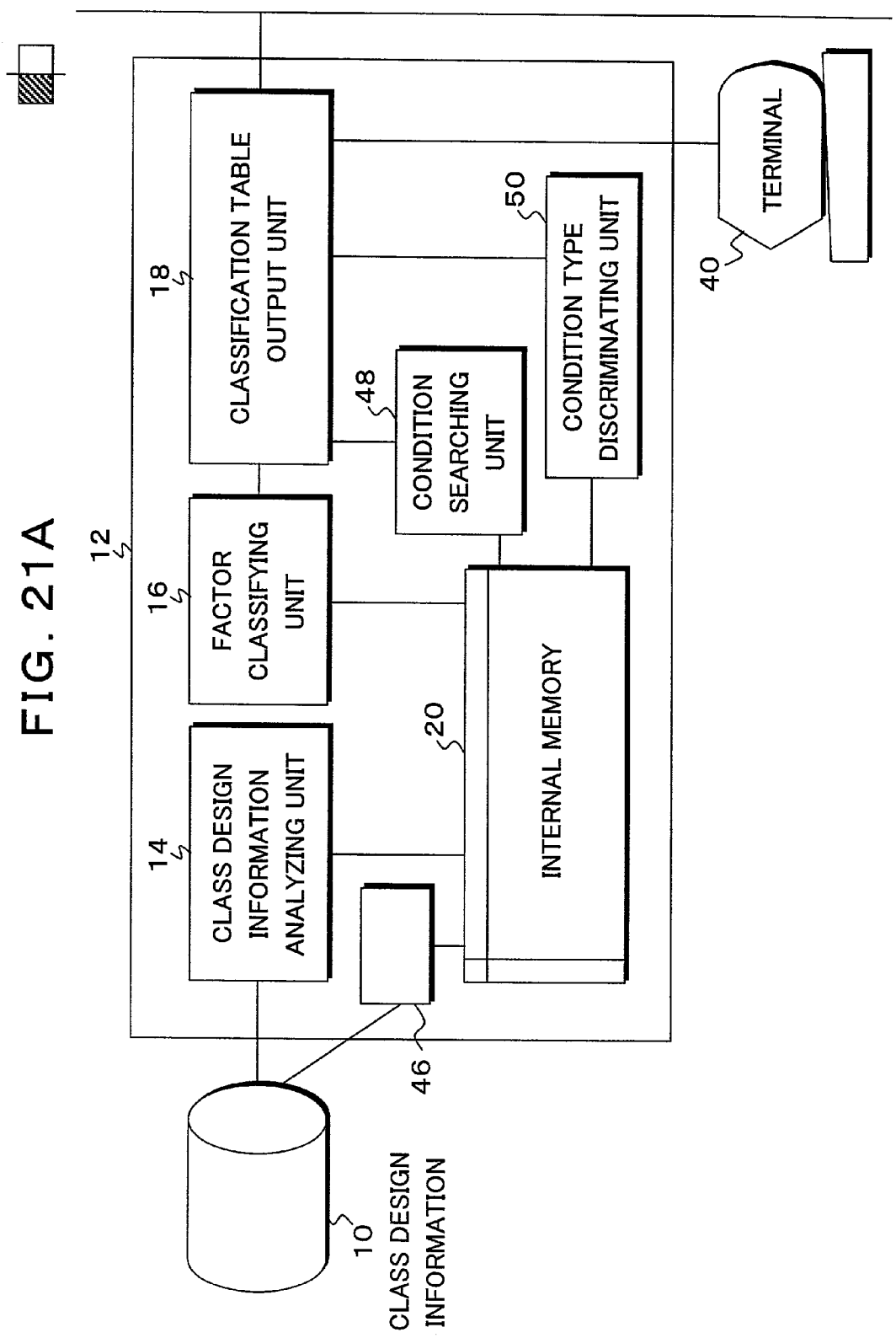

FIG. 22A

| | |
|---|---|
| CREATION DATE | |
| VERSION | |
| IMPLEMENTOR | |
| PROJECT NAME | ORDER/RECEPTION MANAGEMENT SYSTEM |
| PACKAGE NAME | DRAFT |
| CLASS NAME | OrderSheetController |
| METHOD NAME | findByOrder |
| ARGUMENT | String,OrderType |
| RETURN VALUE | ItemList |
| ACTIVATING CONDITIONS | |

| ARGUMENT ITEM No. | ARGUMENT NAME | FORM | TYPE | CONDITIONS | PROCESS | ERROR CODE | REMARKS |
|---|---|---|---|---|---|---|---|
| 1 | account | String | NORMAL ABNORMAL | REGISTERED NOT REGISTERED | | | |
| 2 | order | OrderType | | | | | |

| ATTRIBUTE ITEM No. | ATTRIBUTE NAME | FORM | TYPE | CONDITIONS | PROCESS | ERROR CODE | REMARKS |
|---|---|---|---|---|---|---|---|
| 2-1 | type | String | NORMAL ABNORMAL NORMAL NORMAL | REGISTERED NOT REGISTERED EQUIPMENT NOT EQUIPMENT | | | |
| 2-2 | id | Integer | | | | | |

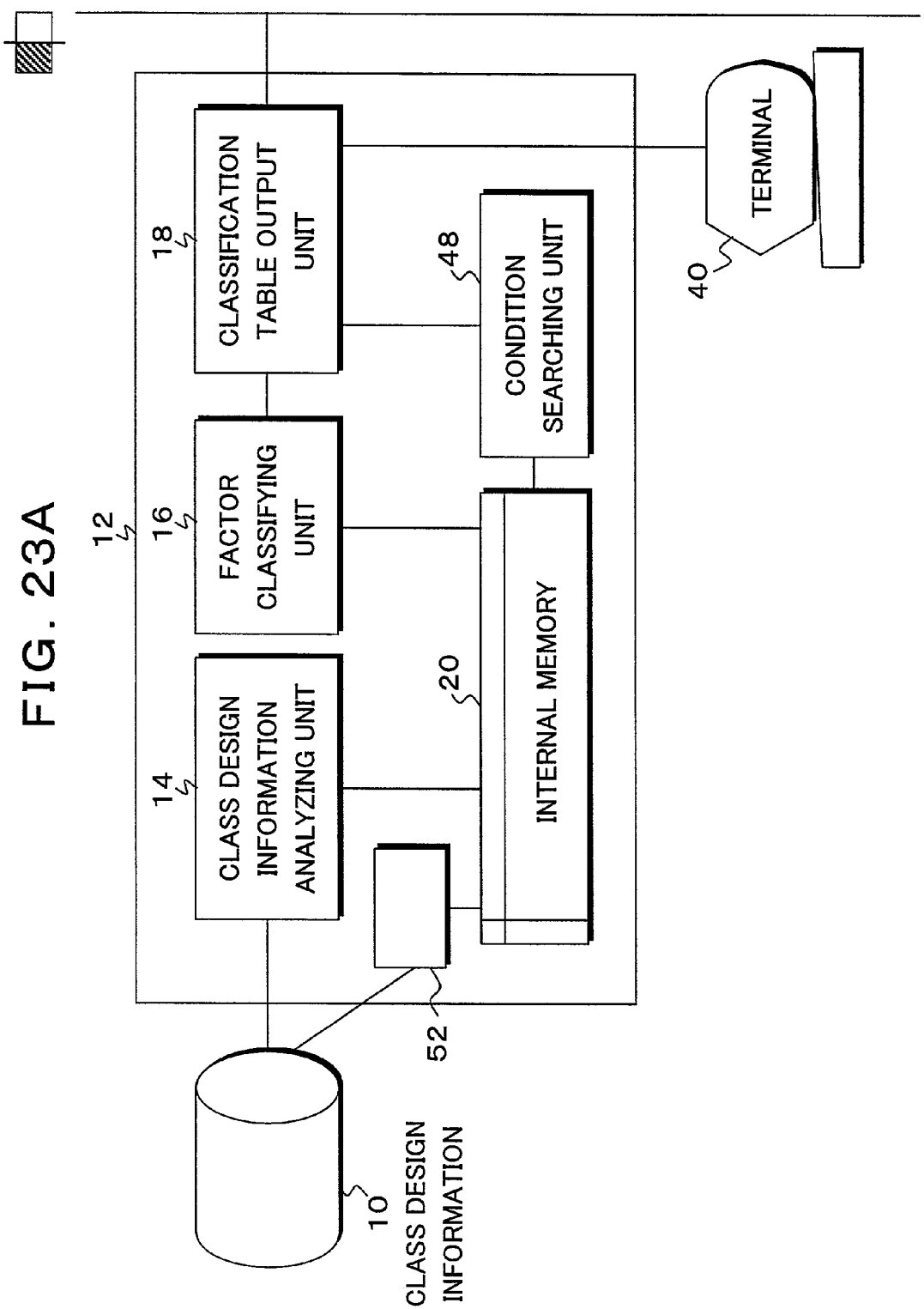

FIG. 24

| OUTLINE OF METHOD findByOrder |
|---|

SEARCH CORRESPONDING ORDER SHEET FROM ORDER DATA

[CONDITION] account IS NOT REGISTERED
UNREGISTRATION ERROR (ERROR CODE 300)

[CONDITION] order.type IS NOT REGISTERED
UNREGISTRATION ERROR (ERROR CODE 400)

[CONDITION] order.type IS EQUIPMENT
SEARCH EQUIPMENT

[CONDITION] order.type IS GENERAL EXPENSES
SEARCH GENERAL EXPENSES

FIG. 25

| OUTLINE OF METHOD findByOrder |
|---|
| SEARCH CORRESPONDING ORDER SHEET FROM ORDER DATA<br><br>[CONDITION] account IS NOT REGISTERED<br>[ERROR] 300<br><br>[CONDITION] order.type IS NOT REGISTERED<br>[ERROR] 400<br><br>[CONDITION] order.type IS EQUIPMENT<br>SEARCH EQUIPMENT<br><br>[CONDITION] order.type IS GENERAL EXPENSES<br>SEARCH GENERAL EXPENSES |

FIG. 27 conditionline="CONDITION : " @var@condition iserrorcondition="ERROR : " @errorcode

FIG. 28

| OUTLINE OF METHOD findByOrder |
|---|

SEARCH CORRESPONDING ORDER SHEET FROM ORDER DATA

CONDITION : account IS NOT REGISTERED
ERROR : 300

CONDITION : order.type IS NOT REGISTERED
ERROR : 400

CONDITION : order type IS EQUIPMENT
SEARCH EQUIPMENT

CONDITION : order type IS GENERAL EXPENSES
SEARCH GENERAL EXPENSES

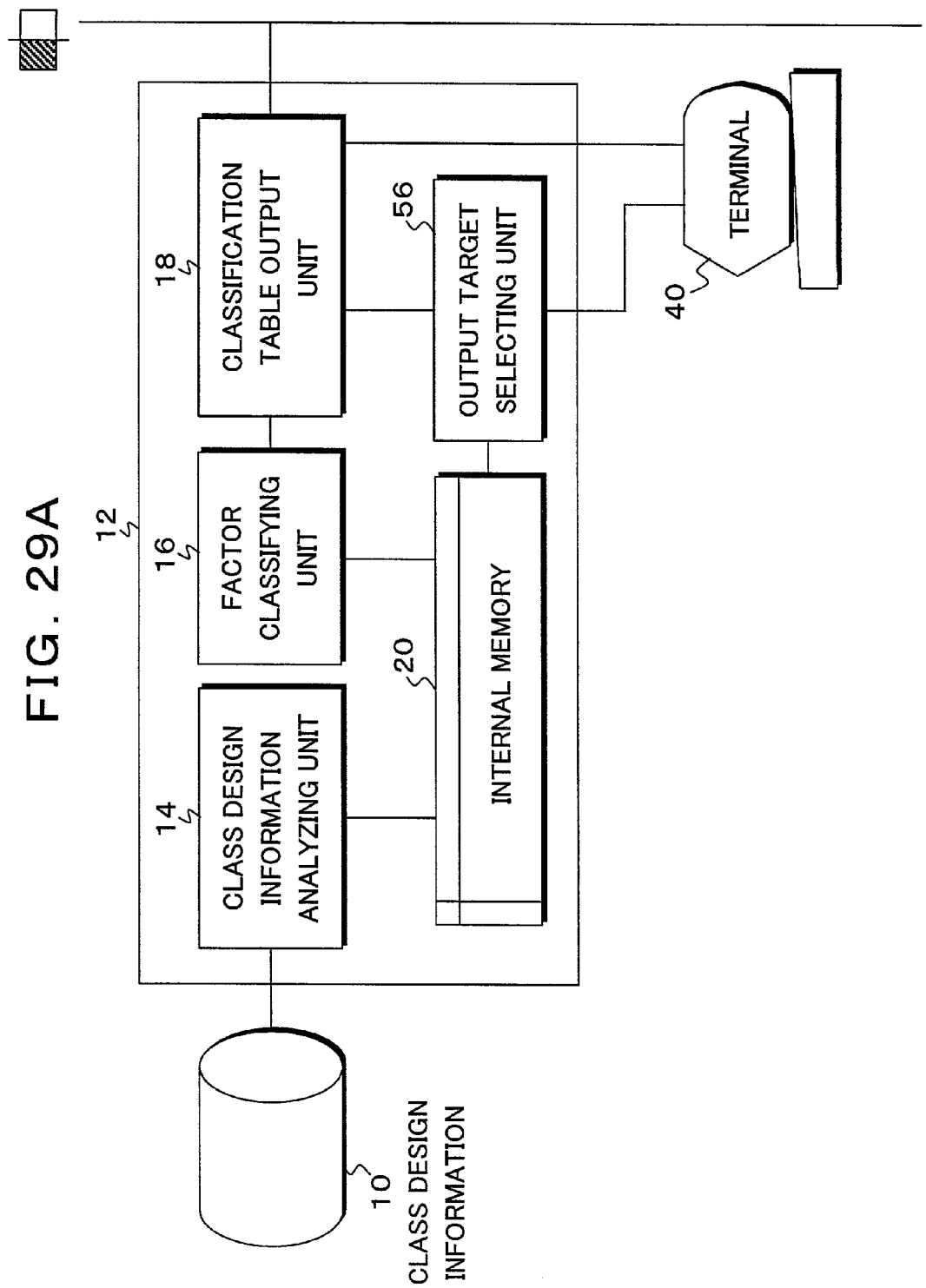

```
classOrderSheetController
{
    Item List find By Order(String account,Order Type order)
    {
        if(!is Valid Account(account))throw new find Error(300);
        if(!is Valid Order(order.type))throw new find Error(400);
            if(order.type == Setsubi) {
            return find By Order From Setsubi(account,order);
        } else {
            return find By Order From Keihi(account,order);
        }
    }
}
```

| ARGUMENT ITEM No. | ARGUMENT NAME | FORM | CONDITIONS | PROCESS | ERROR CODE | REMARKS |
|---|---|---|---|---|---|---|
| 1 | account | String | ! is ValidAccount(account)<br>! is not ValidAccount(account) | | | |
| 2 | order | OrderType | | | | |

| ATTRIBUTE ITEM No. | ATTRIBUTE NAME | FORM | CONDITIONS | PROCESS | ERROR CODE | REMARKS |
|---|---|---|---|---|---|---|
| 2-1 | type | String | order.type==Setsubi<br>order.type≠Setsubi | | | |
| 2-2 | id | Integer | | | | |

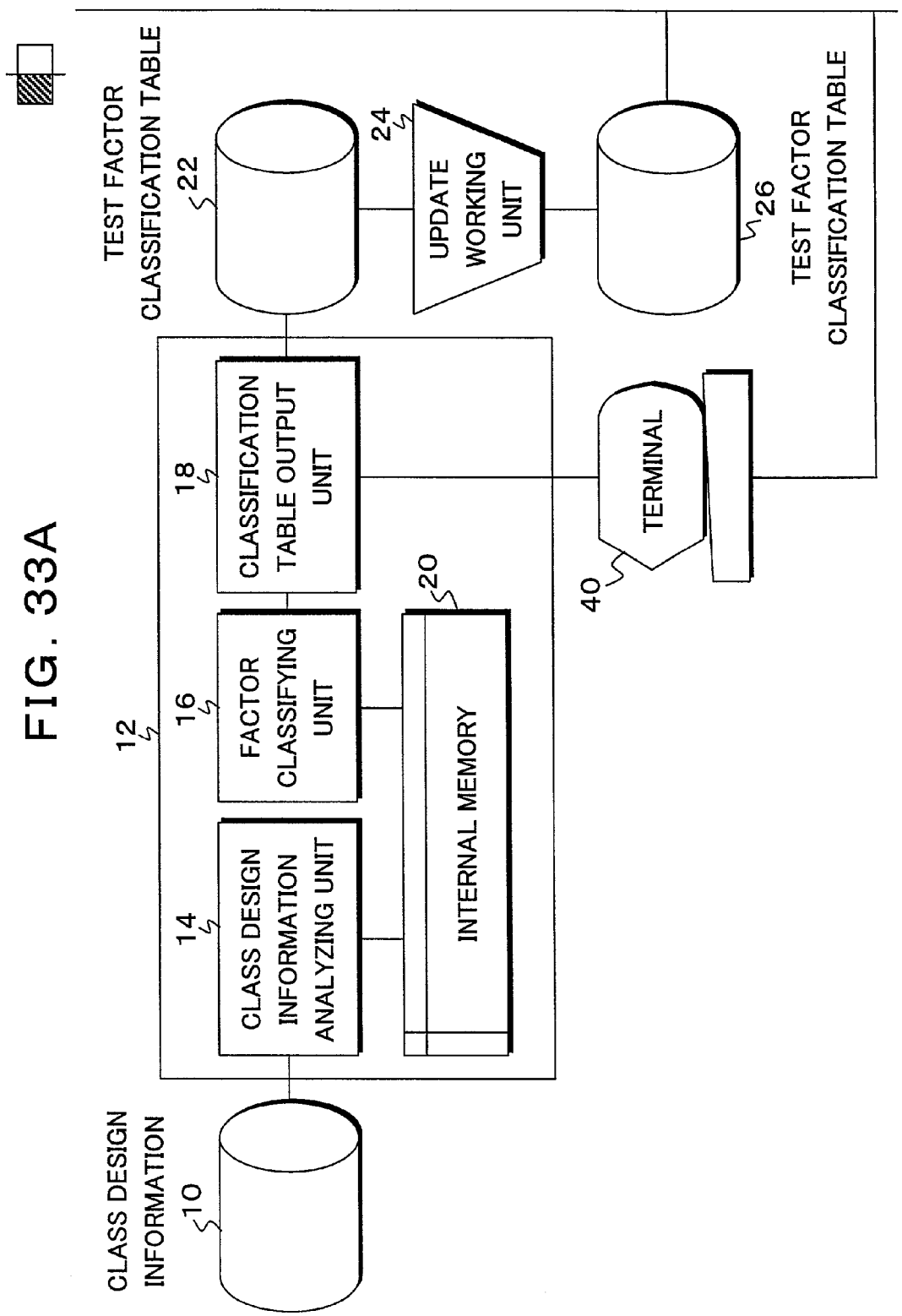

FIG. 34A

| | 110 |
|---|---|
| CREATION DATE | |
| VERSION | |
| IMPLEMENTOR | |
| PROJECT NAME | ORDER/RECEPTION MANAGEMENT SYSTEM |
| PACKAGE NAME | DRAFT |
| CLASS NAME | OrderSheetController |
| METHOD NAME | findByOrder |
| ARGUMENT | String,OrderType |
| RETURN VALUE | ItemList |
| ACTIVATING CONDITIONS | |

FIG. 34B

| ARGUMENT ITEM No. | ARGUMENT NAME | FORM | TYPE | CONDITIONS |
|---|---|---|---|---|
| 1 | account | String | ABNORMAL | VALUE IS NOT REGISTERED |
|   |   |   | NORMAL | VALUE HAS BEEN REGISTERED |
| 2 | order | OrderType |   |   |

112

| PROCESS | ERROR CODE | REMARKS |
|---|---|---|
| EXECUTE SEARCH | Err=300 |   |
|   |   |   |

FIG. 34C

| ATTRIBUTE ITEM No. | ATTRIBUTE NAME | FORM | TYPE | CONDITIONS |
|---|---|---|---|---|
| 2-1 | type | String | ABNORMAL | BUDGET KIND IS NOT REGISTERED |
| | | | NORMAL | BUDGET KIND IS EQUIPMENT |
| | | | NORMAL | BUDGET KIND IS GENERAL EXPENSES |
| 2-2 | id | Integer | ABNORMAL | 0 |
| | | | NORMAL | OTHER THAN 0 |

114

| PROCESS | ERROR CODE | REMARKS |
|---|---|---|
| SEARCH EQUIPMENT GENERAL SEARCH | Err=400 | |
| OBTAIN ORDER | Err=500 | |

FIG. 35B

| TEST ITEM No. | TARGET METHOD | TEST CONTENTS | CONFIRMATION CONTENTS | TYPE |
|---|---|---|---|---|
| 1 | findByOrder | | | ABNORMAL<br>ABNORMAL<br>ABNORMAL |
| 2 | findByOrder | | | ABNORMAL<br>ABNORMAL<br>NORMAL |
| 3 | findByOrder | | | ABNORMAL<br>NORMAL<br>ABNORMAL |
| 4 | findByOrder | | | ABNORMAL<br>NORMAL<br>NORMAL |
| 5 | findByOrder | | | ABNORMAL<br>NORMAL<br>ABNORMAL |
| 6 | findByOrder | | | ABNORMAL<br>NORMAL<br>NORMAL |
| 7 | findByOrder | | | NORMAL<br>ABNORMAL<br>ABNORMAL |
| 8 | findByOrder | | | NORMAL<br>ABNORMAL<br>NORMAL |
| 9 | findByOrder | | | NORMAL<br>NORMAL<br>ABNORMAL |
| 10 | findByOrder | | | NORMAL<br>NORMAL<br>NORMAL |
| 11 | findByOrder | | | NORMAL<br>NORMAL<br>ABNORMAL |
| 12 | findByOrder | | | NORMAL<br>NORMAL<br>NORMAL |

| ERROR CODE | ATTENTION FACTORS | CONDITIONS |
|---|---|---|
| Err=300<br>Err=400<br>Err=500 | account<br>order.type<br>order.id | VALUE IS NOT REGISTERED<br>BUDGET KIND IS NOT REGISTERED<br>0 |
| Err=300<br>Err=400 | account<br>order.type<br>order.id | VALUE IS NOT REGISTERED<br>BUDGET KIND IS NOT REGISTERED<br>OTHER THAN 0 |
| Err=300<br><br>Err=500 | account<br>order.type<br>order.id | VALUE IS NOT REGISTERED<br>BUDGET KIND IS EQUIPMENT<br>0 |
| Err=300 | account<br>order.type<br>order.id | VALUE IS NOT REGISTERED<br>BUDGET KIND IS EQUIPMENT<br>OTHER THAN 0 |
| Err=300<br><br>Err=500 | account<br>order.type<br>order.id | VALUE IS NOT REGISTERED<br>BUDGET KIND IS GENERAL EXPENSES<br>0 |
| Err=300 | account<br>order.type<br>order.id | VALUE IS NOT REGISTERED<br>BUDGET KIND IS GENERAL EXPENSES<br>OTHER THAN 0 |
| Err=400<br>Err=500 | account<br>order.type<br>order.id | VALUE HAS BEEN REGISTERED<br>BUDGET KIND IS NOT REGISTERED<br>0 |
| Err=400 | account<br>order.type<br>order.id | VALUE HAS BEEN REGISTERED<br>BUDGET KIND IS NOT REGISTERED<br>OTHER THAN 0 |
| Err=500 | account<br>order.type<br>order.id | VALUE HAS BEEN REGISTERED<br>BUDGET KIND IS EQUIPMENT<br>0 |
|  | account<br>order.type<br>order.id | VALUE HAS BEEN REGISTERED<br>BUDGET KIND IS EQUIPMENT<br>OTHER THAN 0 |
| Err=500 | account<br>order.type<br>order.id | VALUE HAS BEEN REGISTERED<br>BUDGET KIND IS GENERAL EXPENSES<br>0 |
|  | account<br>order.type<br>order.id | VALUE HAS BEEN REGISTERED<br>BUDGET KIND IS GENERAL EXPENSES<br>OTHER THAN 0 |

| PERSON WHO CONFIRMS | DATE OF CONFIRMATION | RESULT | REMARKS |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

FIG. 36B

| TEST ITEM No. | TARGET METHOD | TEST CONTENTS | CONFIRMATION CONTENTS | TYPE | ERROR CODE | ATTENTION FACTORS |
|---|---|---|---|---|---|---|
| 1 | findByOrder | | | ABNORMAL<br>NORMAL<br>NORMAL | Err=300 | account<br>order.type<br>order.id |
| 2 | findByOrder | | | ABNORMAL<br>NORMAL<br>NORMAL | Err=300 | account<br>order.type<br>order.id |
| 3 | findByOrder | | | NORMAL<br>ABNORMAL<br>NORMAL | Err=400 | account<br>order.type<br>order.id |
| 4 | findByOrder | | | NORMAL<br>NORMAL<br>ABNORMAL | Err=500 | account<br>order.type<br>order.id |
| 5 | findByOrder | | | NORMAL<br>NORMAL<br>NORMAL | | account<br>order.type<br>order.id |
| 6 | findByOrder | | | NORMAL<br>NORMAL<br>ABNORMAL | Err=500 | account<br>order.type<br>order.id |
| 7 | findByOrder | | | NORMAL<br>NORMAL<br>NORMAL | | account<br>order.type<br>order.id |

| CONDITIONS | PERSON WHO CONFIRMS | DATE OF CONFIRMATION | RESULT | REMARKS  |
|---|---|---|---|---|
| VALUE IS NOT REGISTERED BUDGET KIND IS EQUIPMENT OTHER THAN 0 | | | | |
| VALUE IS NOT REGISTERED BUDGET KIND IS GENERAL EXPENSES OTHER THAN 0 | | | | |
| VALUE HAS BEEN REGISTERED BUDGET KIND IS NOT REGISTERED OTHER THAN 0 | | | | |
| VALUE HAS BEEN REGISTERED BUDGET KIND IS EQUIPMENT 0 | | | | |
| VALUE HAS BEEN REGISTERED BUDGET KIND IS EQUIPMENT OTHER THAN 0 | | | | |
| VALUE HAS BEEN REGISTERED BUDGET KIND IS GENERAL EXPENSES 0 | | | | |
| VALUE HAS BEEN REGISTERED BUDGET KIND IS GENERAL EXPENSES OTHER THAN 0 | | | | |

FIG. 37A

| | 124 |
|---|---|
| CREATION DATE | |
| VERSION | |
| IMPLEMENTOR | |
| PROJECT NAME | ORDER/RECEPTION MANAGEMENT SYSTEM |
| PACKAGE NAME | DRAFT |
| CLASS NAME | OrderSheetController |
| METHOD NAME | findByOrder |
| ARGUMENT | String,OrderType |
| RETURN VALUE | ItemList |
| ACTIVATING CONDITIONS | |

FIG. 37B

| ARGUMENT ITEM No. | ARGUMENT NAME | FORM | TYPE | CONDITIONS |
|---|---|---|---|---|
| 1 | account | String | ABNORMAL | VALUE IS NOT REGISTERED |
| | | | NORMAL | VALUE BELONGS TO HEAD OFFICE |
| | | | NORMAL | VALUE BELONGS TO BRANCH |
| 2 | order | OrderType | | |

126

| PROCESS | ERROR CODE | REMARKS |
|---|---|---|
| EXECUTE SEARCH | | |
| EXECUTE BRANCH-LIMITED SEARCH | Err=300 | |

| ATTRIBUTE ITEM No. | ATTRIBUTE NAME | FORM | TYPE | CONDITIONS |
|---|---|---|---|---|
| 2-1 | type | String | ABNORMAL | BUDGET KIND IS NOT REGISTERED |
|  |  |  | NORMAL | BUDGET KIND IS EQUIPMENT |
|  |  |  | NORMAL | BUDGET KIND IS GENERAL EXPENSES |
| 2-2 | id | Integer |  |  |

| PROCESS | ERROR CODE | REMARKS |
|---|---|---|
| SEARCH EQUIPMENT GENERAL SEARCH | Err=400 |  |

| DATE | 2001/2/16 |
| IMPLEMENTOR | YAMAMOTO |
| VERSION | 2 |
| PROJECT NAME | ORDER/RECEPTION MANAGEMENT SYSTEM |
| CLASS NAME | OrderSheetController |

FIG. 38B

| TEST ITEM No. | TARGET METHOD | TEST CONTENTS | CONFIRMATION CONTENTS | TYPE | ERROR CODE | ATTENTION FACTORS |
|---|---|---|---|---|---|---|
| 1 | findByOrder | | | ABNORMAL ABNORMAL | Err=300 Err=400 | account order.type |
| 2 | findByOrder | | | ABNORMAL NORMAL | Err=300 | account order.type |
| 3 | findByOrder | | | ABNORMAL NORMAL | Err=300 | account order.type |
| 4 | findByOrder | | | NORMAL ABNORMAL | Err=400 | account order.type |
| 5 | findByOrder | | | NORMAL NORMAL | | account order.type |
| 6 | findByOrder | | | NORMAL NORMAL | | account order.type |
| 7 | findByOrder | | | NORMAL ABNORMAL | Err=400 | account order.type |
| 8 | findByOrder | | | NORMAL NORMAL | | account order.type |
| 9 | findByOrder | | | NORMAL NORMAL | | account order.type |

FIG. 38C

| CONDITIONS | PERSON WHO CONFIRMS | DATE OF CONFIRMATION | RESULT | REMARKS |
|---|---|---|---|---|
| VALUE IS NOT REGISTERED BUDGET KIND IS NOT REGISTERED | | | | |
| VALUE IS NOT REGISTERED BUDGET KIND IS EQUIPMENT | | | | |
| VALUE IS NOT REGISTERED BUDGET KIND IS GENERAL EXPENSES | | | | |
| VALUE BELONGS TO HEAD OFFICE BUDGET KIND IS NOT REGISTERED | | | | |
| VALUE BELONGS TO HEAD OFFICE BUDGET KIND IS EQUIPMENT | | | | |
| VALUE BELONGS TO HEAD OFFICE BUDGET KIND IS GENERAL EXPENSES | | | | |
| VALUE BELONGS TO BRANCH BUDGET KIND IS NOT REGISTERED | | | | |
| VALUE BELONGS TO BRANCH BUDGET KIND IS EQUIPMENT | | | | |
| VALUE BELONGS TO BRANCH BUDGET KIND IS GENERAL EXPENSES | | | | |

FIG. 39A

| DATE | 2001/2/16 |
| IMPLEMENTOR | YAMAMOTO |
| VERSION | 2 |
| PROJECT NAME | ORDER/RECEPTION MANAGEMENT SYSTEM |
| CLASS NAME | OrderSheetController |

| TEST ITEM No. | TARGET METHOD | TEST CONTENTS | CONFIRMATION CONTENTS | TYPE | ERROR CODE | ATTENTION FACTORS |
|---|---|---|---|---|---|---|
| 1 | findByOrder | | | ABNORMAL<br>ABNORMAL | Err=300<br>Err=400 | account<br>order.type |
| 2 | findByOrder | | | ABNORMAL<br>NORMAL | Err=300 | account<br>order.type |
| 3 | findByOrder | | | NORMAL<br>ABNORMAL | Err=400 | account<br>order.type |
| 4 | findByOrder | | | NORMAL<br>NORMAL | | account<br>order.type |
| 5 | findByOrder | | | NORMAL<br>NORMAL | | account<br>order.type |
| 6 | findByOrder | | | NORMAL<br>NORMAL | | account<br>order.type |
| 7 | findByOrder | | | NORMAL<br>NORMAL | | account<br>order.type |

FIG. 39C

| CONDITIONS | PERSON WHO CONFIRMS | DATE OF CONFIRMATION | RESULT | REMARKS |
|---|---|---|---|---|
| VALUE IS NOT REGISTERED BUDGET KIND IS NOT REGISTERED | | | | |
| VALUE IS NOT REGISTERED BUDGET KIND IS EQUIPMENT | | | | |
| VALUE BELONGS TO HEAD OFFICE BUDGET KIND IS NOT REGISTERED | | | | |
| VALUE BELONGS TO HEAD OFFICE BUDGET KIND IS EQUIPMENT | | | | |
| VALUE BELONGS TO HEAD OFFICE BUDGET KIND IS GENERAL EXPENSES | | | | |
| VALUE BELONGS TO BRANCH BUDGET KIND IS EQUIPMENT | | | | |
| VALUE BELONGS TO BRANCH BUDGET KIND IS GENERAL EXPENSES | | | | |

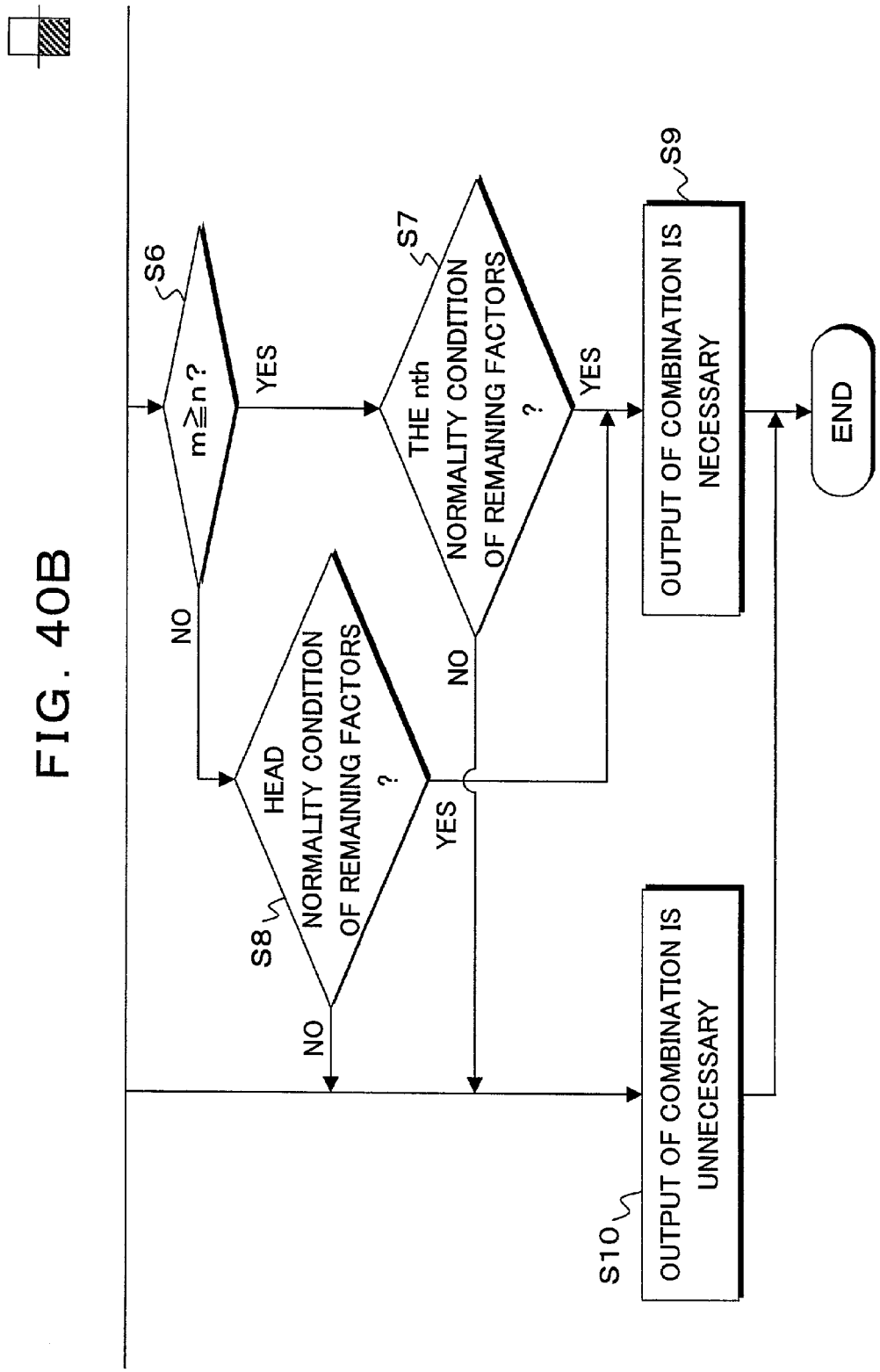

FIG. 41A

| DATE | 2001/2/16 |
| IMPLEMENTOR | YAMAMOTO |
| VERSION | 2 |
| PROJECT NAME | ORDER/RECEPTION MANAGEMENT SYSTEM |
| CLASS NAME | OrderSheetController |

140

| TEST ITEM No. | TARGET METHOD | TEST CONTENTS | CONFIRMATION CONTENTS | TYPE | ERROR CODE | ATTENTION FACTORS |
|---|---|---|---|---|---|---|
| 1 | findByOrder | | | ABNORMAL<br>ABNORMAL | Err=300<br>Err=400 | account<br>order.type |
| 2 | findByOrder | | | ABNORMAL<br>NORMAL | Err=300 | account<br>order.type |
| 3 | findByOrder | | | ABNORMAL<br>NORMAL | Err=300 | account<br>order.type |
| 4 | findByOrder | | | NORMAL<br>ABNORMAL | Err=400 | account<br>order.type |
| 5 | findByOrder | | | NORMAL<br>NORMAL | | account<br>order.type |
| 6 | findByOrder | | | NORMAL<br>ABNORMAL | Err=400 | account<br>order.type |
| 7 | findByOrder | | | NORMAL<br>NORMAL | | account<br>order.type |

FIG. 41C

| CONDITIONS | PERSON WHO CONFIRMS | DATE OF CONFIRMATION | RESULT | REMARKS |
|---|---|---|---|---|
| VALUE IS NOT REGISTERED BUDGET KIND IS NOT REGISTERED | | | | |
| VALUE IS NOT REGISTERED BUDGET KIND IS EQUIPMENT | | | | |
| VALUE IS NOT REGISTERED BUDGET KIND IS GENERAL EXPENSES | | | | |
| VALUE BELONGS TO HEAD OFFICE BUDGET KIND IS NOT REGISTERED | | | | |
| VALUE BELONGS TO HEAD OFFICE BUDGET KIND IS EQUIPMENT | | | | |
| VALUE BELONGS TO BRANCH BUDGET KIND IS NOT REGISTERED | | | | |
| VALUE BELONGS TO BRANCH BUDGET KIND IS GENERAL EXPENSES | | | | |

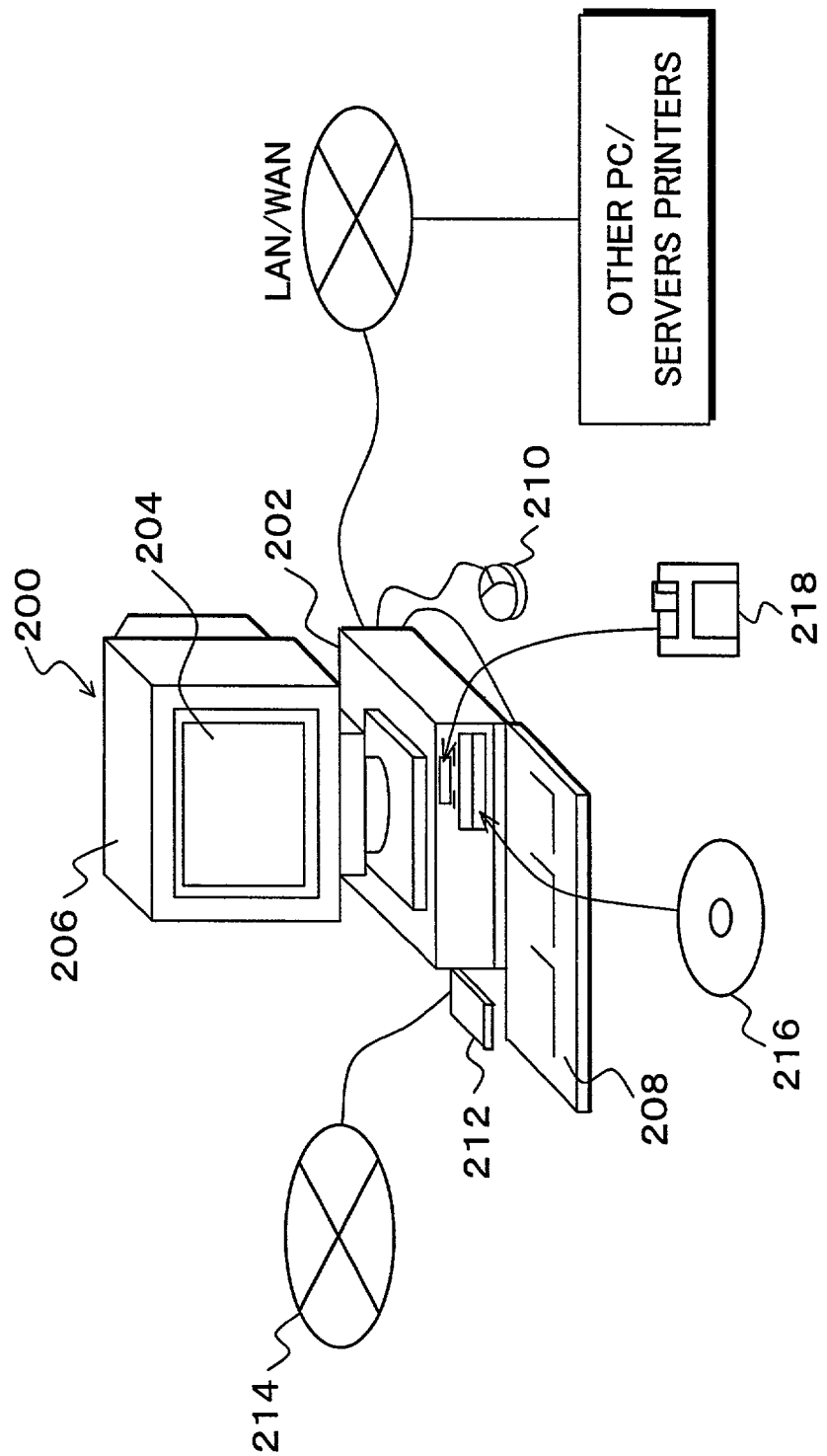

TEST SPECIFICATION FORMATION SUPPORTING APPARATUS, METHOD, AND PROGRAM, AND RECORDING MEDIUM

BACKGROUND OF THE INVENTION

1. Field of the Invention

The invention relates to test specification formation supporting apparatus, method, and program for forming a test specification of software designed by an object orientation by using a test factor classification table and to its recording medium. More particularly, the invention relates to test specification formation supporting apparatus, method, and program for automatically forming a template of a test factor classification table by using class design information and to its recording medium.

2. Description of the Related Arts

Hitherto, it is known that in order to form software of high quality, it is necessary that a test specification including all necessary test items is formed, tests are executed in accordance with the test specification, and results are confirmed. However, the operation to form the test specification including all the test items is extremely difficult and the number of necessary steps is also large. In many cases, therefore, a sufficient number of test items are not found or executed. To solve such a problem, there is a method whereby inputs of programs to be tested are listed and the operations of the programs corresponding to combinations of input data are expressed in a form of a test factor classification table. If information of the test factor classification table is used, an application such that a combination of arguments to be tested is mechanically formed and used as a test specification and, further, an application such that the tests are automatically executed are considered. An apparatus which realizes such a method has already been known.

However, manual operations are still necessary in order to form the test factor classification table, and a problem such as dropout of test items due to omission of writing into the test factor classification table, or the like cannot be fundamentally solved. Although there is also an idea that source codes themselves of the program are analyzed and test factors and conditions are extracted, since the conditions introduced for the sake of convenience of the program, or the like are also extracted, it is necessary that confirmation is made by the human being. Further, also in case of considering a combination of the extracted test factors, there is a problem such that if the combinations are mechanically formed, the number of combinations increases. It is indispensable to form the combinations by the manual operation. At this time, a difference of whether the conditions of the test factors to be combined relate to the normal operation of the program or the abnormal operation exercises a large influence when considering the combinations of the test factors. For example, the conditions regarding the abnormal operation of the program are usually solely tested, and even if the tests in which a number of such conditions are combined are executed, in many cases, they are meaningless. In the conventional test specification forming apparatus, however, nothing is considered with regard to a type of whether the operation is the normal operation or the abnormal operation, and it becomes a cause of a wasteful increase in number of combinations. According to software development based on the object orientation, there is a case of using a unit called a component obtained by collecting a group of classes for providing a certain function. In this case, it is requested that the test specification is also formed for the function which is provided for an external unit by the component. Since this corresponds to a method in which a specific class in the component is opened to the external unit, at present, the human being searches the method, resulting in an increase in number of steps of forming the test specification.

SUMMARY OF THE INVENTION

According to the invention, test specification formation supporting apparatus, method, and program for efficiently forming a test specification without omission for testing object-oriented software are provided and its recording medium is also provided.

A test specification formation supporting apparatus of the invention comprises a test factor classification table forming unit and a test specification forming unit. The test factor classification table forming unit analyzes class design information of software designed by an object orientation and forms a template of a test factor classification table in which test factors which influence the operation of a method as a test target and conditions of the test factors are listed. The test specification forming unit forms a test specification by combining the conditions described in the test factor classification table completed on the basis of the template of the test factor classification table. The test factor classification table forming unit comprises: a class design information analyzing unit which inputs the class design information of a designated class and analyzes it; a factor classifying unit which extracts test factors including an array of arguments of the method and conditions of the test factors and header information which is used for the test factor classification table from an analysis result of the class design information; and a classification table output unit which shapes the extracted test factors and header information into a predetermined table format (format) and outputs the template of the test factor classification table. The test specification forming unit comprises: a classification table analyzing unit which inputs the test factor classification table and analyzes it; a test factor combination forming unit which selects one of the conditions of the test factors every test factor from the analysis result of the classification table, forms a combination lest the selected condition is overlapped, and extracts the header information which is used in the test specification; and a test specification output unit which shapes all of the combinations and the header information formed and extracted by the combination forming unit into a predetermined format and outputs the test specification. According to the invention as mentioned above, when the software designed on the basis of the object-oriented idea is tested, the template of the test factor classification table is automatically formed by using the design information of the class, thereby reducing the number of steps. Since the test factor classification table is presented as a template to the user, it is sufficient that the user completes the test factor classification table merely by filling empty units of the template, so that the omission of description of the conditions can be prevented. By automatically forming the test specification by combining the conditions of the test factor classification table completed by updating the template, the test specification without the omission can be automatically and efficiently formed.

In the automatic formation of the test factor classification table according to the invention, as a method of the class designated by the user, its class design information is referred to, the argument array and its conditions are fundamentally obtained as test factors, and the argument array and its conditions of the method are automatically written into the relevant column of the test factor classification table, thereby forming the template. The information which is automatically written into the test factor classification table by the invention is as follows.

(1) Argument array of the method
(2) Attribute value recursively developed from the class design information if the arguments of the method are the class
(3) Conditions in the method extracted from the class design information having a structure
(4) Conditions in the method extracted from the class design information and a type about the normal system or the abnormal system
(5) Conditions in the method extracted from the class design information described by a document
(6) Conditions in the method extracted from the design information described by a document and the type about the normal system or the abnormal system
(7) Conditions in the method extracted from the design information described by the document and a type according to a description by user designation
(8) Conditions in the method extracted from a source code in addition to the conditions in the method extracted from the class design information The information which is automatically written into the test factor classification table will be explained more in detail hereinbelow.

If the type of the extracted test factor is the class, the factor classifying unit of the test factor classification table forming unit recursively executes a process for developing an attribute value with reference to the corresponding class design information and extracting the developed attribute value as a test factor. The test factor classification table forming unit further has a development upper limit number designating unit which designates a development upper limit number of the attribute value. The factor classifying unit does not develop the attribute value exceeding the upper limit number designated by the development upper limit number designating unit. The test factor classification table forming unit further has an unnecessary-development class designating unit which designates a class in which development of the attribute value is unnecessary. The factor classifying unit does not develop the attribute value of the class designated by the unnecessary-development class designating unit upon development of the attribute value. The test factor classification table forming unit further has a method design information analyzing unit which inputs the structured class design information regarding processing contents of the designated method and analyzes it. The factor classifying unit extracts branching conditions described in the processing contents of the method from an analysis result and extracts variables such as arguments constructing the branching conditions and the like and conditions of the arguments as test factors. The classification table output unit shapes the extracted test factors and header information into a predetermined table format and outputs a template of the test factor classification table. The test factor classification table forming unit further has a condition type discriminating unit which discriminates whether the branching conditions indicate a normality process or an abnormality process. The determined type of whether the process is the normality process or the abnormality process is also shown in the test factor classification table. The test factor classification table forming unit further has: a method contents description sentence analyzing unit which inputs design information described by a sentence regarding the processing contents of the designated method and analyzes a description of the conditions written by a specific notation; and a condition searching unit which extracts the branching conditions described in the processing contents of the method from the analysis result of the design information and searches the variables such as arguments constructing the branching conditions and the like and conditions of the arguments as test factors. The classification table output unit shapes the test factors extracted by the factor classifying unit and condition searching unit into a predetermined table format and outputs a template of the test factor classification table. The condition searching unit further discriminates whether the branching conditions written in the sentence by the specific notation indicates the normality process or the abnormality process. The determined type of whether the process is the normality process or the abnormality process is also written in the test factor classification table.

The test factor classification table forming unit further has a notation designating unit which designates the notation of the conditions extracted from the sentence in which the processing contents of the method have been described and the notation of the type of whether the process is the normality process or the abnormality process. The test factor classification table forming unit further has an output target selecting unit which selects a method from the design information by a designated method selection reference, thereby allowing the test factor classification table as an output target to be formed. The test factor classification table forming unit further has an output target selecting unit which selects a class and a method from the design information by the designated class selection reference, thereby allowing the test factor classification table as an output target to be formed. The test factor classification table forming unit further has: a source code analyzing unit which inputs source codes of the program corresponding to the class design information and analyzes them; and a source condition searching unit which extracts a condition sentence of the method as a target from an analysis result of the source code, extracts the variables and condition sentence used in the conditions as test factors, and allows them to be added into the test factor classification table formed from the class design information.

If the type showing whether the conditions indicate the normality process or the abnormality process has been also written in the test factor classification table, the test specification forming unit further has a combination evaluating unit which designates one of a plurality of normality conditions classified into the normality process in the same test factor into a representative normality condition and combines it with the abnormality condition classified into the abnormality process when the conditions described in the test factor classification table are combined. The test specification forming unit further has a combination evaluating unit which restricts normality conditions which can be combined with respect to the combinations of only the normality conditions when the conditions described in the test factor classification table are combined.

The invention also provides a test specification formation supporting method comprising:

a classification table forming step which analyzes class design information of software designed by an object orientation and forms a template of a test factor classification table in which test factors which influence the operation of a method as a test target and conditions of the test factors are listed; and a test specification forming step which forms a test specification by combining conditions described in the test factor classification table completed on the basis of the template of the test factor classification table.

According to the classification table forming step, the class design information of the designated class is inputted and analyzed;

test factors including an array of arguments of the method and conditions of the arguments and header information which is used in the test factor classification table are extracted from an analysis result of the class design information; and the extracted test factors and header information are shaped into a predetermined table format, and the template of the test factor classification table is outputted.

According to the test specification forming step, the test factor classification table is inputted and analyzed;

one of the conditions of the test factors is selected every test factor from an analysis result of the classification table, a combination is formed lest it is overlapped, and header information which is used for a test specification is extracted; and all of the formed combinations and the header information are shaped into a predetermined format and the test specification is outputted. Other details of the test specification formation supporting method are fundamentally the same as those in case of the apparatus construction.

According to the invention, there is provided a test specification formation supporting program for allowing a computer to execute:

a classification table forming step which analyzes class design information of software designed by an object orientation and forms a template of a test factor classification table in which test factors which influence the operation of a method as a test target and conditions of the test factors are listed; and a test specification forming step which forms a test specification by combining conditions described in the test factor classification table completed on the basis of the template of the test factor classification table.

The classification table forming step of the test specification formation supporting program allows the computer to execute:

a step which inputs the class design information of the designated class and analyzes it;

a step which extracts test factors including an array of arguments of the method and conditions of the test factors and header information which is used in the test factor classification table from an analysis result of the class design information; and a step which shapes the extracted test factors and header information into a predetermined table format and outputs the template of the test factor classification table, and the test specification forming step allows the computer to execute:

a step which inputs a test factor classification table and analyzes it;

a step which selects one of the conditions from an analysis result of the classification table every test factor, forms a combination lest it is overlapped, and extracts the header information which is used in the test specification; and a step which shapes all of the formed combinations and header information into a predetermined format and outputs the test specification.

According to the invention, a computer readable recording medium which stores a test specification formation supporting program is provided. The test specification formation supporting program stored in the recording medium allows a computer to execute: a classification table forming step which analyzes class design information of software designed by an object orientation and forms a template of a test factor classification table in which test factors which influence the operation of a method as a test target and conditions of the test factors are listed; and a test specification forming step which forms a test specification by combining conditions described in the test factor classification table completed on the basis of the template of the test factor classification table.

According to the invention, test factor classification table formation supporting apparatus, method, and program, and a recording medium are further provided. For example, the test factor classification table formation supporting apparatus comprises: a class design information analyzing unit which inputs class design information of a designated class of software designed by an object orientation and analyzes it; a factor classifying unit which extracts test factors including an array of arguments of a method and conditions of the test factors and header information which is used in a test factor classification table from an analysis result of the class design information; and a classification table output unit which shapes the extracted test factors and header information into a predetermined table format and outputs a template of the test factor classification table.

The above and other objects, features, and advantages of the present invention will become more apparent from the following detailed description with reference to the drawings.

BRIEF DESCRIPTION OF THE DRAWINGS

FIGS. 1A and 1B are block diagrams of the first embodiment of the invention;

FIGS. 2A to 2C are explanatory diagrams of class design information serving as an input in the first embodiment in FIGS. 1A and 1B;

FIG. 3 is a flowchart for a factor classifying process in the first embodiment in FIGS. 1A and 1B;

FIGS. 4A and 4B are explanatory diagrams of a test factor classification table formed by the first embodiment in FIGS. 1A and 1B;

FIGS. 5A and 5B are explanatory diagrams of a test factor classification table completed by inputting contents into the table of FIGS. 4A and 4B;

FIGS. 8A to 8C are explanatory diagrams of a test specification formed by the first embodiment in FIGS. 1A and 1B;

FIGS. 11A to 11C are explanatory diagrams of a test factor classification table formed in the second embodiment of the invention;

FIGS. 12A and 12B are block diagrams of the third embodiment of the invention;

FIGS. 18A and 18B are block diagrams of the fifth embodiment of the invention;

FIG. 19 is an explanatory diagram of structured class design information serving as an input in the fifth embodiment in FIGS. 18A and 18B;

FIGS. 20A to 20C are explanatory diagrams of a test factor classification table formed by the fifth embodiment in FIGS. 18A and 18B;

FIGS. 21A and 21B are block diagrams of the sixth embodiment of the invention;

FIGS. 22A to 22C are explanatory diagrams of a test factor classification table formed by the sixth embodiment in FIGS. 21A and 21B;

FIGS. 23A and 23B are block diagrams of the seventh embodiment of the invention;

FIG. 24 is an explanatory diagram of class design information described by sentences serving as an input in the seventh embodiment in FIGS. 23A and 23B;

FIG. 25 is an explanatory diagram of class design information described by sentences serving as an input in the eighth embodiment of the invention;

FIG. 27 is an explanatory diagram of notion designation serving as an input in the ninth embodiment in FIGS. 26A and 26B;

FIG. 28 is an explanatory diagram of design information described by sentences serving as an input in the ninth embodiment in FIGS. 26A and 26B;

FIGS. 29A and 29B are block diagrams of the tenth embodiment of the invention;

FIG. 31 is an explanatory diagram of source codes serving as an input in the twelfth embodiment in FIGS. 30A and 30B;

FIGS. 32A to 32C are explanatory diagrams of a test factor classification table formed by the twelfth embodiment in FIGS. 30A and 30B;

FIGS. 33A and 33B are block diagrams of the thirteenth embodiment of the invention;

FIGS. 34A to 34C are explanatory diagrams of a test factor classification table serving as an input in the thirteenth embodiment in FIGS. 33A and 33B;

FIGS. 35A to 35D are explanatory diagrams of a test specification formed without restricting a combination;

FIGS. 36A to 36C are explanatory diagrams of a test specification formed by restricting the number of abnormality conditions in the thirteenth embodiment in FIGS. 33A and 33B;

FIGS. 37A to 37C are explanatory diagrams of a test factor classification table serving as an input in the fourteenth embodiment of the invention;

FIGS. 38A to 38C are explanatory diagrams of a test specification formed without restricting a combination;

FIGS. 39A to 39C are explanatory diagrams of a test specification formed by restricting the number of normality conditions which are combined with abnormality conditions in the fourteenth embodiment of the invention;

FIGS. 40A and 40B are flowcharts for a combination evaluation processing unit according to the fifteenth embodiment of the invention;

FIGS. 41A to 41C are explanatory diagrams of a test specification formed by the fifteenth embodiment of the invention;

FIG. 42 is an explanatory diagram of a computer system using a recording medium which stores a 3-dimensional analysis model forming program of the invention.

DETAILED DESCRIPTION OF THE PREFERRED EMBODIMENTS

Figure 1B:
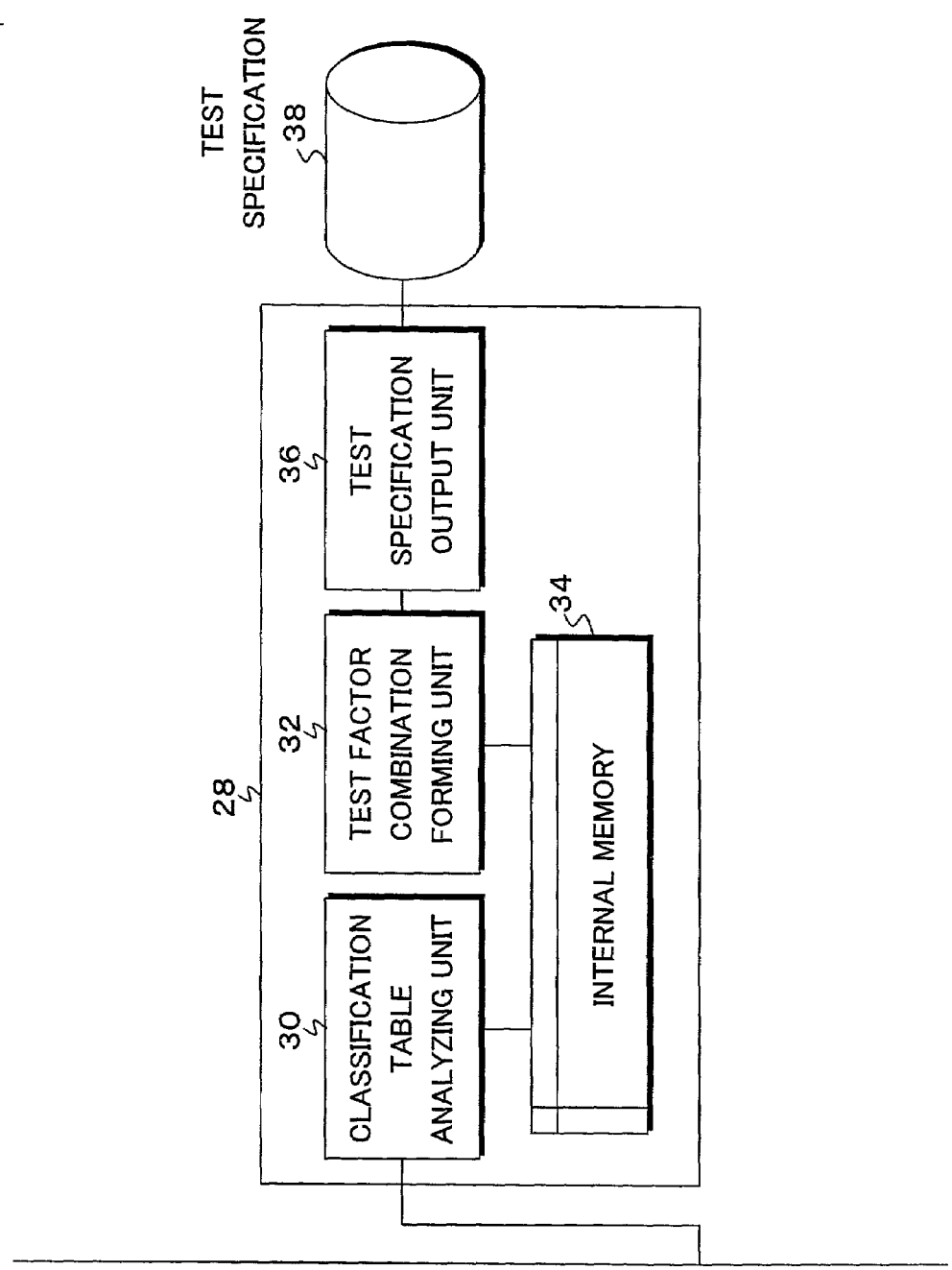

FIGS. 1A and 1B are block diagrams showing a functional construction of a test specification formation supporting apparatus according to the invention. This functional construction is realized by executing a program by a computer in which a test specification formation supporting program of the invention has been installed. The test specification formation supporting apparatus according to the invention is mainly classified into two units of a test factor classification table forming unit 12 and a test specification forming unit 28. The test factor classification table forming unit 12 forms a test factor classification table 22 in which test factors which influence the operation of a method as a test target and conditions of the test factors have been listed with respect to class design information 10, as a target, of software designed by an object orientation and provides it as a template to the user. The test factor classification table forming unit 12 comprises a class design information analyzing unit 14, a factor classifying unit 16, a classification table output unit 18, and an internal memory 20. Each processing function of the test factor classification table forming unit 12 operates by receiving designation by the operation of a keyboard or the like by the user via a terminal 40. In case of forming the template of the test factor classification table 22, the user designates a class and a method to be outputted from the terminal 40. By receiving the designation from the terminal 40, the class design information analyzing unit 14 of the test factor classification table forming unit 12 reads the designated class design information 10, analyzes its contents, and stores an analysis result into the internal memory 20. The factor classifying unit 16 searches an array of arguments of the method designated by the terminal 40 from the analysis result of the class design information stored in the internal memory 20 and lists the searched argument array of the method as a test factor. The classification table output unit 18 searches data such as header information and the like necessary for the test factor classification table 22 from the analysis result of the class design information stored in the internal memory 20, shapes the test factor comprising an argument array listed by the factor classifying unit 16 into a predetermined specific format, and outputs it as a test factor classification table 22. The test factor classification table 22 which was automatically formed by the test factor classification table forming unit 12 is presented as a template to the user by a display of the terminal 40 or the like. With respect to the test factor classification table 22 presented as a template, the user completes a test factor classification table by filling blanks of the test factor classification table 22 via work by an update working unit 24, thereby forming an updated test factor classification table 26. The test specification forming unit 28 reads the completed test factor classification table 26 and combines conditions described in the test factor classification table 26, thereby automatically forming a test specification 38. The test specification forming unit 28 comprises a classification table analyzing unit 30, a test factor combination forming unit 32, a test specification output unit 36, and an internal memory 34. The classification table analyzing unit 30 reads the completed test factor classification table 26, analyzes its contents, and stores them as data for internal processes into the internal memory 34. The test factor combination forming unit 32 selects one of the conditions of the test factors every test factor from the analysis result of the test factor classification table 26 stored in the internal memory 34 and forms a combination lest it is overlapped with the conditions of other test factors. The test specification output unit 36 searches the data such as header information and the like necessary for the test specification 38 from the internal memory 34, shapes it into a format in which combinations of all of the conditions formed by the test factor combination forming unit 32 have been predetermined, and outputs it as a test specification 38.

FIGS. 2A to 2C show a specific example of the class design information 10 which is inputted to the test factor classification table forming unit 12 in FIGS. 1A and 1B. The class design information 10 includes a header 68, an attribute list 70, and argument information 72 of the method. A Japanese class name, an English class name, a project name, a package name, a creation date, and an implementor have been described in the header 68. Attribute item numbers, Japanese names, English names, kinds, forms, and description codes have been stored in the attribute list 70. In this example, three attribute information of the attribute item Nos. 1, 2, and 3 have been described. Further, the argument information 72 of the method is classified into items of a method item number, a Japanese name, an English name, a kind, an argument Japanese name, an argument, a return value Japanese name, a return value, and a description. In this example, three argument information of the method item Nos. 1, 2, and 3 has been described every item. In the test factor classification table forming unit 12 in FIGS. 1A and 1B, the class design information 10 as shown in FIGS. 2A to 2C is read by the class design information analyzing unit 14, an analysis result is stored into the internal memory 20, and an array of the arguments of the method designated from the analysis result in the internal memory 20 is listed as a test factor by the factor classifying unit 16.

FIG. 3 is a flowchart for the factor classifying process by the factor classifying unit 16 provided in the test factor classification table forming unit 12 in FIGS. 1A and 1B. First, in step S1, a factor list is set to be empty. Subsequently, an argument list of the designated method is obtained in step S2. For example, when considering the designated method, for example, method item No. 3 in the argument information 72 analyzed from the class design information 10 in FIGS. 2A to 2C as an example, the argument list is constructed by arguments "accound:String", "order:OrderType", and the like. Subsequently, in step S3, whether the argument list is empty or not is discriminated. If it is not empty, step S4 follows and the argument information is extracted from the head of the argument list. In step 5, the extracted argument is added into the factor list.

FIGS. 4A and 4B show an example of the test factor classification table 22 outputted by the classification table output unit 18 of the test factor classification table forming unit 12 in FIGS. 1A and 1B. A test factor classification table in the case where the method item No. 3 in the class design information 10 in FIGS. 1A and 1B has been designated by the factor classifying process in FIG. 3 is shown as an example.

The test factor classification table 22 comprises a header 74 and an argument list 76. The header information searched from the header 68 of the class design information 10 in FIG. 2A has been stored in the header 74. In the example of the header 74, a creation date, a version, an implementor, a project name, a package name, a class name, a method name, an argument, a return value, and activating conditions have been stored. In the argument list 76, the argument information listed by the factor classifying process in FIG. 3 is shaped into a predetermined format of test factor classification table 22. The argument list 76 has a format of an argument item number, an argument name, a form, conditions, a process, an error code, and remarks. As an example of the argument information listed by the factor classifying process, when considering the method item No. 3 in the argument list 72 in FIG. 2C as an example, argument names "account" and "order" are separately written into the argument item Nos. 1 and 2, and forms "String" and "OrderType" are written with respect to them, respectively. Like a test factor classification table 22 in FIGS. 4A and 4B, the template which was automatically formed by the test factor classification table forming unit 12 is provided for the user. The user completes the test factor classification table 22 by filling the empty units of the template.

FIGS. 5A and 5B are the updated test factor classification table 26 completed by inputting necessary contents into the template of the test factor classification table 22 in FIGS. 4A and 4B by the user. That is, in the test factor classification table 22 as a template which was automatically formed, although the conditions, process, and error code are empty, the user examines the class design information or the like with respect to those empty units, thereby obtaining the necessary conditions, process, and error code, writing them as shown in the diagrams, and completing the table. At this time, since the argument name and the form have already been automatically formed by the test factor classification table forming unit 12, the conditions and process can be relatively easily found from the class design information with reference to the form of the argument. Since the argument names have been listed, a situation such that the necessary arguments are dropped does not occur. The omission of the description of the conditions can be certainly prevented.

Figure 6:
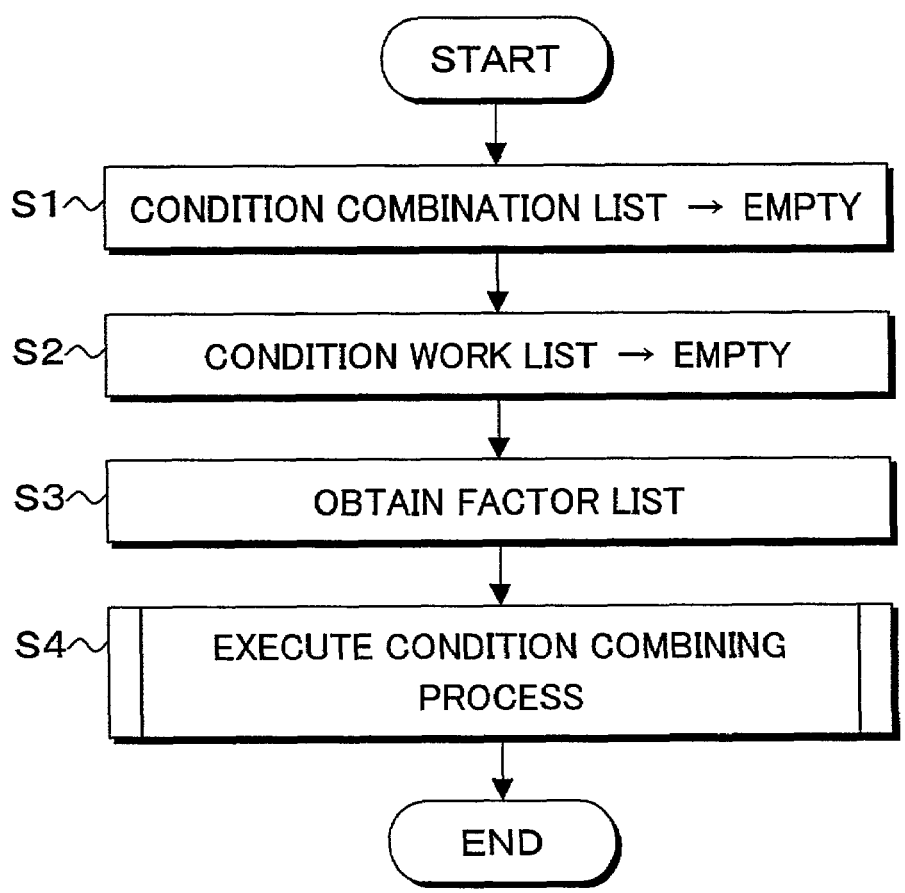
FIG. 6 is a flowchart for a test factor combining process in the first embodiment in FIGS. 1A and 1B.
Figure 7A:
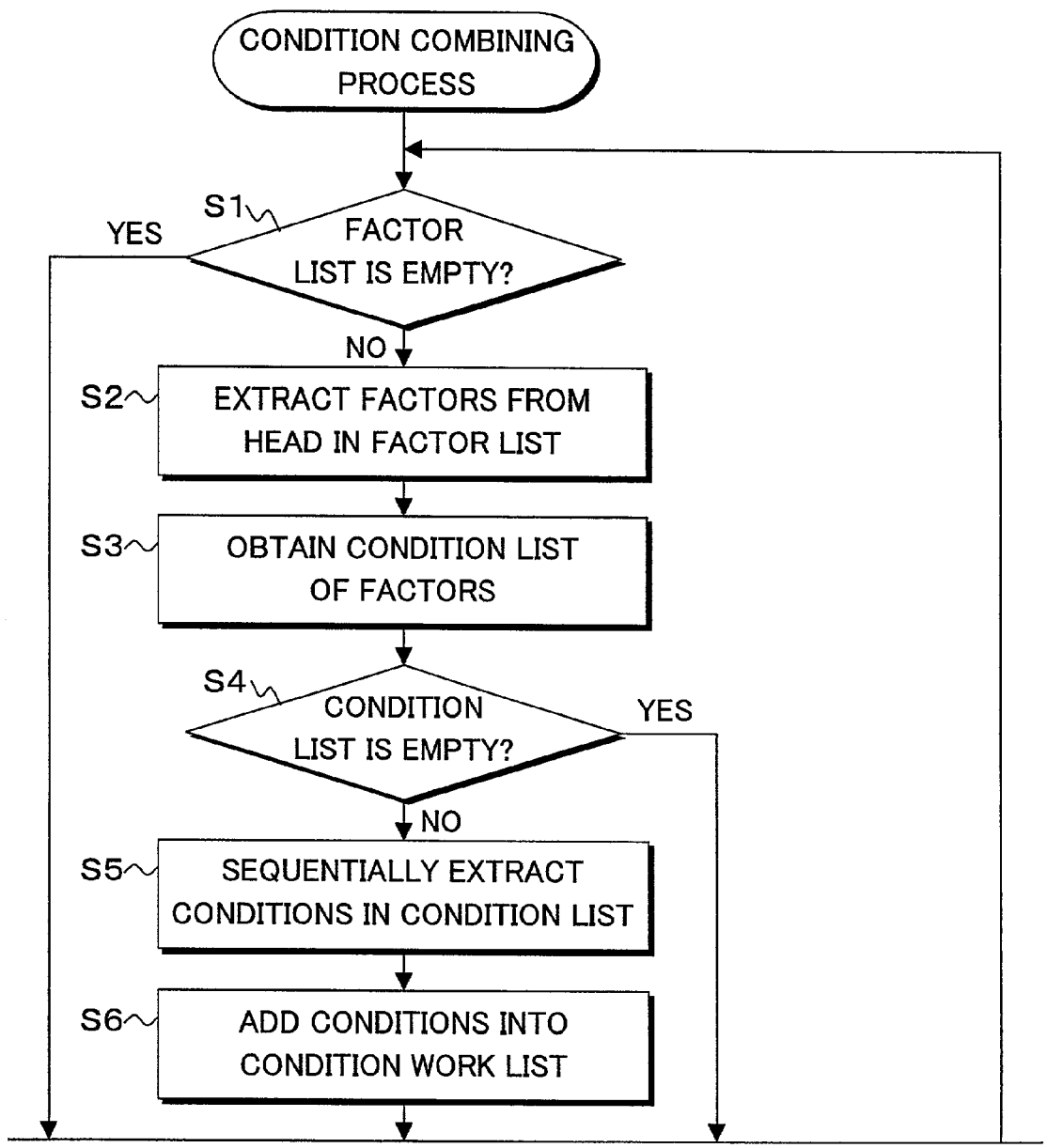
FIGS. 7A and 7B are flowcharts for a condition combining process in the test factor combination forming process in FIG. 6.
Figure 7B:
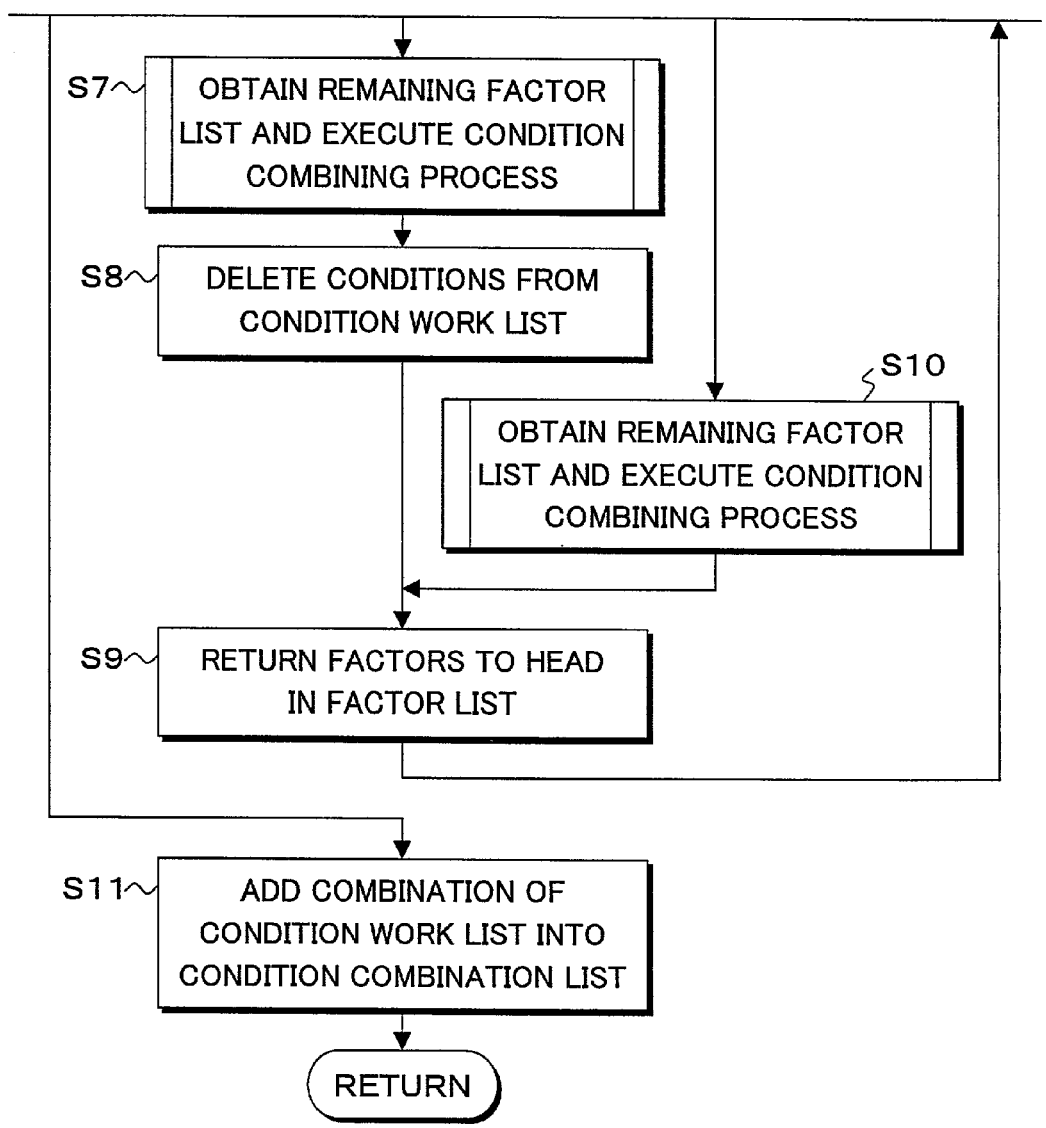

FIG. 6 is a flowchart for the test factor combination forming process by the test specification forming unit 28 in FIGS. 1A and 1B. FIGS. 7A and 7B show details of the condition combining process in the flowchart in FIG. 6. In the test factor combination forming process in FIG. 6, prior to processing, the test factor classification table 26 completed as shown in FIGS. 5A and 5B is read and analyzed by the classification table analyzing unit 30, and an analysis result is stored as internal data into the internal memory 34. The test factor combination forming unit 32 operates in this state and executes the processes in FIG. 6. First, in step S1, a condition combination list is set to be empty. Subsequently, in step S2, a condition work list is set to be empty. In step S3, the argument list stored in the internal memory 34 is obtained as an analysis result. In step S4, the condition combining process is executed with respect to the argument list as a target.

FIGS. 7A and 7B show details of the condition combining process in step S4 in FIG. 6. In the condition combining process, whether the factor list is empty or not is discriminated in step S1. If the factor list is not empty, factors are extracted from the head of the factor list in step S2. Subsequently, in step S3, a condition list of the extracted factors is obtained. In step S4, whether the condition list is empty or not is discriminated. If the condition list is not empty, processes are executed in order of the conditions described in the condition list in step 5. In step S6, the conditions which were extracted from the condition list and are to be processed are added into the condition work list. In step S7, by using a factor list regarding other factors, that is, a remaining factor list, the process for combining with the conditions in this factor list is executed. After completion of the combining process, the conditions whose combining process was finished are deleted from the condition work list in step S8. In step S9, the factors obtained after completion of the process are returned to the head of the factor list. If the condition list is empty in step S4, the combining process of the conditions is executed by using the remaining factor list in step S10. If the factor list becomes empty in step S1 by the repetition of steps S1 to S10, the processing routine advances to step S11. A combination of condition work lists obtained after completion of the combining process is added into the condition combination list.

Figure 8B:

FIGS. 8A to 8C show the test specification 38 formed by the processes in FIGS. 6, 7A, and 7B with respect to the completed and updated test factor classification table 26 in FIGS. 5A and 5B as a target. The test specification 38 comprises a header 82 and an item list 84. A date, an implementor, a version, a project name, and a class name obtained from a header 78 in the test factor classification table 26 in FIG. 5A have been described in the header 82. The item list 84 in FIGS. 8B and 8C has a format comprising a test item number, a target method, test contents, confirmation contents, an error code, an attention factor, conditions, a person who confirms, a date of confirmation, a result, and remarks. In the item list 84 having such a format, the combinations of the conditions obtained by the test factor combination forming process in FIGS. 6, 7A, and 7B are stored in the item of the conditions. In correspondence to it, the corresponding description has been made into each of the columns of a target method, an error code, and an attention factor. That is, in an argument list 80 in the updated test factor classification table 26 in FIGS. 5A and 5B, there are two conditions with respect to the argument name "account" of the argument item No. 1 and there are three conditions with respect to the argument name "order" of the argument item No. 2. Assuming that the conditions of the argument name "account" are set to (a, b) and the conditions of the argument name "order" are set to (α, β, γ) as a combination of each condition in the different arguments, the following six combinations are obtained.

(a, α) (a, β)(a, γ) (b, α) (b, β) (b, γ)

They are as shown in the test item Nos. 1 to 6 in FIG. 8B.

Figure 9:
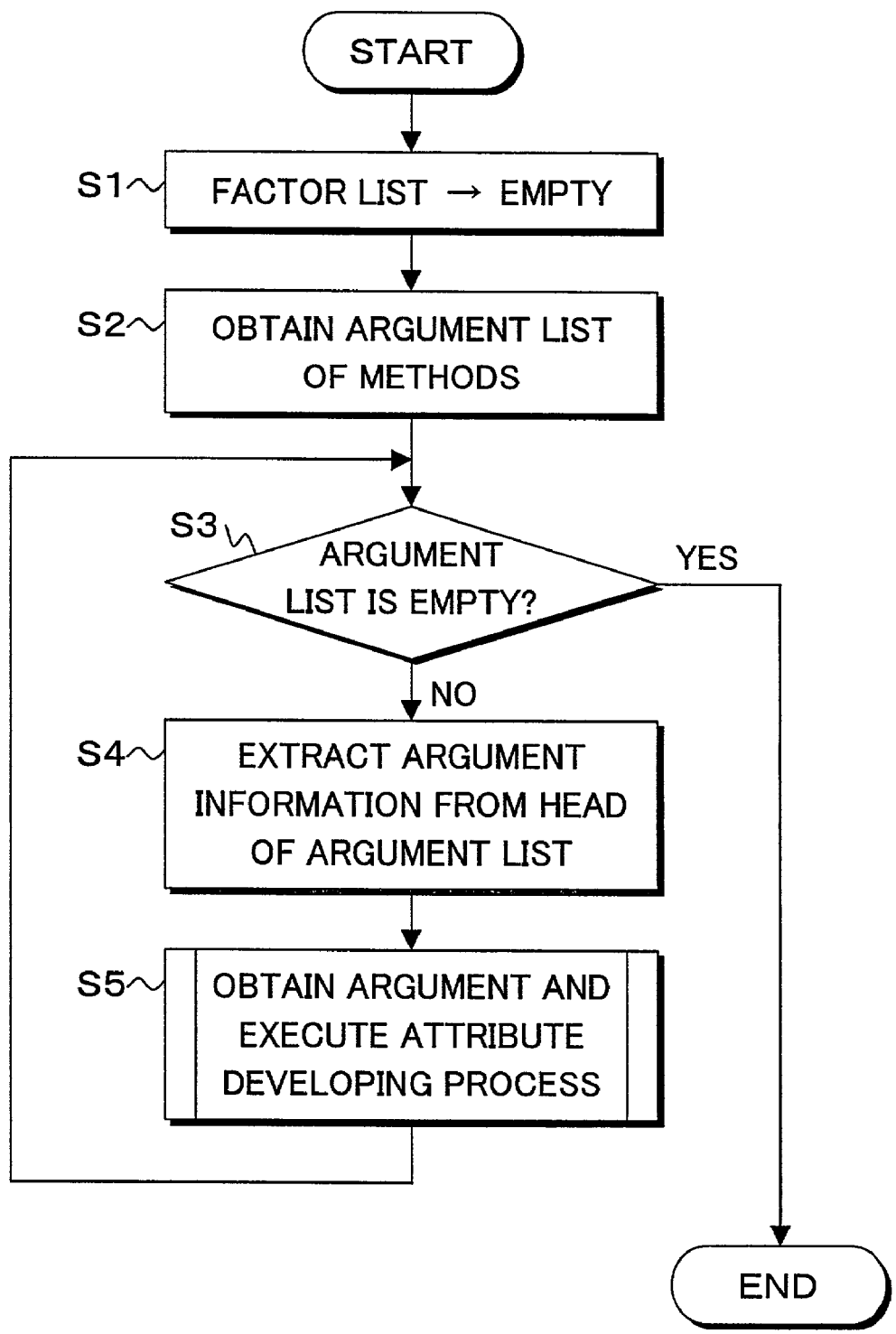
FIG. 9 is a flowchart for a factor classifying process in the second embodiment of the invention.

FIG. 9 is a flowchart for a factor classifying process in the second embodiment of the invention. That is, although a construction of the second embodiment of the invention is substantially the same as the block construction of the first embodiment in FIGS. 1A and 1B, the processing function of the factor classifying unit 16 provided in the test factor classification table forming unit 12 corresponds to processing contents of the flowchart of FIG. 9. That is, in the second embodiment of the invention, if the form of the arguments of the method as a test factor in the class design information obtained as an analysis result is the class, the attribute value is developed with reference to the class design information and the development of the attribute value is optimally repeated.

The processes which are executed by the factor classifying unit 16 according to the second embodiment in FIG. 9 will now be described. First, in step S1, the factor list is set to be empty. Subsequently, in step S2, an argument list of the method is obtained from the internal memory 20 in which the analysis result of the class design information has been stored. In step S3, subsequently, whether the argument list is empty or not is discriminated. If it is not empty, the argument information is extracted from the head of the argument list in step S4. If the form of the arguments extracted from the head of the argument list is the class, the attribute developing process is executed on the basis of the arguments in step S5.

Figure 10:
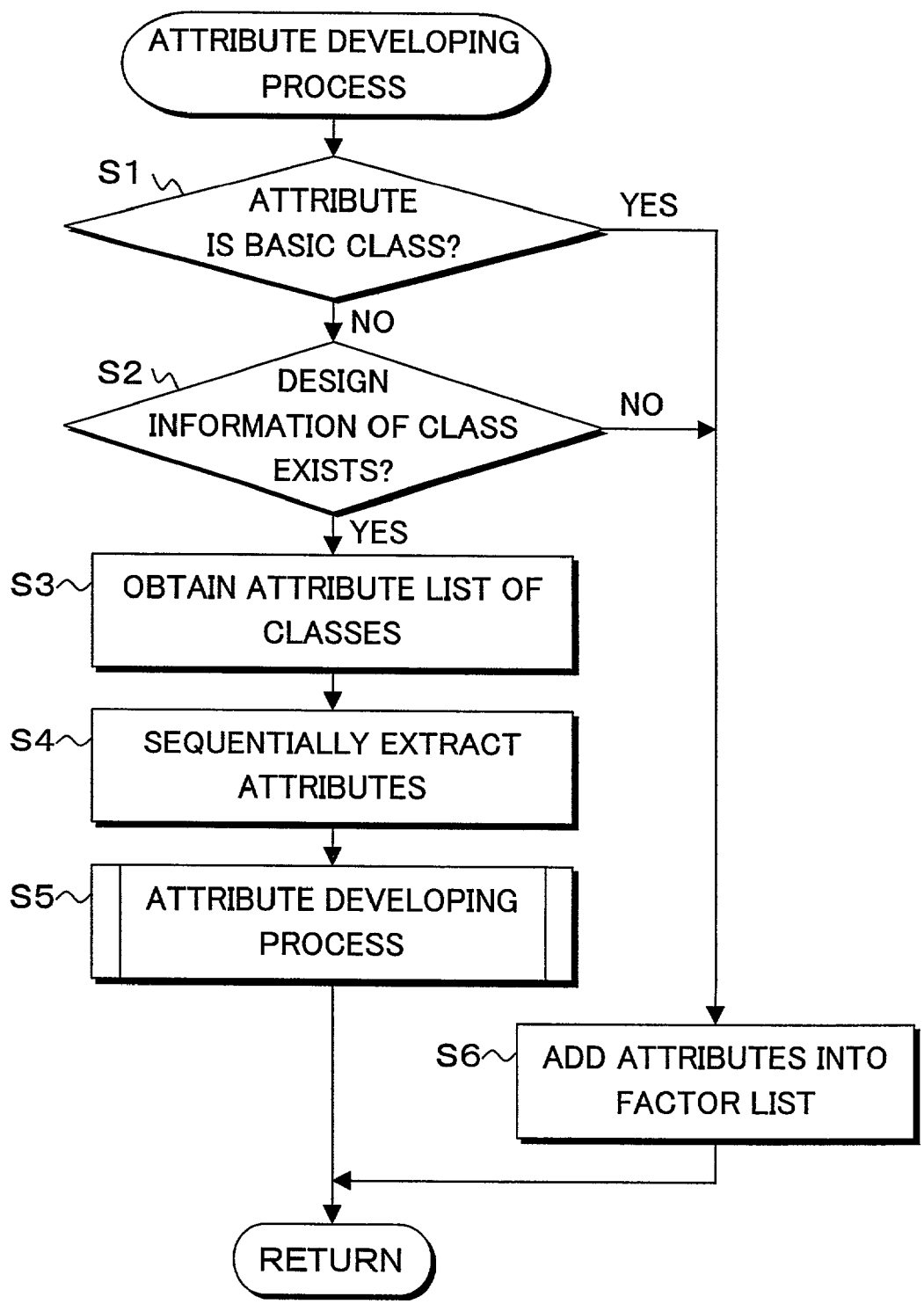
FIG. 10 is a flowchart for an attribute developing process in the factor classifying process in FIG. 9.

FIG. 10 is a detailed flowchart for the attribute developing process in step S5 in FIG. 9. In step Si, whether the attribute as a processing target is a basic class or not is discriminated. If it is not the basic class, step S2 follows and whether the design information of the class exists or not is discriminated. If the design information exists, step S3 follows. An attribute list of the class is obtained. That is, in the example of the class design information 10 in FIGS. 2A to 2C, the attribute information 70 is obtained as an attribute list. Subsequently, in step S4, the attributes are extracted in the order of the attributes in the obtained attribute list. In step S5, the developing process of the obtained attributes is executed. If the attribute is the basic class in step S1, the attribute is not developed but the attribute is added into the factor list in step S6.

FIGS. 11A to 11C show a specific example of the test factor classification table formed by the factor classifying process in FIGS. 9 and 10. This table comprises a header 86, an argument list 88, and an attribute list 90. In this example, since the argument "order" of the argument item No. 2 in the argument list 88 is the form of the class "OrderType", by referring to the design information of the OrderType class, information showing that the table has the attributes of "type" and "id" is extracted. The development in which the attribute name and the form have been written as attribute item Nos. 2-1 and 2-2 into the attribute list 90 is executed. The attribute list 90 also has a format comprising an attribute item number, an attribute name, a form, conditions, process, an error code, and remarks and it is fundamentally the same as that of the argument list 88. Since the form of the arguments is the class as mentioned above, also with respect to the test factor classification table obtained by executing the processes up to the development of the attribute values, in a manner similar to the first embodiment, the user fills contents of the empty units with regard to the argument list 88 and attribute list 90 and completes the table. With respect to each of the argument list 88 and the attribute list 90 with regard to the completed test factor classification table 26, the test specification forming unit 28 selects one of the conditions of the test factors by using the argument and attribute as test factors and automatically forms a combination lest it is overlapped, thereby forming the test specification.

FIGS. 12A and 12B are block diagrams of the third embodiment of the invention. The third embodiment is characterized in that a function for designating the development upper limit number of the test factors is provided in addition to the second embodiment. Although the constructions of the test factor classification table forming unit 12 and test specification forming unit 28 are the same as those in the first embodiment in FIGS. 1A and 1B, in addition to them, in the third embodiment, a development upper limit number designating unit 42 is further provided for the test factor classification table forming unit 12. The development upper limit number designating unit 42 allows the user to designate a numerical value to decide the development upper limit number by using the terminal 40 or the like. If the numerical value is not designated, a specific value as a default which has been predetermined by the apparatus is used. By the designation of the development upper limit number by using the development upper limit number designating unit 42, the factor classifying unit 16 processes lest the attribute values exceeding the designated upper limit number are developed. Therefore, even for the test factors such as attribute values having a complicated structure, it is possible to prevent a situation such that the test factor classification table which is formed becomes excessively large.

Figure 13:
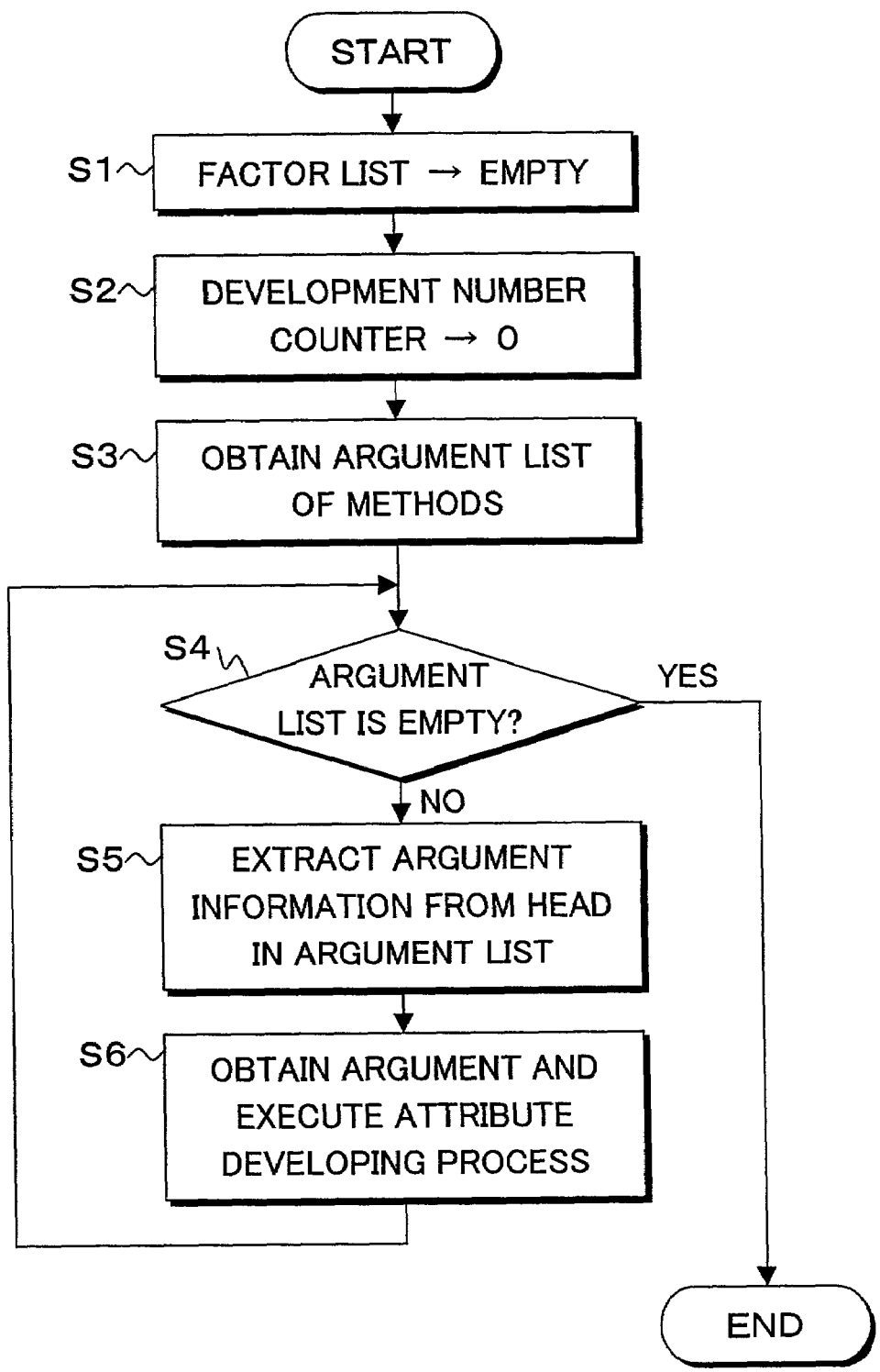
FIG. 13 is a flowchart for a factor classifying process in the third embodiment in FIGS. 12A and 12B.
Figure 14:
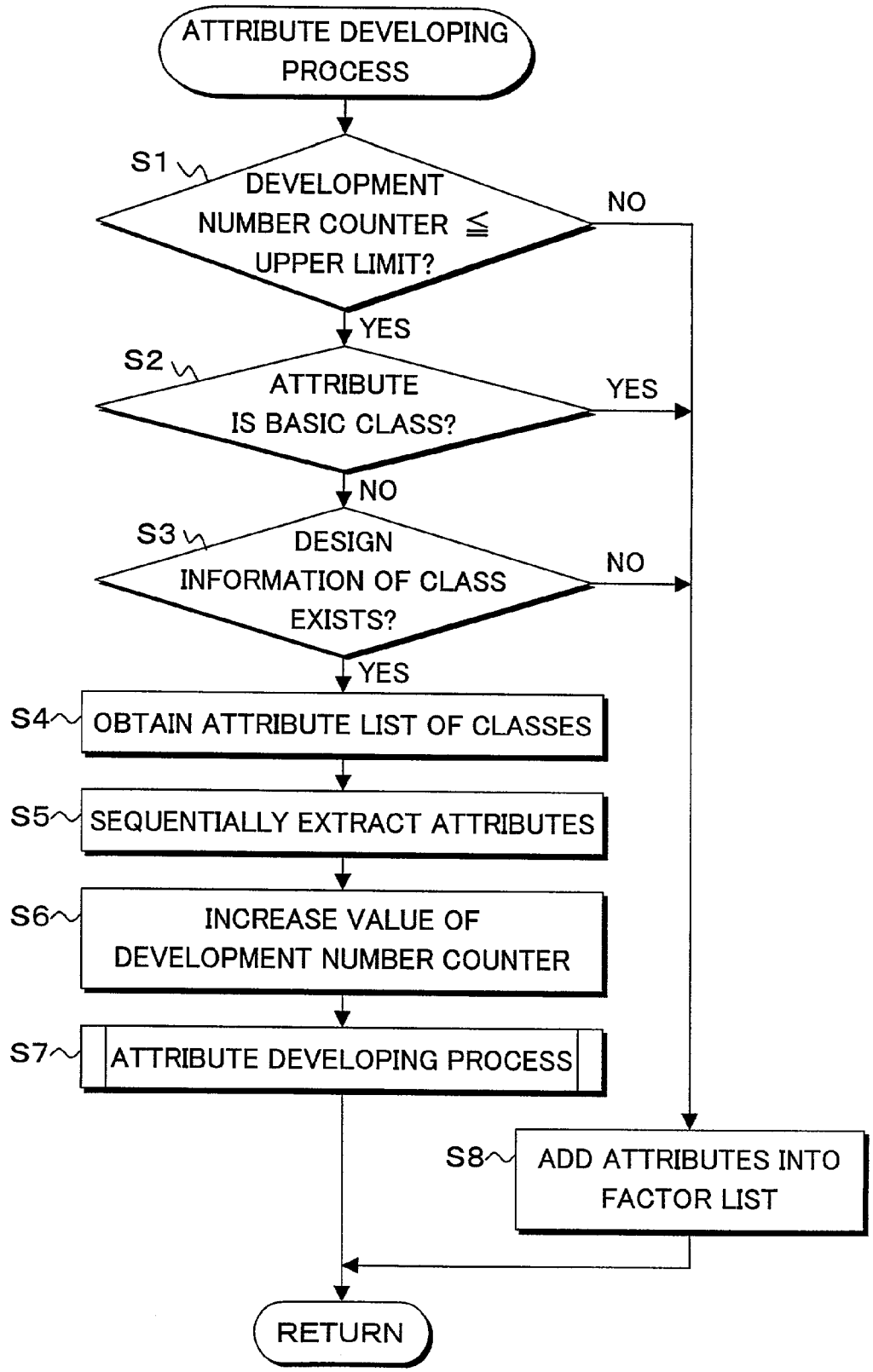
FIG. 14 is a flowchart for an attribute developing process in the factor classifying process in FIG. 13.

FIG. 13 is a flowchart showing the factor classifying process by the factor classifying unit 16 in the third embodiment in FIGS. 12A and 12B. FIG. 14 shows a flowchart for the attribute developing process in step S6 in FIG. 13. In the factor classifying process, the factor list is set to be empty in step S1 and a development number counter is initialized to "0" in step S2. Subsequently, in step S3, the argument list of the method is obtained from the analysis result of the class design information stored in the internal memory 20. In step S4, whether the argument list is empty or not is discriminated. If it is not empty, step S5 follows and the argument information is extracted from the head of the argument list. The attribute developing process based on the arguments is executed in step S6.

The attribute developing process in step S6 is as shown in the flowchart of FIG. 14. First, in step S1, whether a count value of the development number counter is equal to or less than the upper limit value designated by the development upper limit number designating unit 42 or not is discriminated. If it is equal to or less than the upper limit value, since the attribute can be developed, step S2 follows. Whether the attribute is the basic class or not is discriminated. If it is not the basic class, the presence or absence of the class design information is discriminated in step S3. If the class design information exists, the attribute list of the class is obtained in step S4. Subsequently, the attributes are sequentially extracted in step S5. In step S6, the count value of the development number counter is increased by "1" each time the attribute is extracted. In step S7, the attribute developing process for developing the attributes as test factors into the attribute list is executed. The processing routine is returned to the main routine in FIG. 13 and the processes from step S4 are repeated. If the count value of the development number counter is larger than the designated upper limit number in step S1 in FIG. 14, step S8 follows and the attribute values developed so far are added into the factor list.

Figure 15A:
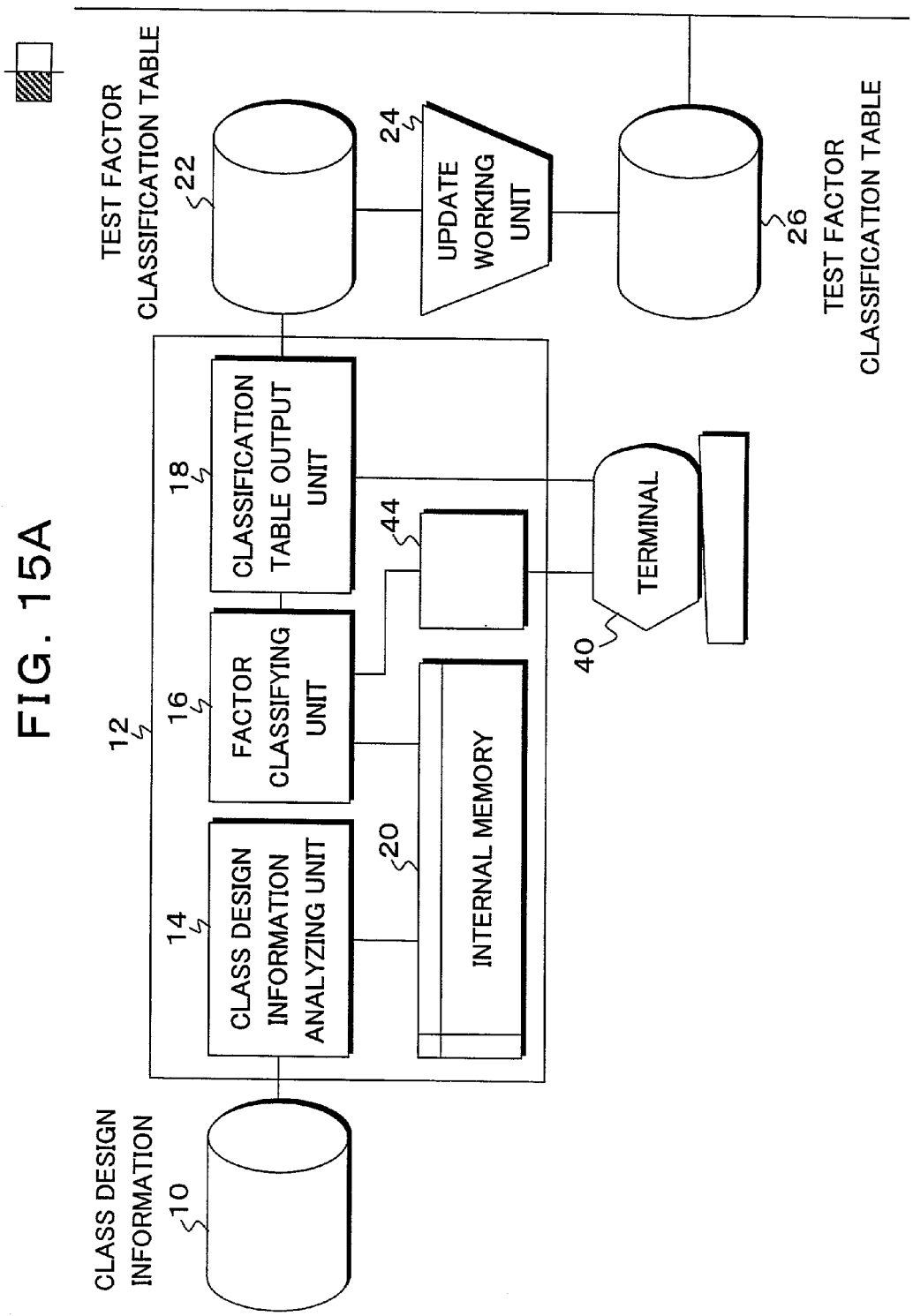
FIGS. 15A and 15B are block diagrams of the fourth embodiment of the invention.
Figure 15B:
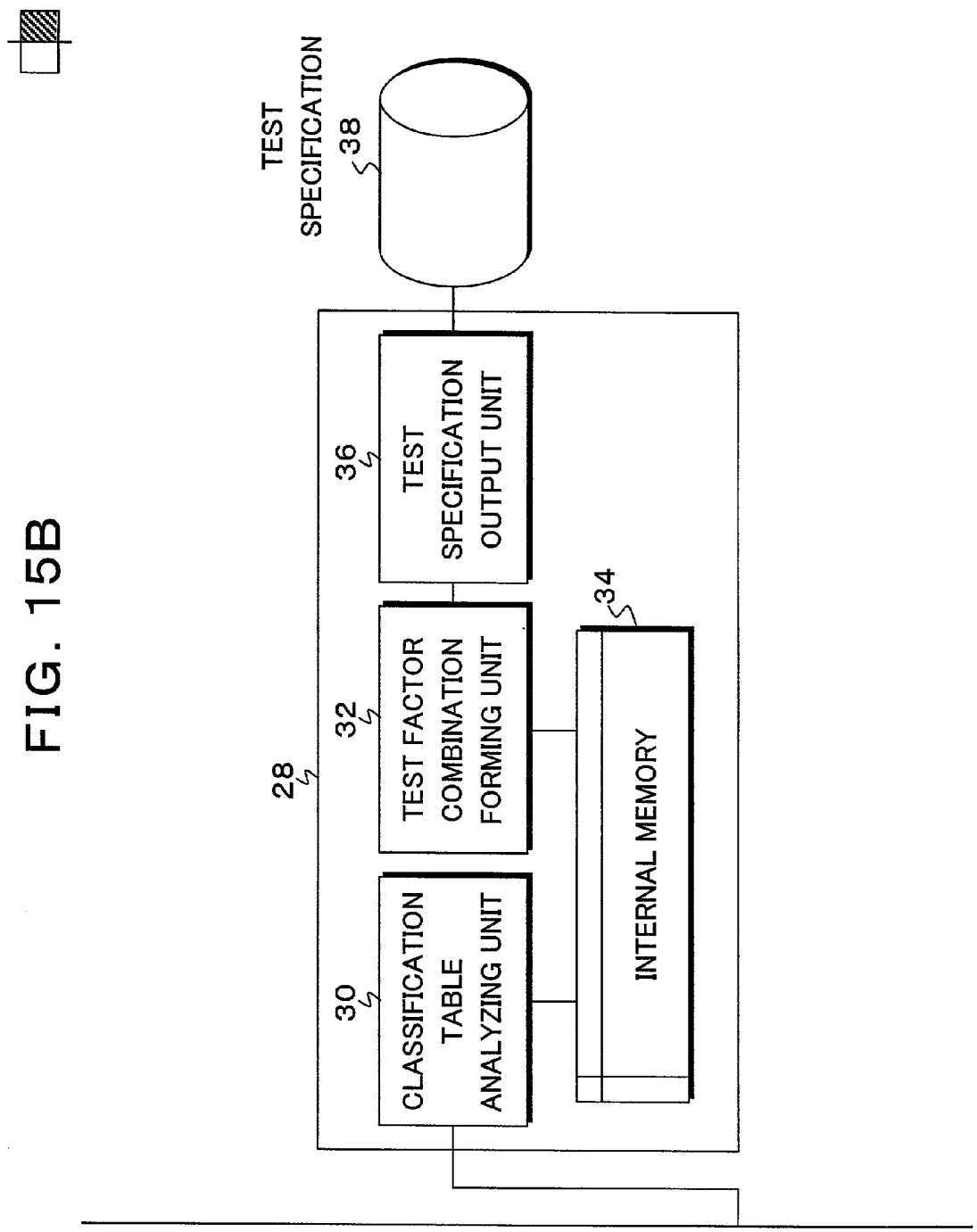

FIGS. 15A and 15B are block diagrams of the fourth embodiment of the invention. The fourth embodiment is characterized in that the attributes of the class which does not need to be developed such as a class of a library are not developed. For this purpose, in the fourth embodiment, an unnecessary-development class designating unit 44 is newly provided for the test factor classification table forming unit 12. On the basis of the designation of an unnecessary-development class by the user via the terminal 40, in the classifying process of the test factors by the factor classifying unit 16, the unnecessary-development class designating unit 44 does not execute the development into the test factor classification table with respect to the attribute values of the designated unnecessary-development class such as a library class or the like. If the unnecessary-development class is not designated by the user via the terminal 40, list information of the unnecessary-development class as a default which has been predetermined by the apparatus is used.

Figure 16:
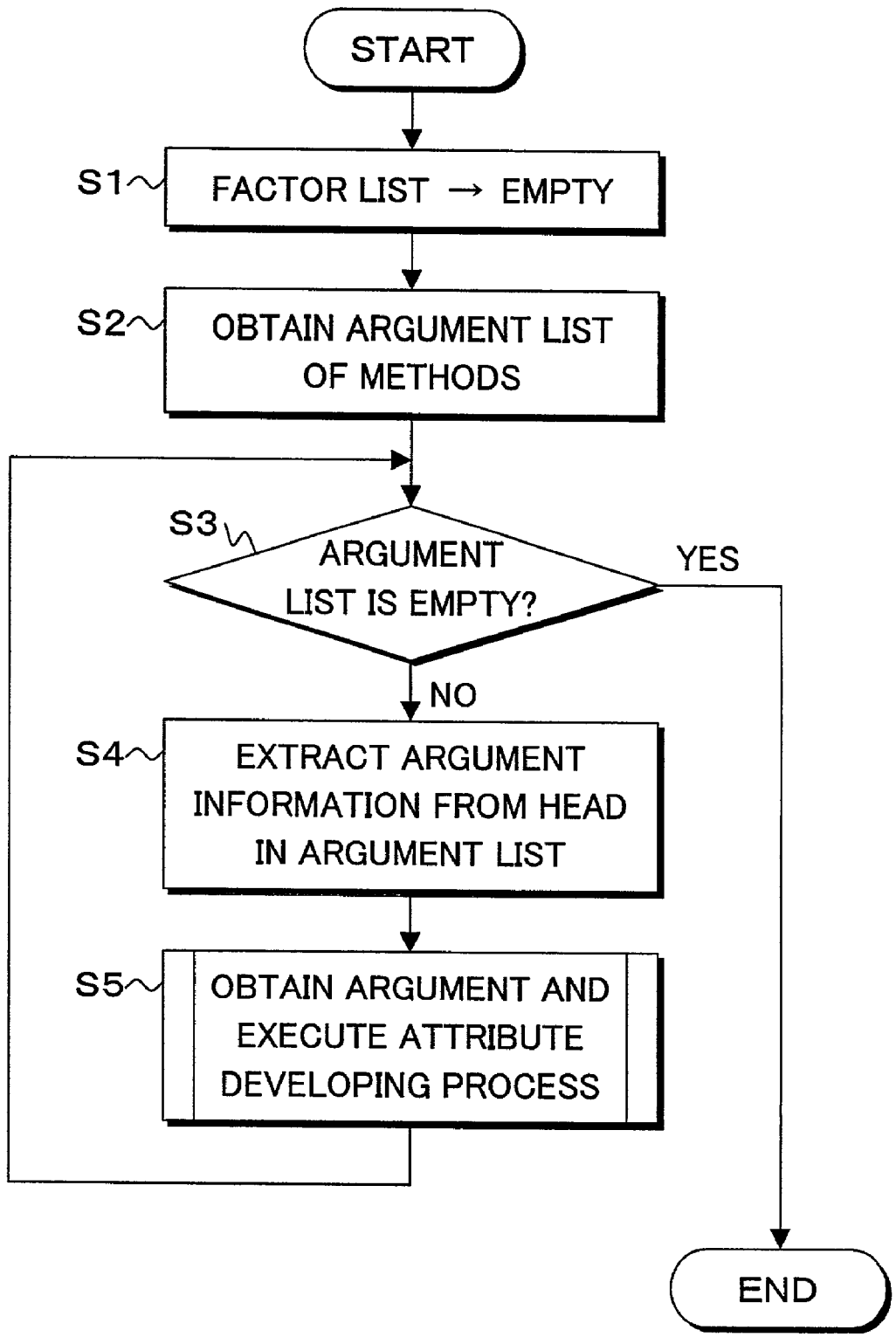
FIG. 16 is a flowchart for a factor classifying process in the fourth embodiment in FIGS. 15A and 15B.
Figure 17:
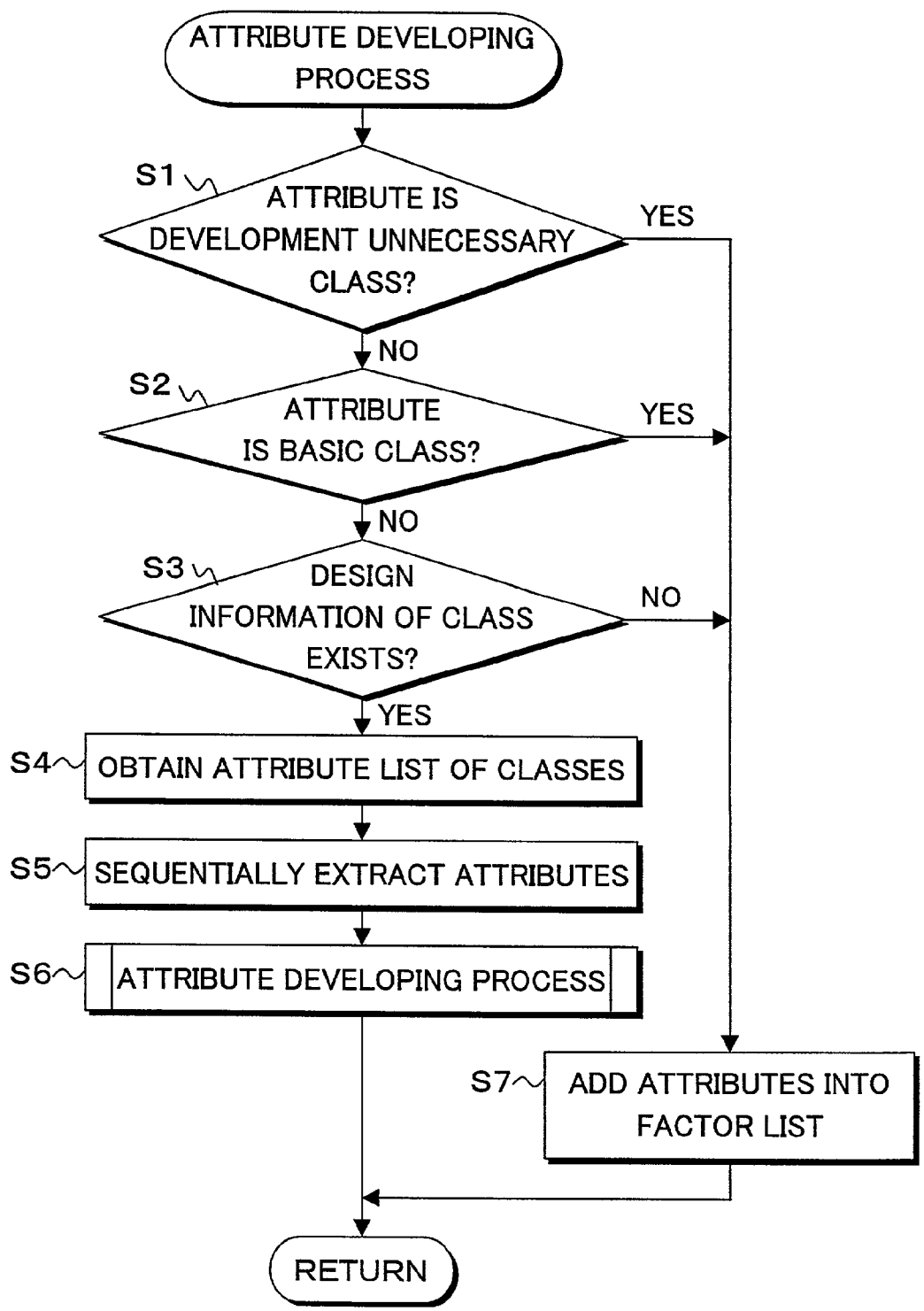
FIG. 17 is a flowchart for an attribute developing process in the factor classifying process in FIG. 16.

FIG. 16 is a flowchart for the test factor classifying process in the fourth embodiment in FIGS. 15A and 15B. FIG. 17 shows a flowchart for the attribute developing process in step S5 in FIG. 16. In the test factor classifying process in the fourth embodiment in FIG. 16, the factor list is set to be empty in step S1 and the argument list of the method is obtained in step S2. If the argument list is not empty in step S3, the argument information is extracted from the head of the argument list in step S4. In step S5, the attribute developing process is executed by using the extracted arguments. Details of the attribute developing process in step S5 are shown in the flowchart in FIG. 17.

In the attribute developing process in FIG. 17, in step S1, whether the attribute to be developed is the unnecessary-development class designated by the unnecessary-development class designating unit 44 in FIGS. 15A and 15B or not is discriminated. If it is not the unnecessary-development class, the attribute developing process is executed by processes in steps S2 to S6 in a manner similar to the embodiment of FIG. 1. If the attribute to be developed is the unnecessary-development class in step S1, the attribute developing process in steps S2 to S6 is not executed but this attribute is added into the factor list in step S7. The series of developing processes are finished.

Figure 18A:
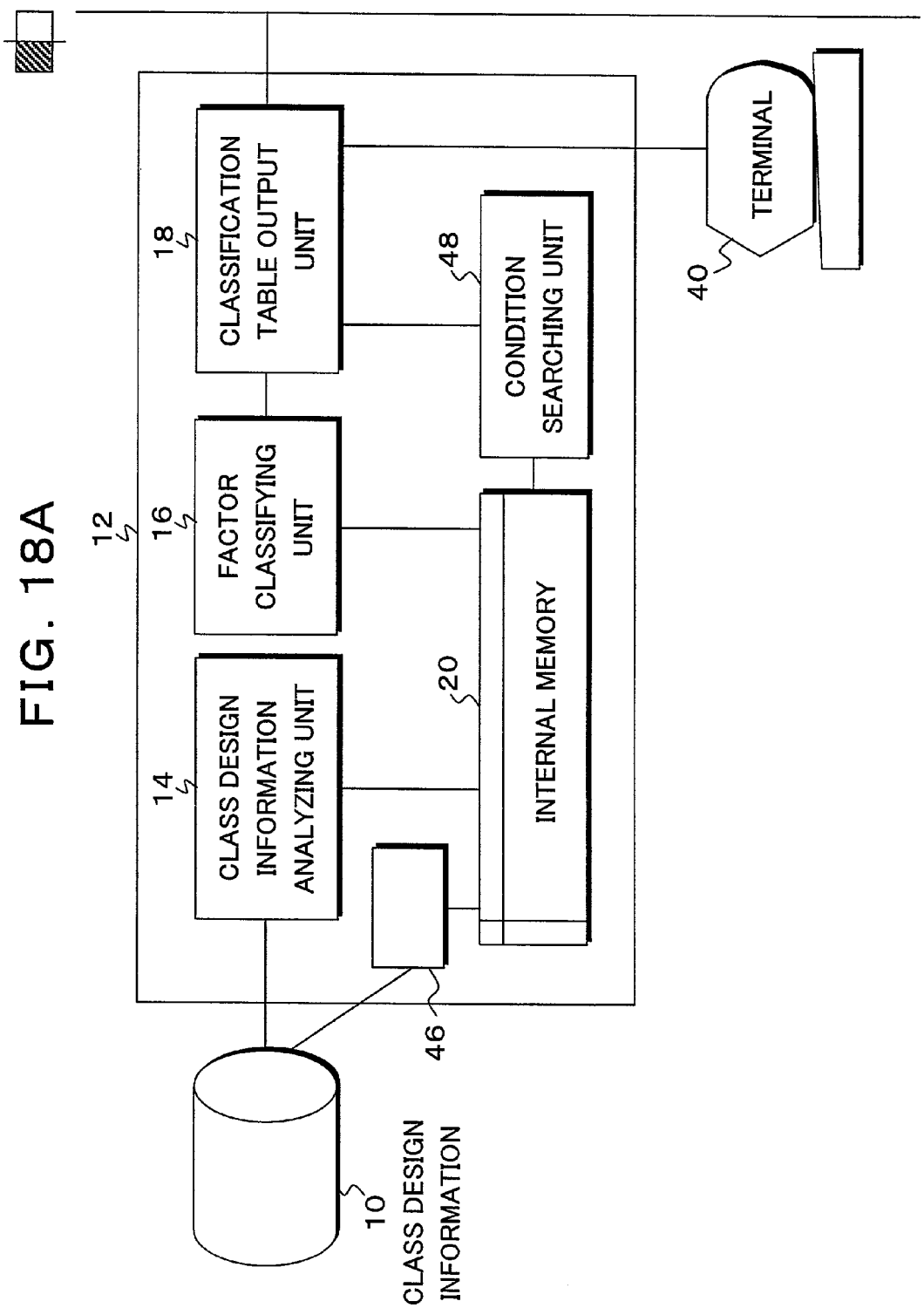

FIGS. 18A and 18B are block diagrams of the fifth embodiment of the invention. The fifth embodiment is characterized in that in addition to the list of the test factors, candidates for the conditions of the test factors are outputted to the test factor classification table by using the structured class design information. A fundamental construction of the test factor classification table forming unit 12 is the same as that of the first embodiment of FIGS. 1A and 1B and the test specification forming unit 28 is also the same as that of the first embodiment of FIGS. 1A and 1B. In the fifth embodiment, a method design information analyzing unit 46 and a condition searching unit 48 are newly provided for the test factor classification table forming unit 12. The method design information analyzing unit 46 reads the structured method design information showing the internal process of the method as a forming target from the class design information, analyzes it, and stores an analysis result into the internal memory 20. The condition searching unit 48 searches an analysis result of the method design information stored in the internal memory 20, that is, searches the units showing the conditions from the structured method design information and extracts the conditions concerning the test factors. Therefore, the classification table output unit 18 inquires of the condition searching unit 48 about the conditions of the test factors in addition to the arguments, attribute values, and test factors as their conditions which were listed by the factor classifying unit 16. The output unit 18 adds the conditions of the test factors into the list of the test factors listed by the condition searching unit 48, shapes candidates for those conditions into a predetermined format, and outputs them as a test factor classification table 22.

FIG. 19 shows an example of the structured information showing the internal process of the method serving as a processing target in the method design information analyzing unit 46 and condition searching unit 48 in FIGS. 18A and 18B, and the structured information is expressed by a flowchart. The condition searching unit 48 in FIGS. 18A and 18B extracts satisfying conditions and unsatisfying conditions from three discriminating blocks S1, S2, and S3 each showing a condition branch in the structured information expressed by the flowchart of FIG. 19. That is, in the branching condition in step S1, the argument "account", the satisfying condition "registered", and the unsatisfying condition "not registered" are extracted. With respect to the argument "order" in steps S2 and S3, since the form of the argument is the class, the attribute value is developed. With respect to step S2, for example, "type" is extracted as an attribute value, and as its conditions, "registered" as a satisfying condition and "not registered" as an unsatisfying condition are extracted. With respect to the branching condition in step S3, for example, "id" is extracted as an attribute value, "equipment" is extracted as a satisfying condition, and "not equipment" is extracted as an unsatisfying condition. Namely, the structured method design information serving as a target in the fifth embodiment in FIGS. 18A and 18B is not limited to the structure having the format of the flowchart of FIG. 19. A state transition diagram, a sequence diagram, or the like can be also used.

FIGS. 20A to 20C show a specific example of the test factor classification table 22 formed by the fifth embodiment in FIGS. 18A and 18B with respect to the method design information having the structure expressed by the flowchart of FIG. 19. The test factor classification table comprises a header 92, an argument list 94, and an attribute list 96. The argument name by the branching condition, its satisfying condition, and the unsatisfying condition in step S1 in FIG. 19 are developed in the argument list 94. With respect to the argument name "order" of the argument item No. 2 in the argument list 94, since its form is the class, attribute development as shown in the attribute list 96 is performed. With respect to the branching condition in step S2 in FIG. 19, the satisfying conditions and unsatisfying conditions are extracted and developed with regard to the two branching conditions in steps S2 and S3, respectively.

Figure 21B:
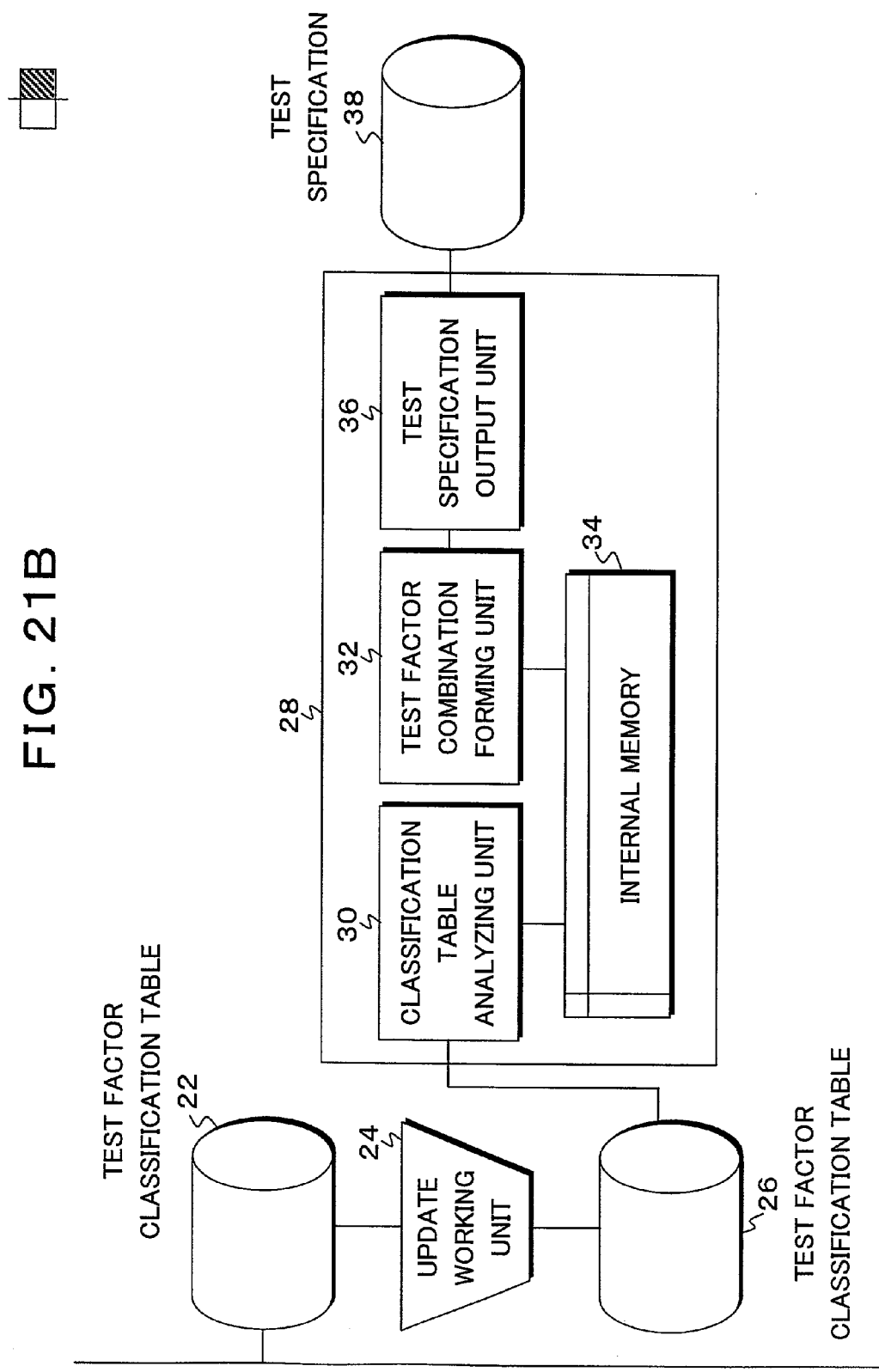

FIGS. 21A and 21B are block diagrams of the sixth embodiment of the invention. The sixth embodiment is characterized in that in addition to the fifth embodiment in FIGS. 18A and 18B, whether the conditions extracted from the structured method design information relate to the normality process or the abnormality process is confirmed and a confirmation result is written in the test factor classification table. In the sixth embodiment, the test factor classification table forming unit 12 is further provided with a condition type discriminating unit 50 in addition to the method design information analyzing unit 46 and condition searching unit 48 provided in the fifth embodiment in FIGS. 18A and 18B. When the test factor extracted from the structured method design information and its condition are formed and outputted to the test factor classification table 22 by the classification table output unit 18, the condition type discriminating unit 50 receives an inquiry for discriminating whether the condition relates to the normality process or the abnormality process and responds a type discrimination result about whether the condition belongs to the normality type or the abnormality type to the inquiry. That is, when considering the branching condition in step S1, for example, the condition type discriminating unit 50 checks a process which is executed after the condition is unsatisfied with respect to the method design information having the structure expressed by the flowchart as shown in FIG. 19.

If the branching condition is not satisfied in step S1, since "error 300" is obtained in step S7, the process is the abnormality process in this case and it is determined that the condition belongs to the abnormality type. If the condition is satisfied in step S1, since the error process does not directly exist on the branch destination side, it is determined that the condition belongs to the normality type.

FIGS. 22A to 22C show a specific example of a formation result of the test factor classification table with respect to the method design information having the structure expressed by the flowchart of FIG. 19 and formed by the sixth embodiment in FIGS. 21A and 21B. The test factor classification table comprises a header 98, an argument list 100, and an attribute list 102. By the processing function of the condition type discriminating unit 50 provided in the sixth embodiment in FIGS. 21A and 21B, "normal" and "abnormal" are written in the item units of the type by the examination of the branching conditions in the structured method design information with respect to the conditions of the arguments and attributes in each of the argument list 100 and attribute list 102. By the type writing, the user can immediately determine whether the conditions of the arguments and attribute values relate to the normality process or the abnormality process.

Figure 23B:
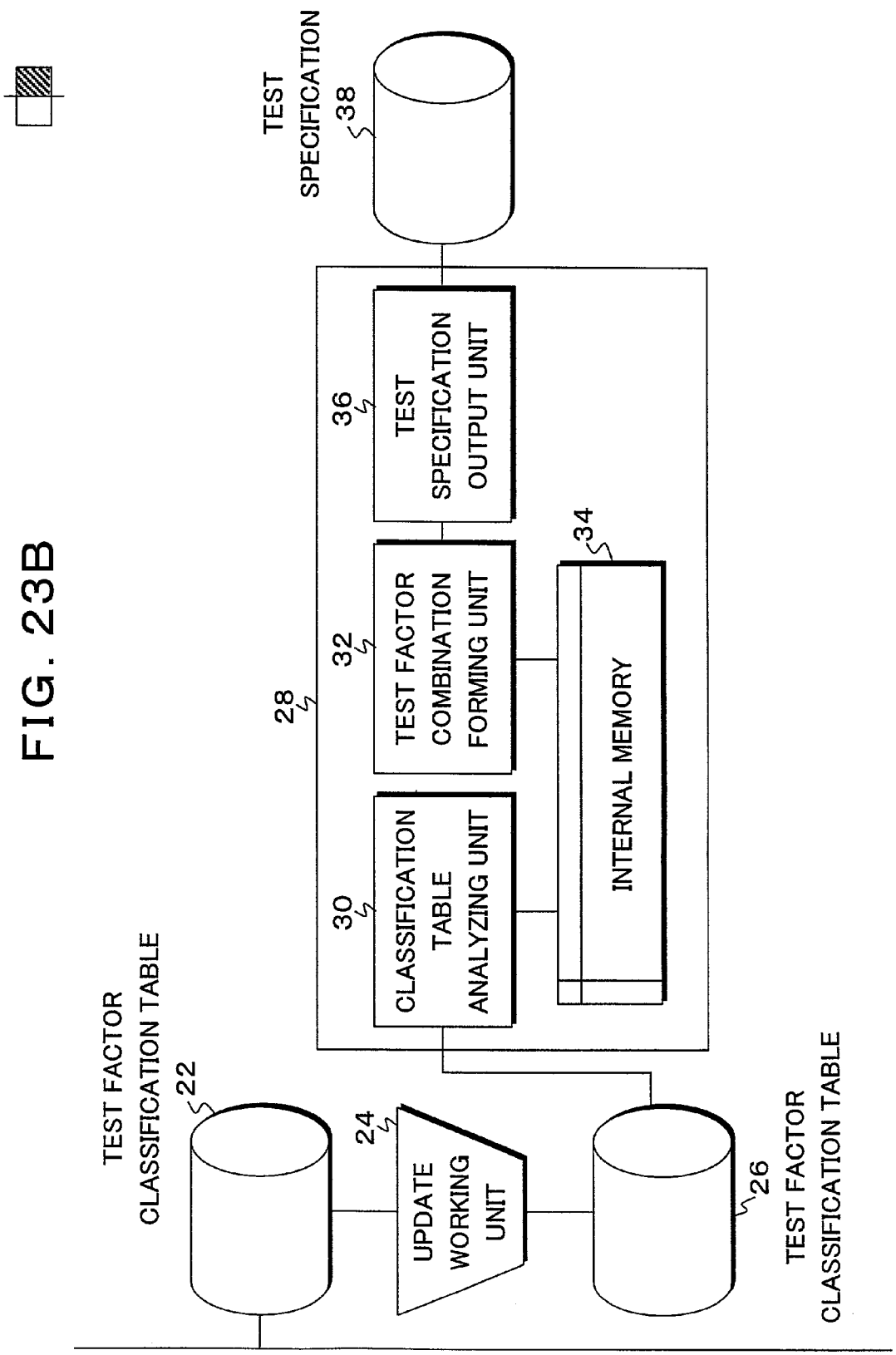

FIGS. 23A and 23B are block diagrams of the seventh embodiment of the invention. The seventh embodiment is characterized in that by using class design information described by sentences, in addition to the list of the test factors, candidates for their conditions are outputted to the test factor classification table. The test factor classification table forming unit 12 is provided with a method contents description sentence analyzing unit 52 in place of the method design information analyzing unit 46 in the fifth embodiment in FIGS. 18A and 18B, and other constructions are similar to those in the fifth embodiment. The method contents description sentence analyzing unit 52 reads the design information in which the internal process in the method designated by the user via the terminal 40 has been described by sentences from the class design information 10, analyzes it, and stores an analysis result into the internal memory 20. On the basis of a predetermined format, the condition searching unit 48 searches the units showing the conditions from the sentences of the method contents description stored as an analysis result in the internal memory 20. When each test factor is outputted into the test factor classification table 22 from the classification table output unit 18, the condition searching unit 48 receives an inquiry, writes the test factors extracted by the condition searching unit 48 and conditions of the test factors into the test factor classification table in response to the inquiry and outputs them.

FIG. 24 shows an example of design information in which the internal process of the method serving as a processing target by the method contents description sentence analyzing unit 52 and condition searching unit 48 in FIGS. 23A and 23B has been described by sentences. In this design information, a form describing the conditions so as to start from [condition] is used. In the condition searching unit 48 in FIGS. 23A and 23B, therefore, the units of the sentence subsequent to [condition] in the sentences in FIG. 24 are searched and the argument as a test factor and its condition can be extracted.

FIG. 25 shows a specific example in which the internal process of the method serving as a target in the eighth embodiment of the invention has been described by sentences. Although a construction of the eighth embodiment of the invention is substantially the same as that of the seventh embodiment in FIGS. 23A and 23B, the eighth embodiment is characterized in that as a function of the condition searching unit 48, when the condition is searched from the analysis result of the design information in which the internal process of the method has been described by sentences, the normality type or abnormality type of the condition is simultaneously extracted on the basis of the notation showing the type of whether the condition relates to the normality process or the abnormality process. In the example of the design information in which the internal process of the method has been described by sentences in FIG. 25, a notation in which the condition is the abnormality condition in the case where a word "error" exists in a line starting from [condition] is used. This unit is searched by the condition searching unit 48 in the eighth embodiment, thereby discriminating whether the condition relates to the normality type or abnormality type. The determined type is written into each condition of the argument list 100 and attribute list 102 in a manner similar to the test factor classification table in the sixth embodiment of FIGS. 22A to 22C.

Figure 26A:
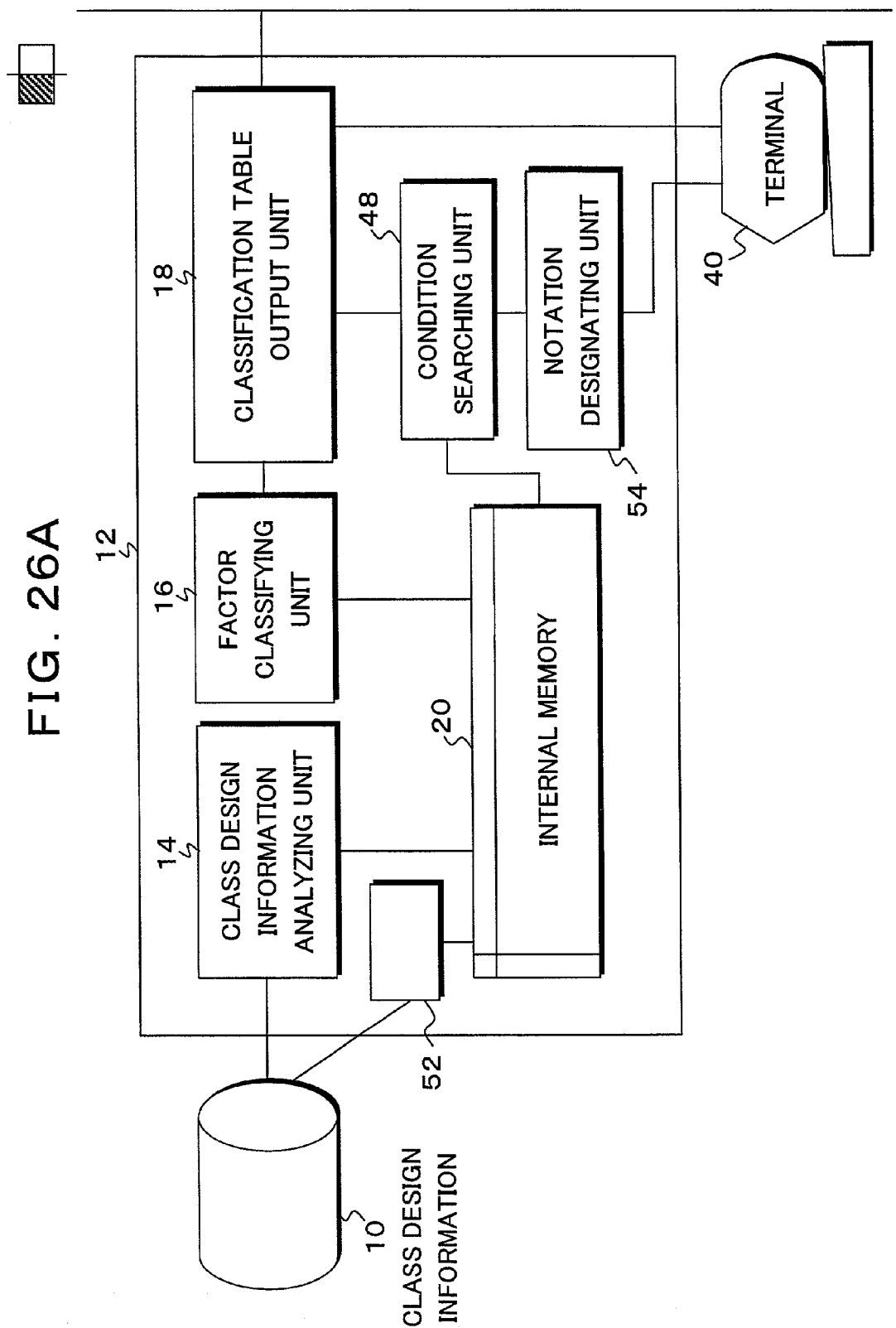
FIGS. 26A and 26B are block diagrams of the ninth embodiment of the invention.
Figure 26B:
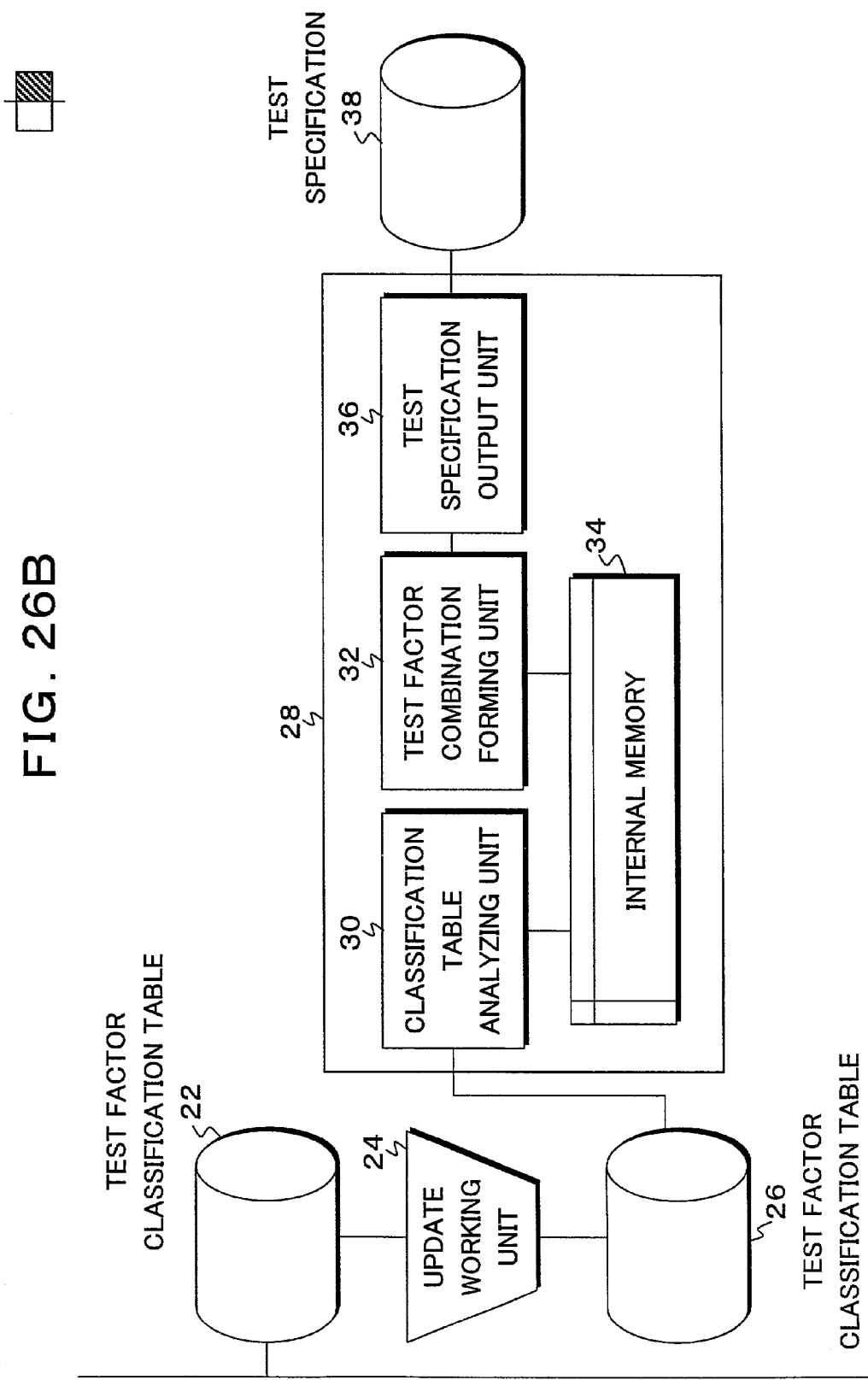

FIGS. 26A and 26B are block diagrams of the ninth embodiment of the invention. The ninth embodiment is characterized in that in addition to the function for extracting the type indicative of the normality or the abnormality with respect to the design information in which the internal process of the method has been described by sentences in FIG. 25 and writing it, a notation designating unit 54 is newly provided, thereby enabling the user to change the notation for extracting the conditions and the type via the terminal 40 with respect to the design information described by the sentences. That is, the user allows the notation designating unit 54 to designate the notation indicative of the conditions and the type via the terminal 40. When the notation indicative of the conditions and the type is designated by the notation designating unit 54 as mentioned above, in the case where the conditions and the type are searched by the condition searching unit 48 from the design information in which the internal process of the method design information stored in the internal memory 20 has been described by the sentences, the notation designated by the user via the notation designating unit 54 is referred to. The condition is extracted from the line corresponding to the notation designated by the user.

FIG. 27 shows a specific example in which the user designates the notation by the notation designating unit 54 in the ninth embodiment in FIGS. 26A and 26B. The notation of the condition designated by the user is a line starting from a word "condition:" and it designates a form in which a variable name and a condition are arranged. A method of discriminating the abnormality conditions is designation for checking whether the line is a line starting from a word "error:" or not. It designates a form in which an error code is described after this word.

FIG. 28 shows an example of the condition description by sentences described in accordance with the notation designated by the user in FIG. 27. Therefore, the condition searching unit 48 analyzes the design information described by the sentences having a structure as shown in FIG. 28 in accordance with the notation as shown in FIG. 27 designated by the notation designating unit 54 and can extract the relevant conditions from the relevant line.

Figure 29B:
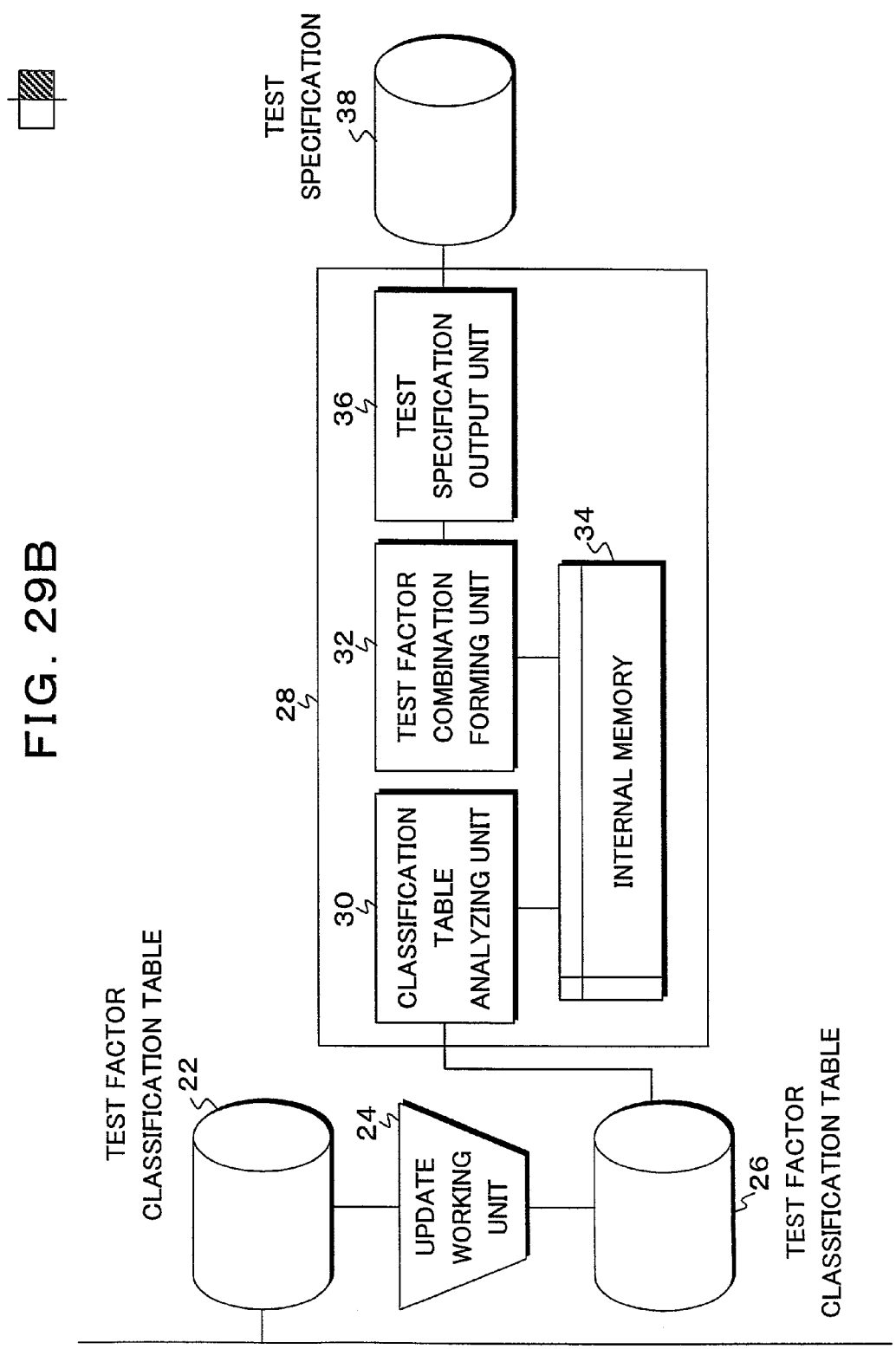

FIGS. 29A and 29B are block diagrams of the tenth embodiment of the invention. The tenth embodiment is characterized in that the method serving as an output target of the test factor classification table can be automatically selected. In the tenth embodiment, an output target selecting unit 56 is newly provided for the test factor classification table forming unit 12 and other constructions are substantially the same as those in the first embodiment in FIGS. 2A to 2C. On the basis of a method selection reference designated by the user via the terminal 40 or a method selection reference of a specific value which is provided as a default by the apparatus, the output target selecting unit 56 automatically selects the method in which the test factor classification table 22 which is formed by the classification table output unit 18 is used as a target. As a method selection reference which is designated by the output target selecting unit 56, coincidence or the like of the units according to the conditions such as "includes", "starts from", "ends", and the like with respect to a specific character train is designated for the unit of the attribute of the method, for example, the unit of the name "public" or "private". The items which are designated by the user via the terminal 40 in the embodiment are two items of "target class" and "method selection reference". For example, the user designates in a manner such that a method whose attribute is "public" and whose name starts from "find" is set to an output target.

The eleventh embodiment of the invention will now be described. The eleventh embodiment is characterized in that the class serving as an output target can be also automatically selected in addition to the method selection reference in the tenth embodiment. Although a construction of the eleventh embodiment is substantially the same as that of the tenth embodiment in FIGS. 29A and 29B, it is characterized in that as a function of the output target selecting unit 56, on the basis of the class selection reference and method selection reference which are designated by the user or those of specific values as defaults provided by the apparatus, the class and method by which the test factor classification table is formed by the classification table output unit 18 are automatically selected. As a class selection reference in this case, coincidence of the unit of the class name, that is, coincidence of the unit including a specific character train of the class name, coincidence of the unit starting from a specific character train, coincidence of the unit which ends by a specific character train, or the like is considered. The method selection reference is the same as that in the tenth embodiment. In the eleventh embodiment, the user instructs the class selection reference and method selection reference from the terminal 40. For example, by designating in a manner such that a method whose class ends by "Controller", whose attribute is "public", and whose name starts from "find" is set to an output target, the test factor classification table according to the class selection reference and method selection reference can be formed.

Figure 30A:
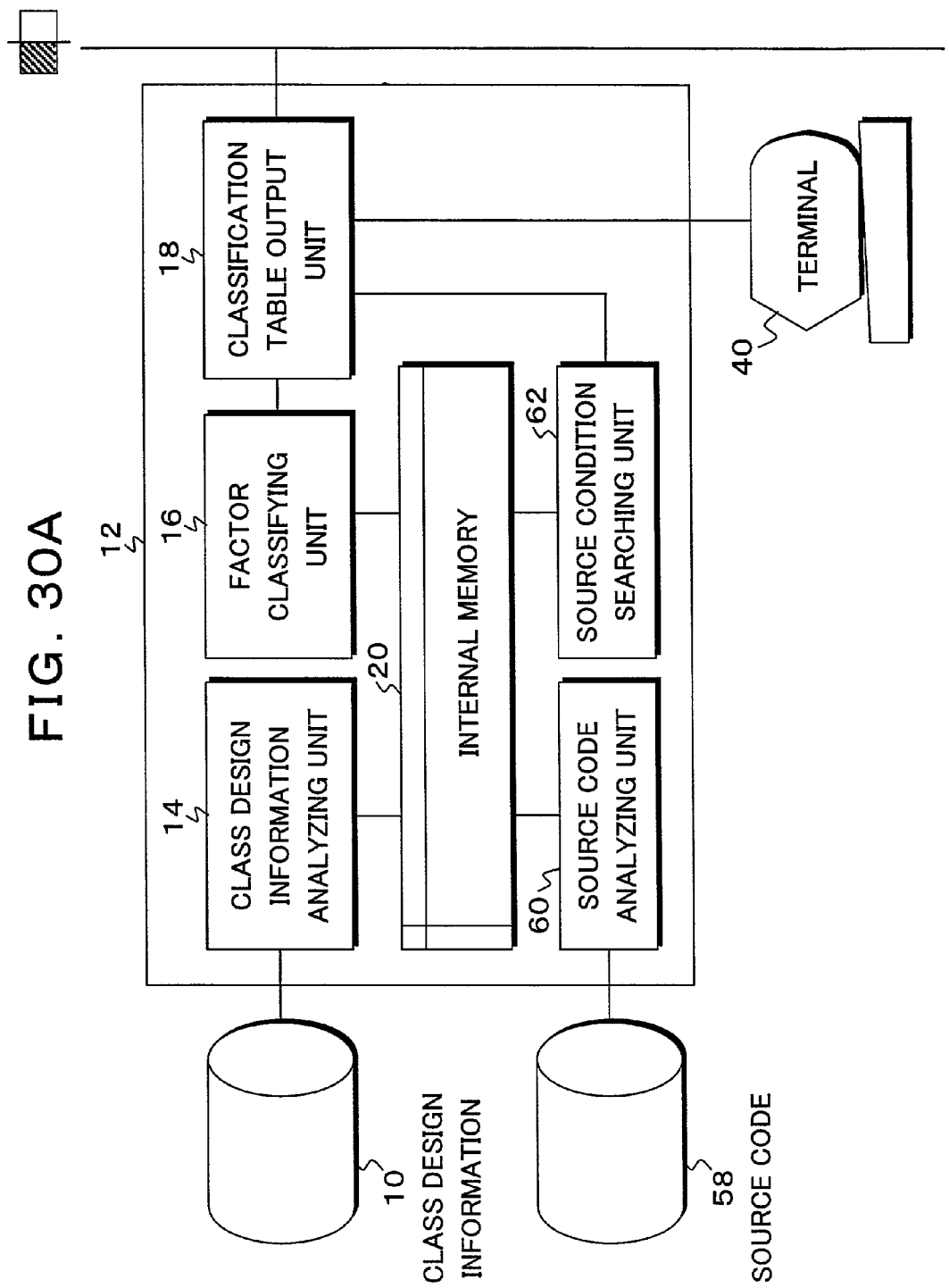
FIGS. 30A and 30B are block diagrams of the twelfth embodiment of the invention.
Figure 30B:
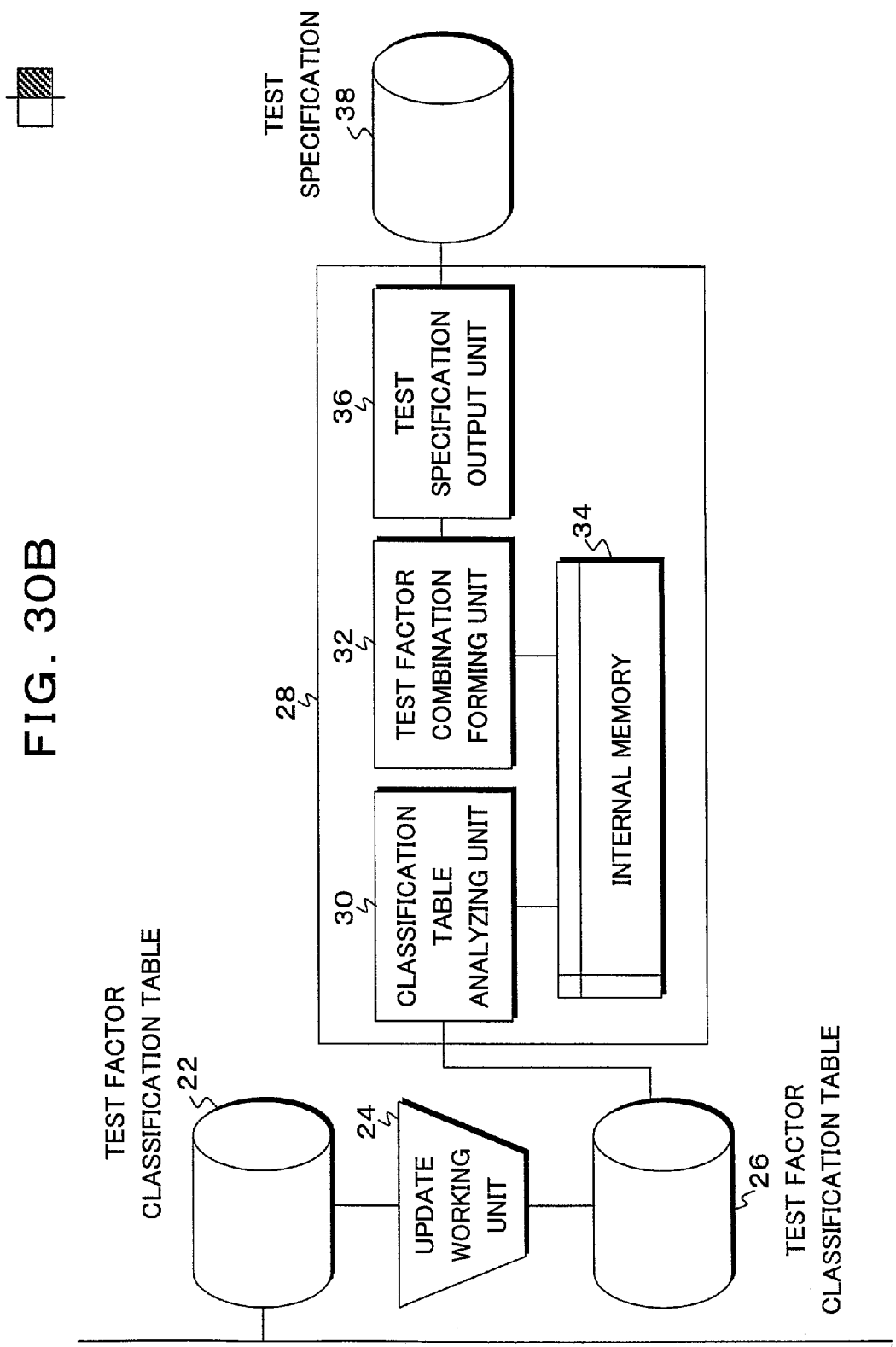

FIGS. 30A and 30B are block diagrams of the twelfth embodiment of the invention. The twelfth embodiment is characterized in that together with the class design information, the test factors and their conditions are extracted also from the source codes constructing the source program and outputted to the test factor classification table. The test factor classification table forming unit 12 is newly provided with a source code analyzing unit 60 and a source condition searching unit 62 in addition to the class design information analyzing unit 14, factor classifying unit 16, and classification table output unit 18 for forming the test factor classification table 22 from the class design information 10. The source code analyzing unit 60 reads source codes of the method as a target from source codes 58 constructing the source program formed on the basis of the class design information 10, analyzes a syntax, and stores an analysis result into the internal memory 20. The source condition searching unit 62 searches a condition sentence appearing in the source codes of the target method, extracts variables included in the condition sentence as test factors, extracts the condition sentence of the conditions of the extracted test factors, and adds it into the test factor classification table 22 formed from the class design information 10.

FIG. 31 shows a specific example of the source codes serving as a processing target in the source code analyzing unit 60 and source condition searching unit 62 in FIGS. 30A and 30B. With respect to the source codes in FIG. 31, the condition sentence in the source codes is searched in the twelfth embodiment of FIG. 31, variables included in the condition sentence are extracted as test factors, the condition sentences are extracted as conditions of the test factors, and they are added into the test factor classification table, respectively.

Figure 32A:
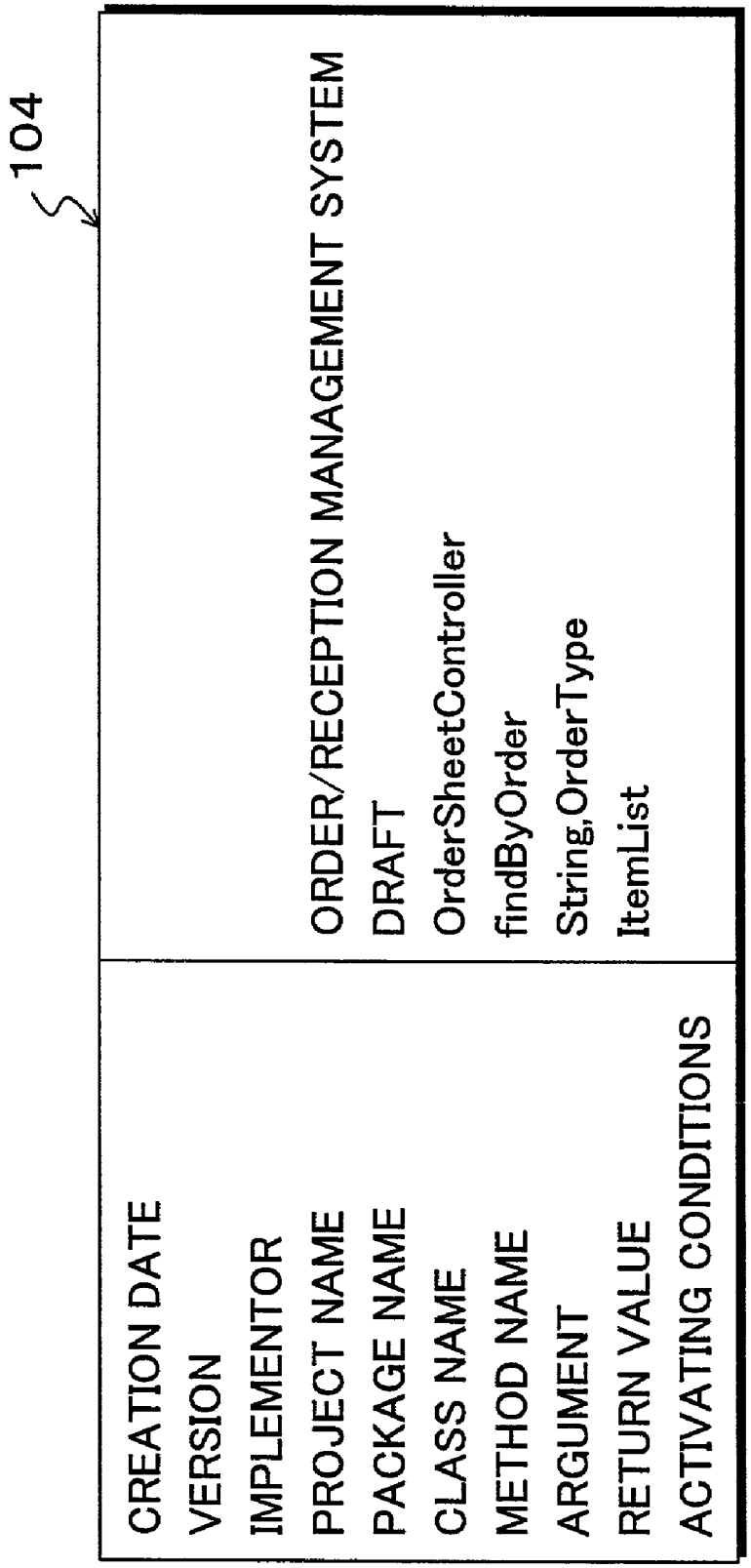

FIGS. 32A to 32C show a specific example of a condition sentence serving as test factors as variables extracted from the source codes in FIG. 31 and the conditions of those test factors. The test factor classification table comprises a header 104, an argument list 106, and an attribute list 108. That is, the source codes in FIG. 31 express processing contents of the method having the structure in the fifth embodiment of FIG. 19. The arguments "account" and "order" as variables are extracted like an argument list 106 and added as test factors. The condition sentence appearing in the source codes has been written as a condition of, for example, the argument "account". With respect to the argument "order", two attributes "type" and "id" are obtained like an attribute list 108 by the attribute development. With respect to the attribute name "type", the condition sentence extracted from the source codes has been written. In addition to the automatic formation of the test factor classification table using the class design information as mentioned above, the source codes of the source program formed from the class design information are also used. By adding the extracted test factors and their conditions into the test factor classification table, the test factors which will be dropped out from the class design information and conditions of the test factors can be obtained from the source codes. Precision as a template of the test factor classification table 22 can be further improved.

Figure 33B:
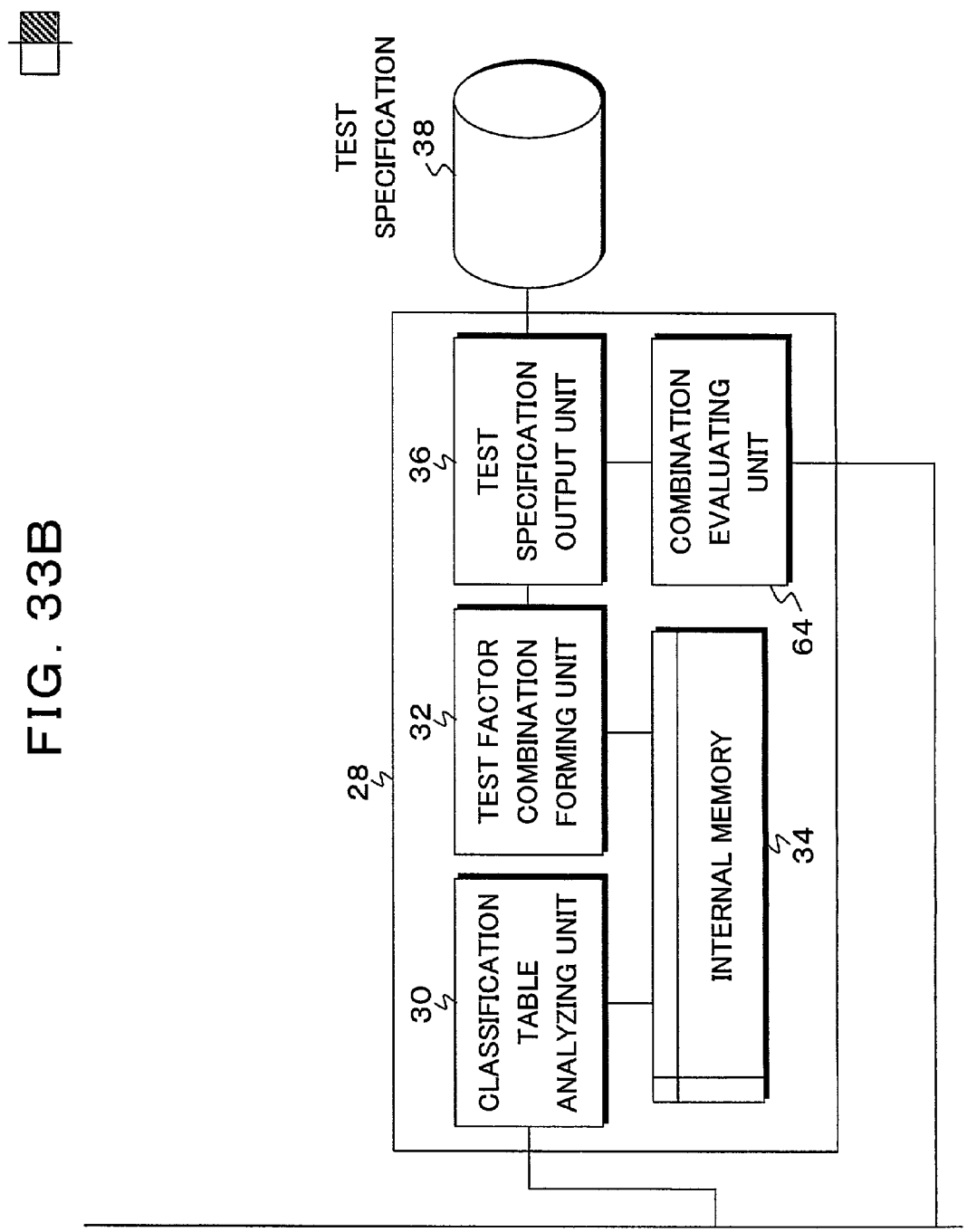

FIGS. 33A and 33B are block diagrams of the thirteenth embodiment of the invention. The thirteenth embodiment is characterized in that with respect to the test specification forming unit 28, when the test items are formed from the completed test factor classification table, by limiting the number of abnormality conditions in their combinations, the number of combinations which are formed is reduced, thereby preventing unnecessary test items from being formed. Although the example of the construction of the first embodiment of FIGS. 2A to 2C is used as a construction of the test factor classification table forming unit 12, naturally, the construction of one of the second to twelfth embodiments can be used as another example. In the thirteenth embodiment, a combination evaluating unit 64 is newly provided for the test specification forming unit 28. In the thirteenth embodiment, the combination evaluating unit 64 evaluates the combination of the conditions in the test specification 38 which is formed by the test specification output unit 36. If the abnormality conditions included in the combination of the conditions exceed the upper limit value designated by the user or the specific value as a default of the apparatus, it is determined lest such a combination is outputted. Specifically speaking, when the test specification output unit 36 outputs the combination of the conditions as a test specification 38, the combination evaluating unit 64 is inquired to see if the combinations of the abnormality conditions which are outputted as a test specification at this time exceed the designated upper limit value. If YES, the output to the test specification 38 by the test specification output unit 36 is inhibited.

FIGS. 34A to 34C show a specific example of the completed test factor classification table 26 which is inputted to form the test specification by the test specification forming unit 28 in the thirteenth embodiment in FIGS. 33A and 33B. The completed test factor classification table 26 comprises a header 110, an argument list 112, and an attribute list 114.

Figure 35A:
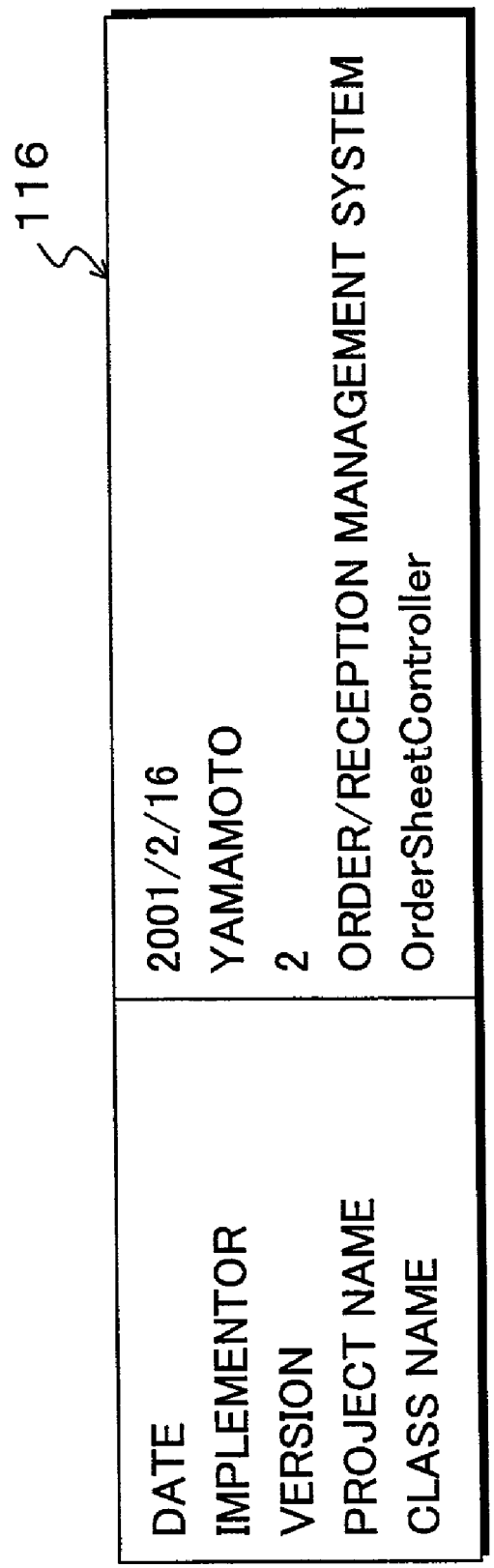
Figure 35D:
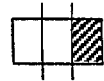

FIGS. 35A to 35D show a specific example of the test specification 38 formed when the test factor classification table in FIGS. 34A to 34C is read and the restriction of the number of abnormality conditions by the combination evaluating unit 64 is not performed. When the number of combinations of the abnormality conditions is not restricted, the test items comprising 12 kinds of combinations of the test item Nos. 1 to 12 in FIGS. 35B to 35D are automatically formed from the combination of the conditions regarding the three test factors comprising the argument names and attribute names in FIGS. 34B and 34C. The test item No. 1 among them is a combination of three abnormalities. Each of the test item Nos. 2, 3, 5, and 7 is a combination of two abnormalities.

Figure 36A:
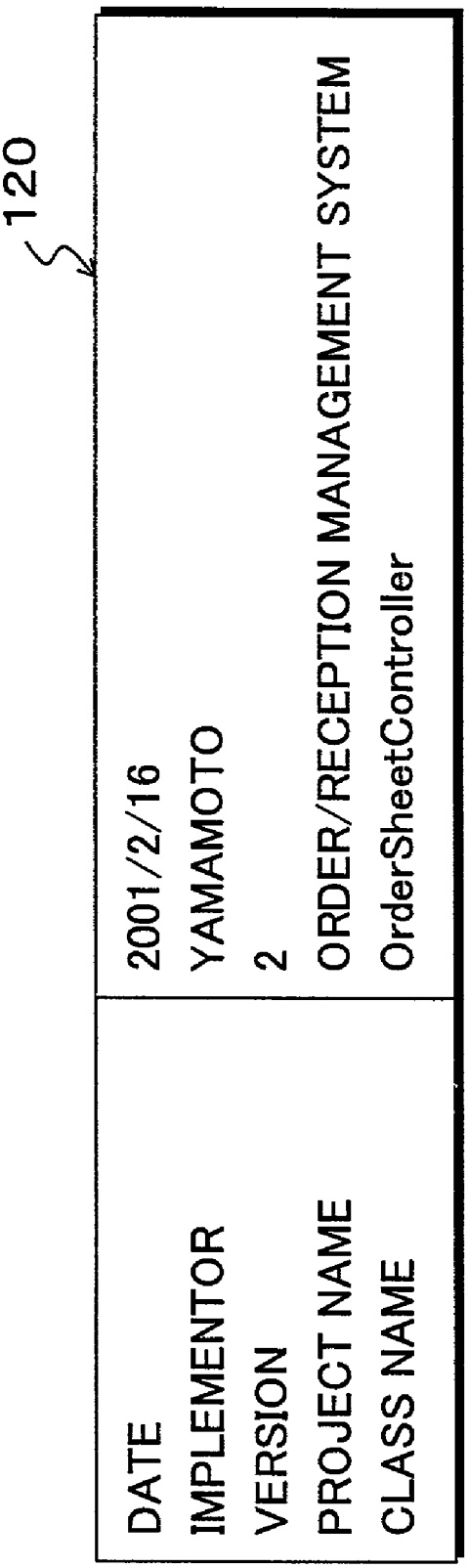

FIGS. 36A to 36C show an output result of the test specification 38 obtained when the number of abnormality conditions is designated to the upper limit number=1 into the combination evaluating unit 64 by the designation by the user via the terminal 40 or by the designation based on the specific value as a default of the apparatus in the thirteenth embodiment of FIGS. 33A and 33B. By designating and limiting the upper limit number of combinations of the abnormality conditions to 1 with respect to the combinations of the conditions as mentioned above, the combinations of the five conditions of the test item Nos. 1, 2, 3, 5, and 7 whose number of combinations of the abnormality conditions in FIGS. 36A to 36C is equal to or larger than 2 are excluded. Seven test items of the test item Nos. 4,6, and 8 to 12 in FIGS. 35B to 35D adapted to the upper limit number=1 of the abnormality conditions are formed like test item Nos. 1 to 7 in FIGS. 36B and 36C.

FIGS. 37A to 37C show a specific example of the completed test factor classification table which is used for forming the test specification in the fourteenth embodiment of the invention. The fourteenth embodiment is characterized in that when the test items are formed with respect to the test factor classification table as a target, by limiting the number of normality conditions which are combined with the abnormality conditions to 1, the number of combinations which are formed is reduced, thereby preventing unnecessary test items from being formed. Although the construction of the fourteenth embodiment in which the number of normality conditions which are combined with the abnormality conditions is restricted to 1 as mentioned above is substantially the same as that of the thirteenth embodiment of FIGS. 33A and 33B, as a function of the combination evaluating unit 64 provided for the test specification forming unit 28, it is determined in a manner such that in the combinations with which the abnormality conditions are combined with regard to the combinations of the conditions for forming the test items, the combinations including the normality conditions other than a predetermined representative normality condition are not outputted but excluded. As a representative normality condition in this case, it is designated by the user via the terminal 40 or designated by setting a specific value as a default of the apparatus, for example, the first normality condition of each test factor to the representative normality condition, or the like. Therefore, when the combination of the conditions is outputted as a test specification 38, the test specification output unit 36 inquires of the combination evaluating unit 64 and the combinations with the abnormality conditions including the normality condition other than the representative normality condition are excluded from the output targets as a discrimination result of the combination evaluating unit 64.

Figure 38A:
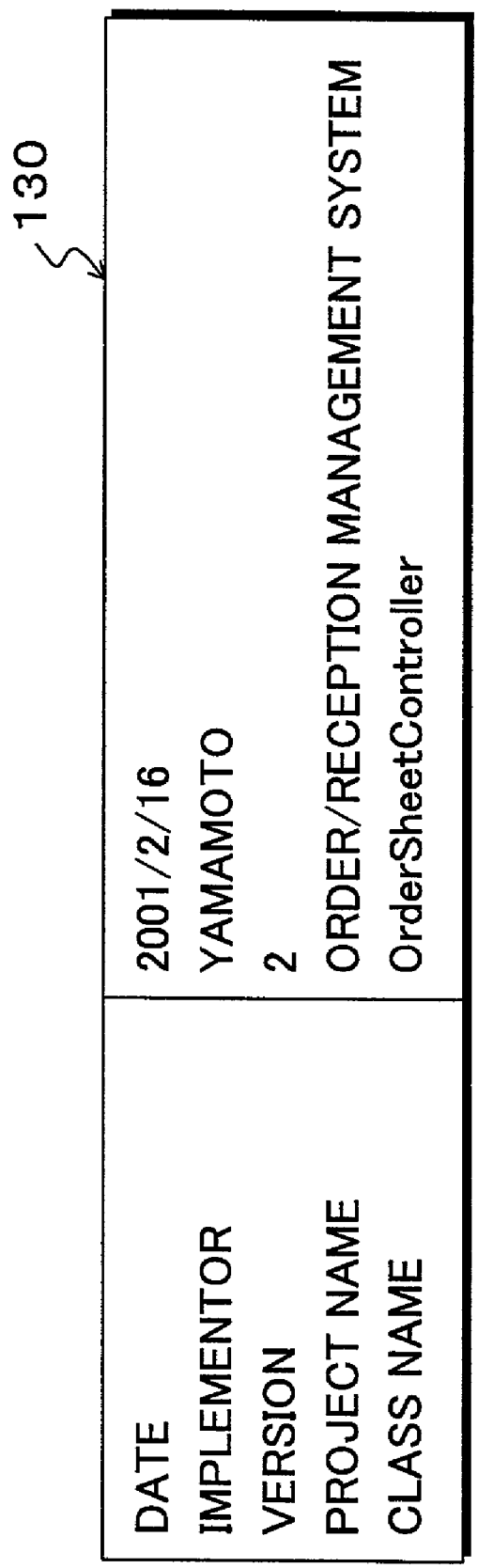

FIGS. 38A to 38C show an output result of a test specification formed in the case where the completed test factor classification table of FIGS. 37A to 37C is read and the restriction to exclude the combinations including the normality condition other than the representative normality condition is not performed. In the case where there is no restriction, three conditions are written with respect to the argument "account" in an argument list 126 in the test factor classification table of FIG. 37B and three conditions are likewise written with respect to the attribute "type" in an attribute list 128 of FIG. 37C. Therefore, by the combinations of those three conditions for the two test factors, nine test items as shown in the test item Nos. 1 to 9 in FIGS. 38B and 38C are formed in the case where there is no restriction.

FIGS. 39A to 39C show a specific example of a test specification formed in the case where with respect to the combinations including the abnormality conditions as test items, the combination evaluating process by the restriction for excluding the conditions other than the representative normality condition is executed in the fourteenth embodiment of the invention. As a representative normality condition, the head normality condition "value belongs to head office" is designated with respect to the argument "account" in FIG. 37B and the head normality condition "budget kind is equipment" is likewise designated also with respect to the attribute "type" in the attribute list 128 of FIG. 37C. By such designation of the representative normality condition, the combinations of the conditions other than the abnormality conditions and the representative normality condition are excluded from the test specification. That is, in FIGS. 38B and 38C, in the combination of "abnormal" and "normal" of the test item No. 2, since the condition type of an attention factor "order.type" is "normal" and the condition is the representative normality condition "budget kind is equipment", this combination is outputted as a valid combination. With respect to the combination of "abnormal" and "normal" of the next test item No. 3, since the condition "budget kind is general expenses" of the attention factor "order.type" is not the representative normality condition, this combination is excluded. In the combination of "normal" and "abnormal" of the next test item No. 4, since the normality condition of the attention factor "account" is the representative normality condition "value belongs to head office", this combination is outputted as a valid combination. With respect to the combination of "normal" and "abnormal" of the next test item No. 7, since the condition of the attention factor "account" is "value belongs to branch" and is not the representative normality condition "value belongs to head office", this combination is excluded. Thus, the test item Nos. 2 and 7 in the case where there is no restriction in FIGS. 38B and 38C are restricted by a process for narrowing down the combinations with the abnormality conditions in the fourteenth embodiment to the representative normality condition. The test specification in which the nine test items are restricted to seven test items in FIGS. 39B and 39C can be outputted. This test specification comprises a header 134 and a test item list 136. All of the combinations of the abnormality conditions and normality conditions of the test item Nos. 2 and 3 in the test item list 136 are restricted to the combinations including the representative normality condition.

Figure 40A:
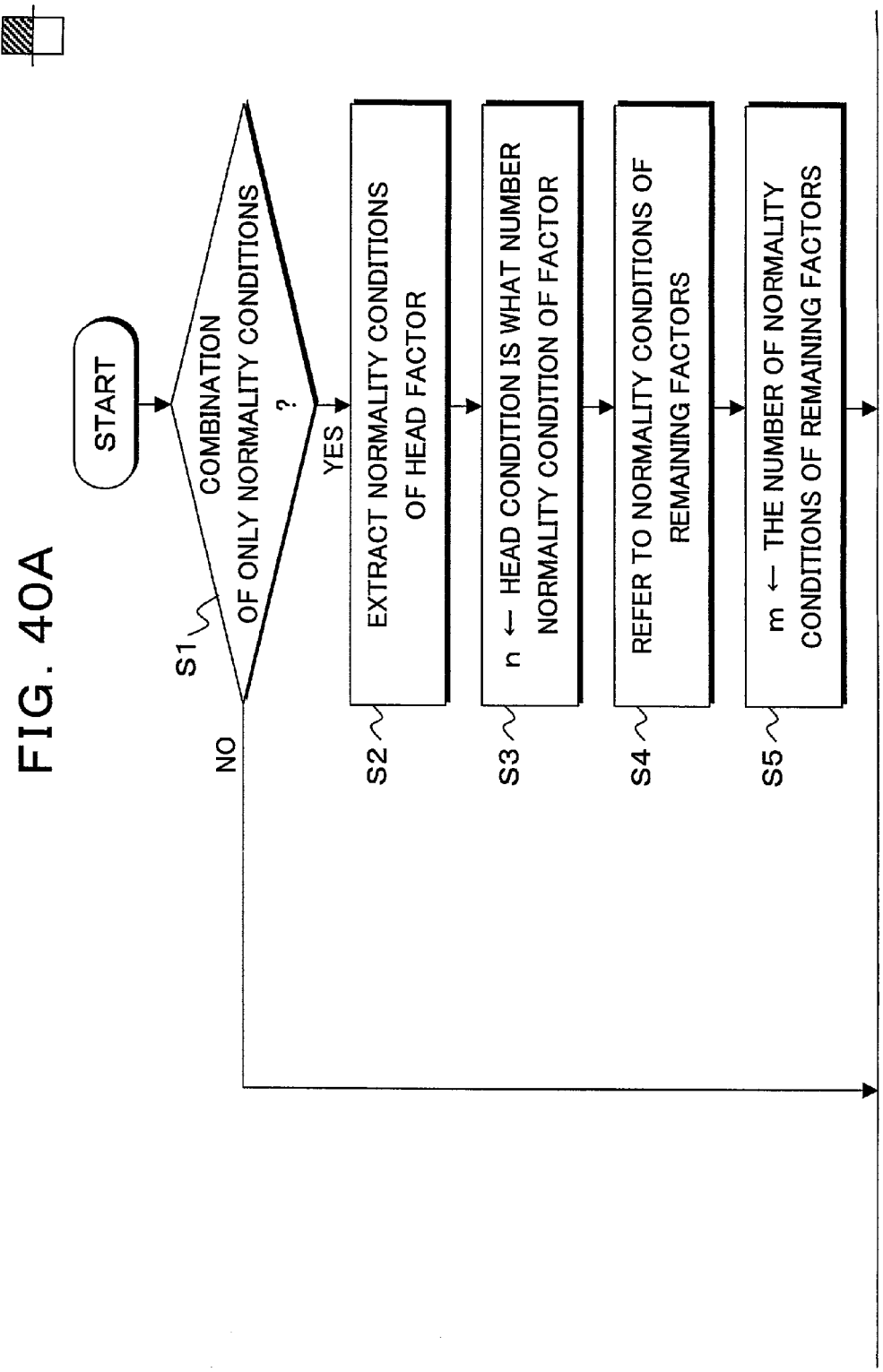

FIGS. 40A and 40B are flowcharts for a test specification forming process in the fifteenth embodiment of the invention. The fifteenth embodiment is characterized in that by providing restriction also with respect to combinations of the normality conditions, the number of combinations of the data items which are formed is reduced, thereby preventing a variety of test items from being formed. A construction to realize the fifteenth embodiment is substantially the same as that of the thirteenth embodiment of FIGS. 33A and 33B. The fifteenth embodiment is characterized in that as a function of the combination evaluating unit 64 provided for the test specification forming unit 28, whether the conditions in which the combinations of only the normality conditions are restricted are satisfied or not is discriminated, and if NO, the output as a test specification 38 is not performed.

The flowchart of FIGS. 40A and 40B is characterized in that the combinations of only the normality conditions are extracted with respect to the different test factors, the combinations whose orders of the normality conditions are the same are validated, and the combinations of the normality conditions whose orders are different are excluded. For example, when considering the case of forming the test specification by extracting the completed test factor classification table of FIGS. 37A to 37C as processing targets in the fifteenth embodiment as an example, if there is no restriction with respect to the combinations of only the normality conditions, the test specification as shown in FIGS. 38A to 38C is formed. In an item list 132 in this test specification, the four test item Nos. 5, 6, 8, and 9 are the combinations of only the normality conditions as shown in their types. With respect to the combinations of only the normality conditions, when seeing the argument list 126 and attribute list 128 of the test factor classification table of FIGS. 37B and 37C, there are two normality conditions with regard to the argument "account" and, similarly, there are also two normality conditions with respect to the attribute "type". In the embodiment of FIGS. 40A and 40B, therefore, the combinations of the normality conditions of only the first normality conditions and of only the second normality conditions are validated, and the combinations of the first and second normality conditions or the combinations of the second and first normality conditions are excluded. When considering those combinations with respect to the test item Nos. 5 and 6 and Nos. 8 and 9 as combinations of the normality conditions of the test specification of FIGS. 38B and 38C formed without restriction, the test item No. 5 is the combination of the first normality conditions, the test item No. 6 is the combination of the first and second normality conditions, the test item No. 8 is the combination of the second and first normality conditions, and further, the test item No. 9 is the combination of the second conditions, respectively. In the fifteenth embodiment of FIGS. 40A and 40B, the combination of the normality conditions of the same order are validated and the other combinations are excluded. Therefore, the test item Nos. 6 and 8 whose orders of the normality conditions are different are excluded and the combination of only the normality conditions of the test item Nos. 5 and 9 are outputted as valid combinations. Thus, according to the forming process of the test items in which the combination of the normality conditions is restricted according to the fifteenth embodiment, an output result of a test specification of FIGS. 41A to 41C can be obtained. In case of restricting those combinations of the normality conditions, the nine test items in the case where there is no restriction in FIGS. 38A to 38C are reduced to seven test items due to the restriction of the normality condition combinations of FIGS. 41A to 41C, and the formation of unnecessary test items can be prevented.

In the forming process of the test items in which the combination of the normality conditions of the same order are validated and outputted in the flowchart of FIGS. 40A and 40B, first, in step S1, whether the attention combination is a combination of only the normality conditions or not is discriminated. In case of the combination of only the normality conditions, the head normality condition is extracted in step S2. In step S3, information showing to what number normality condition in the attention factors the extracted head condition corresponds is substituted into "n". Subsequently, in step S4, the remaining combined normality conditions are extracted. The number of normality conditions of the factors corresponding to the remaining normality conditions is set to "m" in step S5. In step S6, whether a value of m is equal to or larger than that of n or not is discriminated. If m≧n, whether the condition of the remaining factors is the nth normality condition or not is discriminated in step S7. If it is the nth normality condition, step S9 follows and the combinations are outputted as valid combinations. If it is not the nth normality condition, the output of the combinations is made unnecessary in step S10. The processes in steps S6 and S7 are executed in the case where the number of conditions of the head attention factor is equal to or larger than the number of conditions of the remaining attention factors. On the other hand, the processes in steps S6 and S8 are executed in the case where the number of conditions of the head attention factor is smaller than the number of conditions of the remaining attention factors. In both cases, if the order of the conditions of the head factor is equal to that of the conditions of the remaining factors, step S9 follows and the combinations of the normality conditions are outputted as valid combinations. If those orders are different, step S10 follows and the output of the combinations of the normality conditions of the different orders is made unnecessary. In the example of FIGS. 41A to 41C, the case where there are two attention factors and there are two conditions of theirs as a test factor classification table which is inputted as shown in FIGS. 38A to 38C has been shown as an example. However, even when the number of attention factors is equal to or larger than 2 and the number of conditions is variable, the combinations can be substantially similarly restricted to the combinations such that only the combinations of the normality conditions of the same order are validated and the other combinations are excluded. Naturally, the combinations of only the normality conditions are not limited to those in the specific example of the above fifteenth embodiment but can be determined by designating the restricting conditions such that the combinations of only the normality conditions of the proper conditions are validated and the other combinations are excluded as necessary for the combination evaluating unit 64.

An embodiment of the test specification forming program according to the invention will now be described. When considering the first embodiment of FIGS. 1A and 1B as an example, the test specification formation supporting apparatus of the invention comprises the test factor classification table forming unit 12 and test specification forming unit 28 and they can be formed as independent programs. That is, the processing functions of the test factor classification table forming unit 12 in each embodiment mentioned above is formed as a test factor classification table forming program. The functions of the test specification forming unit 28 in each embodiment mentioned above is formed as a test specification forming program. The two programs, that is, the test factor classification table forming program and test specification forming program formed as mentioned above are installed into a memory of a computer. File data of the class design information which has previously been formed is read by the test factor classification table forming program and processed, thereby automatically forming the test factor classification table. The test factor classification table which was automatically formed as mentioned above is presented to the user. The user fills the blank units of the template of the test factor classification table, thereby forming the completed test factor classification table. This table is read by the test specification forming program and the test specification is automatically formed. As a structure of the test specification formation supporting program of the invention, naturally, it is possible to use a program structure in which the test factor classification table forming program and the test specification forming program are integrated.

Figure 43:
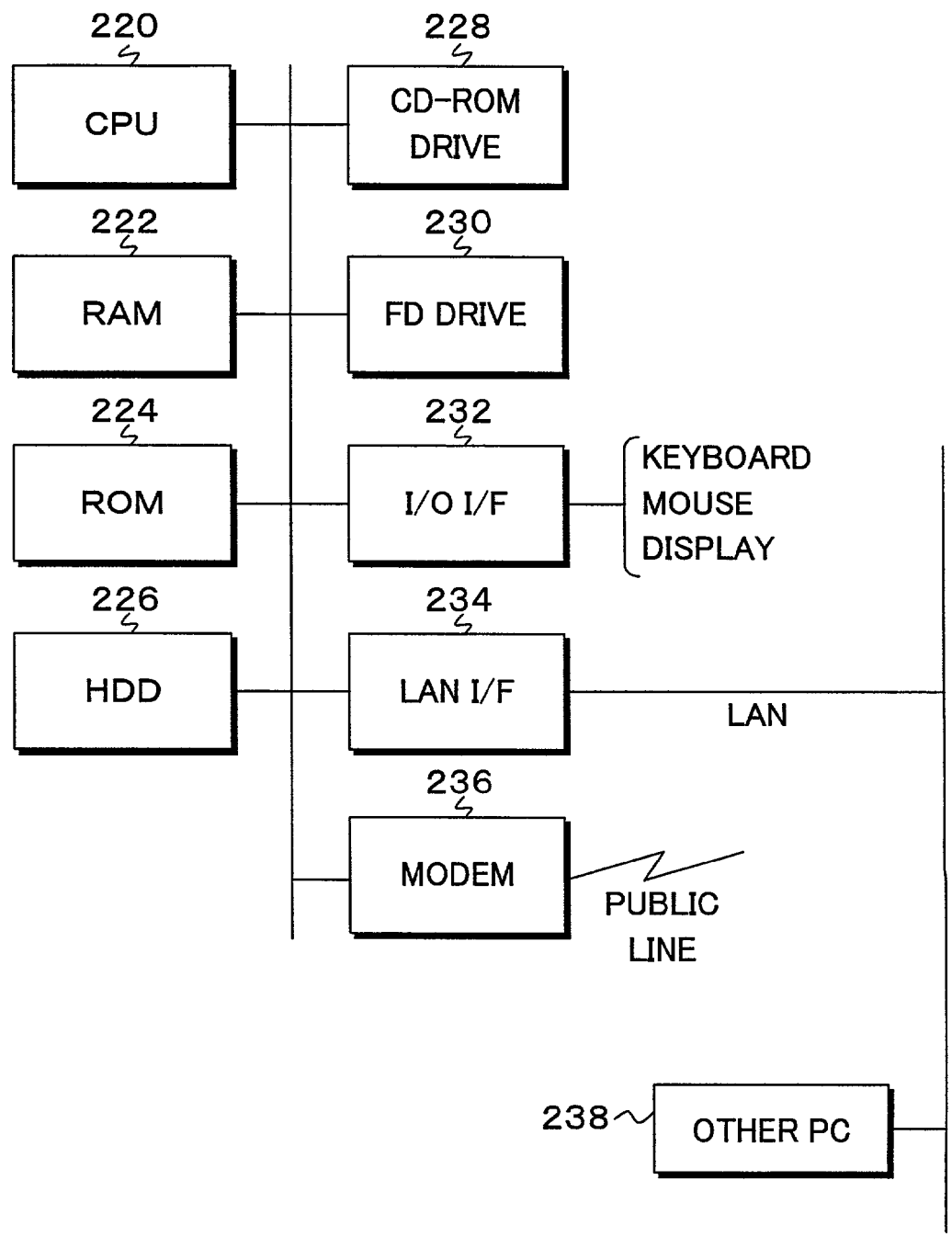
FIG. 43 is a block diagram of an internal construction of a main body unit in FIG. 42.

An embodiment of a computer-readable recording medium which stores the test specification formation supporting program of the invention will now be described. A computer system 200 of FIG. 42 is a system for executing the test specification formation supporting program of the invention and has a main body unit 202. As shown in FIG. 43, the main body unit 202 has therein: a CPU 220; an RAM 222; an ROM 224; a disk drive (HDD) 226; a CD-ROM drive 228; an FD drive 230; an I/O interface 232 to which a keyboard, a mouse, and a display are connected; an LAN interface 234; a modem 236; and the like. The computer system 200 further comprises: a display 206 for displaying information such as a test factor classification table or the like which was automatically formed onto a display screen 204 in response to an instruction from the main body unit 202; a keyboard 208 for inputting various information to the computer system 200; a mouse 210 for designating an arbitrary position on the display screen 204 of the display 206; an LAN interface 212 for accessing a database connected via a line; and a modem 214.

The test specification formation supporting program of the invention is stored into a portable storage medium such as CD-ROM, floppy disk, DVD disk optical disk IC card, or the like, a database connected through the line by using the modem 236 and LAN interface 234, or a database of another computer system PC, installed into the computer system 200, and thereafter, executed by the computer system 200. The recording media include: a portable recording medium such as CD-ROM 216, floppy disk (R) FD 218, DVD disk, optical disk IC card, or the like; a storage device such as a hard disk (HDD) equipped for the inside or outside of the computer system 200; a database for holding the program through the line; another computer system; its database; and further, a transmission medium on the line.

According to the invention as mentioned above, when software designed on the basis of the object-oriented idea is tested, by automatically forming the template of the test factor classification table by using the class design information, the number of processing steps regarding the formation of the test factor classification table which has manually been performed hitherto can be remarkably reduced.

The test factor classification table which was automatically formed according to the invention is presented as a template to the user and it is sufficient that the user completes the test factor classification table by filling the empty units of the template. The test factors such as basic argument array, attribute values, and the like in the classification table have automatically been written. Therefore, the omission of the description of the conditions based on the test factors is prevented and the test factor classification table of high precision can be formed with the aid of the support of the invention.

By automatically forming the test specification by combining the conditions in the test factor classification table completed by the updating of the template, the automatic formation of the test specification without omission can be efficiently realized. Further, by restricting the conditions which are combined as test items upon formation of the test specification as necessary, the number of formed combinations can be reduced, thereby properly preventing unnecessary test items from being formed.

Each of the embodiments has been described above with respect to the example as a supporting apparatus integratedly comprising the test factor classification table forming unit 12 and test specification forming unit 28 as shown in, for example, the first embodiment of FIGS. 1A and 1B. In the other embodiments of the invention, however, in a manner similar to the case of the program and recording medium, naturally, the test factor classification table forming unit 12 and test specification forming unit 28 can be also separately constructed as independent apparatuses.

The invention is not limited to the foregoing embodiments but incorporates many proper modifications without losing the objects and advantages of the invention. Further, the invention is not limited by the numerical values shown in the above embodiments.

What is claimed is:

1. A test specification formation supporting apparatus comprising:
   a test factor classification table forming unit which analyzes class design information of software designed by an object orientation and forms a template of a test factor classification table in which test factors which influence the operation of a method of a test target and conditions of the test factors have been listed; and
   a test specification forming unit which forms a test specification by combining the conditions described in the test factor classification table completed on the basis of the template of said test factor classification table.

2. An apparatus according to claim 1, wherein:
   said test factor classification table forming unit comprises
   a class design information analyzing unit which inputs the class design information of a designated class and analyzes it;
   a factor classifying unit which extracts test factors including an array of arguments of the method and conditions of the arguments and header information which is used for said test factor classification table from an analysis result of said class design information; and
   a classification table output unit which shapes said extracted test factors and header information into a predetermined table format and outputs the template of said test factor classification table; and
   said test factor specification forming unit comprises
   a classification table analyzing unit which inputs said test factor classification table and analyzes it;
   a test factor combination forming unit which selects one of the conditions of the text factors every test factor from the analysis result of said classification table, forms a combination lest the selected condition is overlapped, and extracts the header information which is used in said test specification; and
   a test specification output unit which shapes all of the combinations and the header information formed and extracted by said combination forming unit into a predetermined format and outputs the test specification.

3. An apparatus according to claim 2, wherein when a form of the extracted test factors is a class, the factor classifying unit of said test factor classification table forming unit recursively executes processes for developing attribute values with reference to the corresponding class design information and extracting the developed attribute values as test factors.

4. An apparatus according to claim 3, wherein said test factor classification table forming unit further has a development upper limit number designating unit which designates a development upper limit number of attribute values, and said factor classifying unit does not develop the attribute values which exceed the upper limit number designated by said development upper limit number designating unit.

5. An apparatus according to claim 3, wherein said test factor classification table forming unit further has an unnecessary-development class designating unit which designates a class in which the development of the attribute values is unnecessary, and said factor classifying unit does not develop the attribute values of the class designated by said unnecessary-development class designating unit upon development of the attribute values.

6. An apparatus according to claim 2, wherein
   said test factor classification table forming unit further has a method design information analyzing unit which inputs structured class design information regarding processing contents of the designated method and analyzes it,
   said factor classifying unit extracts branching conditions described in the processing contents of said method from a result of said analysis and extracts variables such as arguments and the like constructing said branching conditions and conditions of said variables as test factors, and
   said classification table output unit shapes said extracted test factors and header information into the predetermined table format and outputs the template of said test factor classification table.

7. An apparatus according to claim 6, wherein said test factor classification table forming unit further has a condition type discriminating unit which discriminates whether said branching condition indicates a normality process or an abnormality process, and a discrimination type indicative of the normality process or the abnormality process is also written in said test factor classification table.

8. An apparatus according to claim 2, wherein said test factor classification table forming unit further has:
   a method contents description sentence analyzing unit which inputs design information described by sentences regarding processing contents of the designated method and analyzes a description of conditions written by a specific notation; and
   a condition searching unit which extracts branching conditions described in the processing contents of said method from an analysis result of said design information and searches variables such as arguments and the like constructing said branching conditions and conditions of said variables as test factors,
   and said classification table output unit shapes said test factors extracted by said factor classifying unit and said condition searching unit into the predetermined table format and outputs the template of said test factor classification table.

9. An apparatus according to claim 8, wherein said condition searching unit further discriminates whether the branching condition written in said sentences by the specific notation indicates a normality process or an abnormality process, and a discrimination type indicative of the normality process or the abnormality process is also written in said test factor classification table.

10. An apparatus according to claim 9, wherein said test factor classification table forming unit further has a notation designating unit which designates the notation of the conditions which are extracted from the sentences in which the processing contents of the method have been described and the notation of the type indicative of the normality process or the abnormality process.

11. An apparatus according to claim 2, wherein said test factor classification table forming unit further has an output target selecting unit which selects the method from design information on the basis of a designated method selection reference and allows the test factor classification table as an output target to be formed.

12. An apparatus according to claim 2, wherein said test factor classification table forming unit further has an output target selecting unit which selects the class and the method from design information on the basis of a designated class selection reference and allows the test factor classification table as an output target to be formed.

13. An apparatus according to claim 2, wherein said test factor classification table forming unit further has:
   a source code analyzing unit which inputs source codes of a program corresponding to said class design information and analyzes them; and
   a source condition searching unit which extracts a condition sentence of the method serving as a target from an analysis result of said source codes, extracts variables used in said condition and the condition sentence as test factors, and adds them into the test factor classification table formed from said class design information.

14. An apparatus according to claim 7 or 9, wherein said test specification forming unit further has a combination evaluating unit which, when the conditions described in said test factor classification table are combined, designates an upper limit of the number of conditions including the conditions which are classified into the abnormality process.

15. An apparatus according to claim 7 or 9, wherein said test specification forming unit further has a combination evaluating unit which, when the conditions described in said test factor classification table are combined, designates one of a plurality of normality conditions which are classified into the normality process in the same test factor as a representative normality condition and allows said representative normality condition to be combined with the abnormality conditions which are classified into the abnormality process.

16. An apparatus according to claim 7 or 9, wherein said test specification forming unit further has a combination evaluating unit which, when the conditions described in said test factor classification table are combined, restricts the normality conditions which can be combined with respect to the combination of only the normality conditions.

17. A test specification formation supporting method comprising:
   a classification table forming step which analyzes class design information of software designed by an object orientation and forms a template of a test factor classification table in which test factors which influence the operation of a method as a test target and conditions of the test factors are listed; and
   a test specification forming step which forms a test specification by combining conditions described in said test factor classification table completed on the basis of the template of said test factor classification table.

18. A method according to claim 17, wherein:
   in said classification table forming step,
      the class design information of the designated class is inputted and analyzed,
      test factors including an array of arguments of the method and conditions of the arguments and header information which is used in said test factor classification table are extracted from an analysis result of said class design information, and
      said extracted test factors and header information are shaped into a predetermined table format, and the template of the test factor classification table is outputted; and
   in said test specification forming step,
      said test factor classification table is inputted and analyzed,
      one of the conditions of the test factors is selected every test factor from an analysis result of said classification table, a combination is formed lest it is overlapped, and header information which is used for the test specification is extracted, and
      all of the formed combinations and the header information are shaped into a predetermined format and the test specification is outputted.

19. A method according to claim 18, wherein in said classification table forming step, when a form of the extracted test factors is a class, processes for developing attribute values with reference to the corresponding class design information and extracting the developed attribute values as test factors are recursively executed.

20. A method according to claim 19, wherein in said classification table forming step, further, a development upper limit number of attribute values is designated, and the attribute values which exceed the designated development upper limit number are not developed upon development of the attribute values.

21. A method according to claim 19, wherein in said classification table forming step, further, a class in which the development of the attribute values is unnecessary is designated, and the attribute values of the designated class are not developed upon development of the attribute values.

22. A method according to claim 18, wherein
   in said classification table forming step, further,
   structured class design information regarding processing contents of the designated method is inputted and analyzed,
   branching conditions described in the processing contents of said method are extracted from a result of said analysis and variables such as arguments and the like constructing said branching conditions and conditions of said variables are extracted as test factors, and
   said extracted test factors and header information are shaped into the predetermined table format and the template of said test factor classification table is outputted.

23. A method according to claim 22, wherein in said classification table forming step, further, whether said branching condition indicates a normality process or an abnormality process is discriminated, and a discrimination type indicative of the normality process or the abnormality process is also written in said test factor classification table.

24. A method according to claim 18, wherein in said classification table forming step, further,
   design information described by sentences regarding processing contents of the designated method is inputted and a description of conditions written by a specific notation is analyzed, and
   branching conditions described in the processing contents of said method are extracted from an analysis result of said design information and variables such as arguments and the like constructing said branching conditions and conditions of said variables are searched as test factors, and
   said extracted test factors are shaped into the predetermined table format and the template of said test factor classification table is outputted.

25. A method according to claim 24, wherein, further, whether the branching condition written in said sentences by the specific notation indicates a normality process or an abnormality process is discriminated, and a discrimination type indicative of the normality process or the abnormality process is also written in said test factor classification table.

26. A method according to claim 25, wherein in said classification table forming step, further, the notation of the conditions which are extracted from the sentences in which the processing contents of the method have been described and the notation of the type indicative of the normality process or the abnormality process are designated.

27. A method according to claim 18, wherein in said classification table forming step, further, the method is selected from design information on the basis of a designated method selection reference and the test factor classification table as an output target is formed.

28. A method according to claim 18, wherein in said classification table forming step, the class and the method are selected from design information on the basis of a designated class selection reference and the test factor classification table as an output target is formed.

29. A method according to claim 18, wherein in said classification table forming step, further,
  source codes of a program corresponding to said class design information are inputted and analyzed, and
  a condition sentence of the method serving as a target is extracted from an analysis result of said source codes, and variables used in said condition sentence and the condition sentence are extracted as test factors and added into the test factor classification table formed from said class design information.

30. A method according to claim 23 or 25, wherein in said test specification forming step, further, when the conditions described in said test factor classification table are combined, an upper limit of the number of conditions including the conditions which are classified into the abnormality process is designated.

31. A method according to claim 23 or 25, wherein in said test specification forming step, further, when the conditions described in said test factor classification table are combined, one of a plurality of normality conditions which are classified into the normality process in the same test factor is designated as a representative normality condition and combined with the abnormality conditions which are classified into the abnormality process.

32. A method according to claim 23 or 25, wherein in said test specification forming step, further, when the conditions described in said test factor classification table are combined, the normality conditions which can be combined are restricted with respect to the combination of only the normality conditions.

33. A test specification formation supporting program which allows a computer to execute:
  a classification table forming step which analyzes class design information of software designed by an object orientation and forms a template of a test factor classification table in which test factors which influence the operation of a method as a test target and conditions of the test factors are listed; and
  a test specification forming step which forms a test specification by combining conditions described in said test factor classification table completed on the basis of the template of said test factor classification table.

34. A program according to claim 33, wherein:
  in said classification table forming step,
  the class design information of the designated class is inputted and analyzed,
  test factors including an array of arguments of the method and conditions of the arguments and header information which is used in said test factor classification table are extracted from an analysis result of said class design information, and
  said extracted test factors and header information are shaped into a predetermined table format, and the template of the test factor classification table is outputted; and
  in said test specification forming step,
  said test factor classification table is inputted and analyzed,
  one of the conditions of the test factors is selected every test factor from an analysis result of said classification table, a combination is formed lest it is overlapped, and header information which is used for a test specification is extracted, and
  all of the formed combinations and the header information are shaped into a predetermined format and the test specification is outputted.

35. A computer-readable recording medium which stores a test specification formation supporting program for allowing a computer to execute:
  a classification table forming step which analyzes class design information of software designed by an object orientation and forms a template of a test factor classification table in which test factors which influence the operation of a method as a test target and conditions of the test factors are listed; and
  a test specification forming step which forms a test specification by combining conditions described in said test factor classification table completed on the basis of the template of said test factor classification table.

36. A medium according to claim 35, wherein
  in said classification table forming step,
  the class design information of the designated class is inputted and analyzed,
  test factors including an array of arguments of the method and conditions of the arguments and header information which is used in said test factor classification table are extracted from an analysis result of said class design information, and
  said extracted test factors and header information are shaped into a predetermined table format, and the template of the test factor classification table is outputted; and
  in said test specification forming step,
  said test factor classification table is inputted and analyzed,
  one of the conditions of the test factors is selected every test factor from an analysis result of said classification table, a combination is formed lest it is overlapped, and header information which is used for a test specification is extracted, and
  all of the formed combinations and the header information are shaped into a predetermined format and the test specification is outputted.

37. A test factor classification table formation supporting apparatus comprising:
  a class design information analyzing unit which inputs class design information of a designated class of software designed by an object orientation and analyzes it;
  a factor classifying unit which extracts test factors including an array of arguments of the method and conditions of the test factors and header information which is used for said test factor classification table from an analysis result of said class design information; and a classification table output unit which shapes said extracted test factors and header information into a predetermined table format and outputs a template of said test factor classification table.

38. A test factor classification table formation supporting method comprising the steps of:

inputting class design information of a designated class of software designed by an object orientation and analyzing it;

extracting test factors including an array of arguments of the method and conditions of the test factors and header information which is used for a test factor classification table from an analysis result of said class design information; and shaping said extracted test factors and header information into a predetermined table format and outputting a template of said test factor classification table.

39. A test factor classification table formation supporting program which allows a computer to execute:

a step which inputs class design information of a designated class of software designed by an object orientation and analyzes it;

a step which extracts test factors including an array of arguments of the method and conditions of the test factors and header information which is used for said test factor classification table from an analysis result of said class design information; and a step which shapes said extracted test factors and header information into a predetermined table format and outputs a template of said test factor classification table.

40. A computer-readable recording medium which stores a test specification formation supporting program for allowing a computer to execute:

a step which inputs class design information of a designated class of software designed by an object orientation and analyzes it;

a step which extracts test factors including an array of arguments of the method and conditions of the test factors and header information which is used for a test factor classification table from an analysis result of said class design information; and a step which shapes said extracted test factors and header information into a predetermined table format and outputs a template of said test factor classification table.

* * * * *